Feb. 26, 1963  R. W. DAVIDSON  3,079,146
PHOTOCOMPOSING MACHINE
Filed April 15, 1959  22 Sheets-Sheet 2
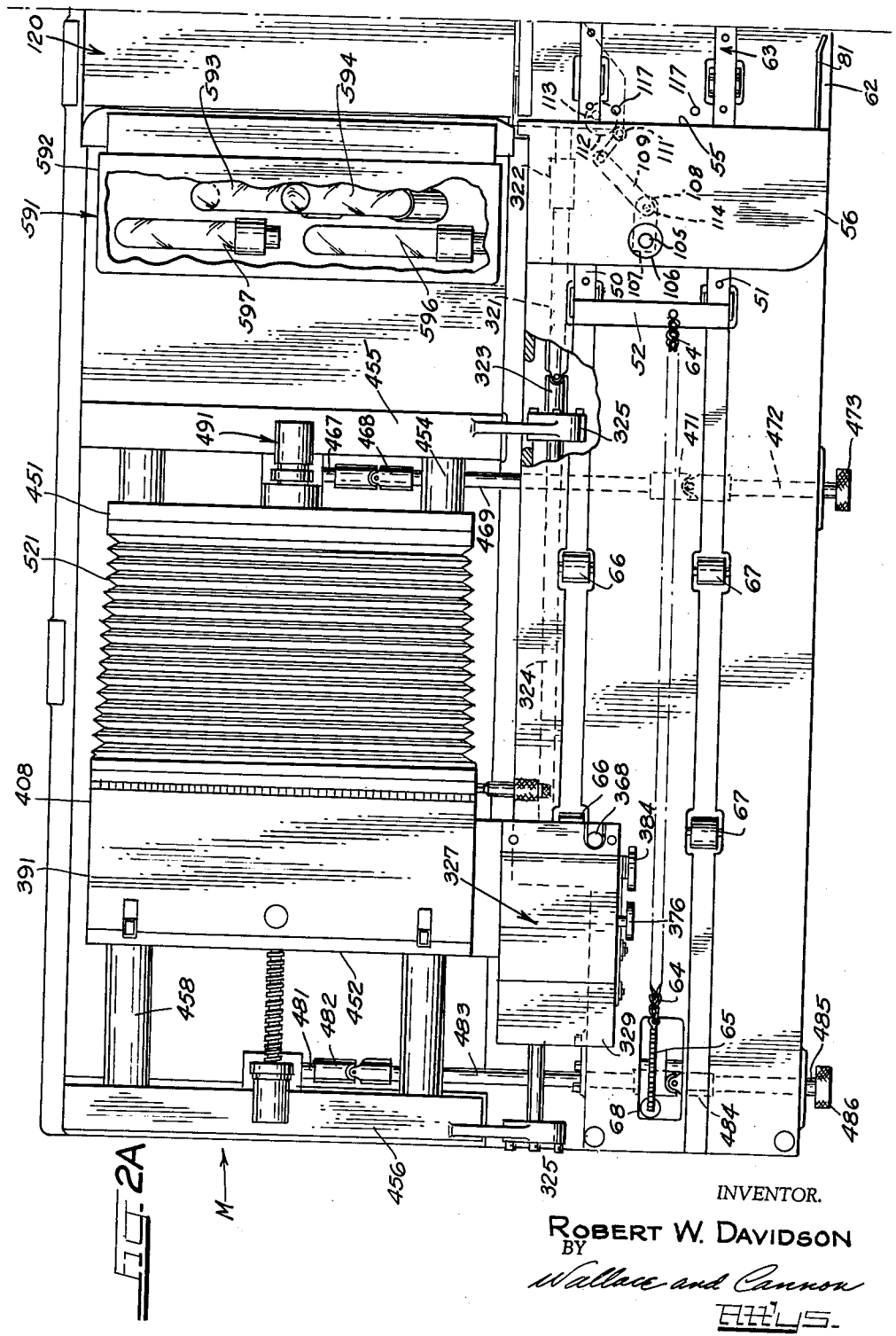
INVENTOR.
ROBERT W. DAVIDSON
BY
Wallace and Cannon
Attys.

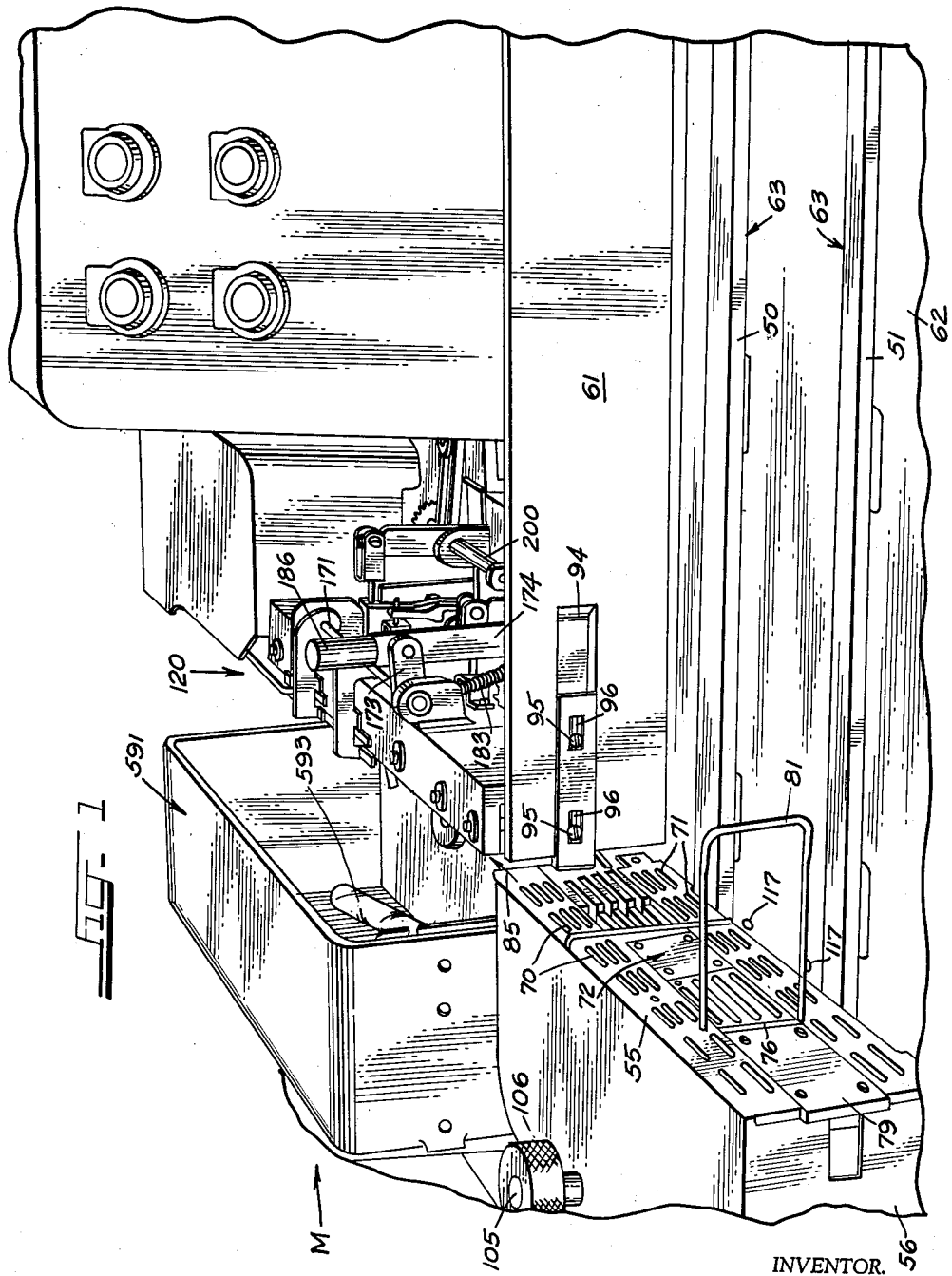

Feb. 26, 1963 R. W. DAVIDSON 3,079,146
PHOTOCOMPOSING MACHINE
Filed April 15, 1959 22 Sheets-Sheet 3
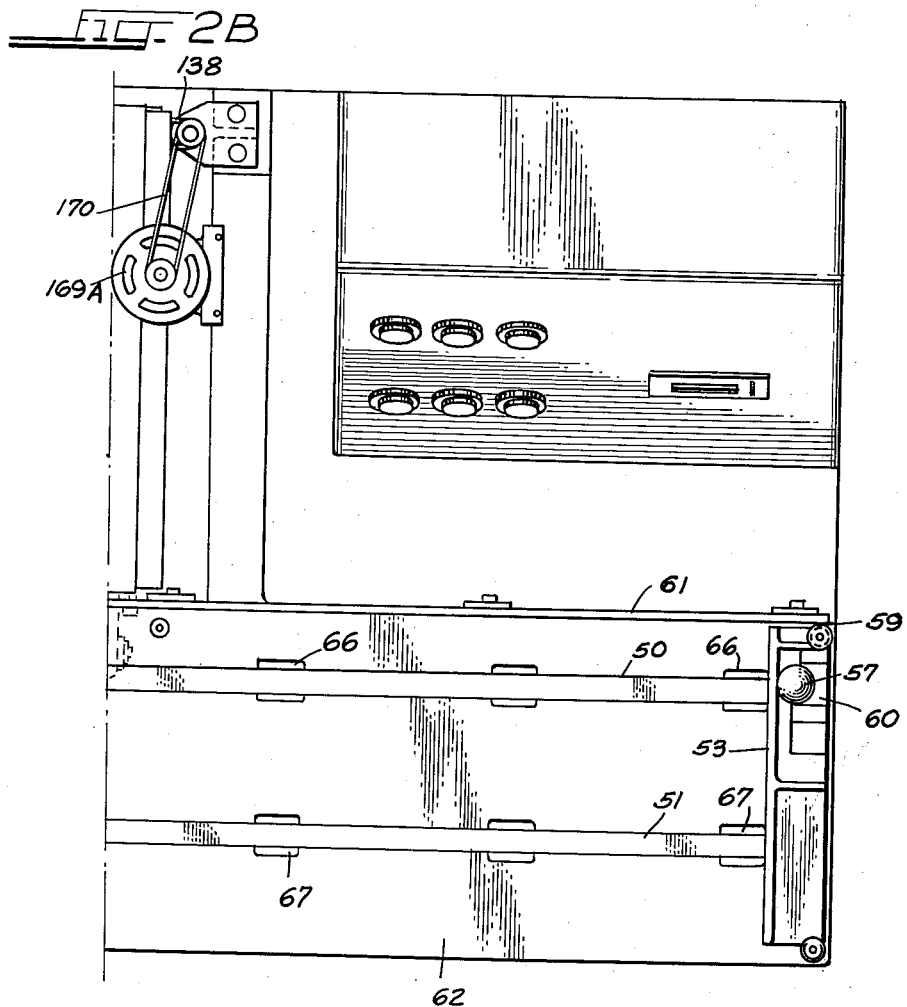
INVENTOR.
ROBERT W. DAVIDSON
BY
Wallace and Cannon
ATTYS.

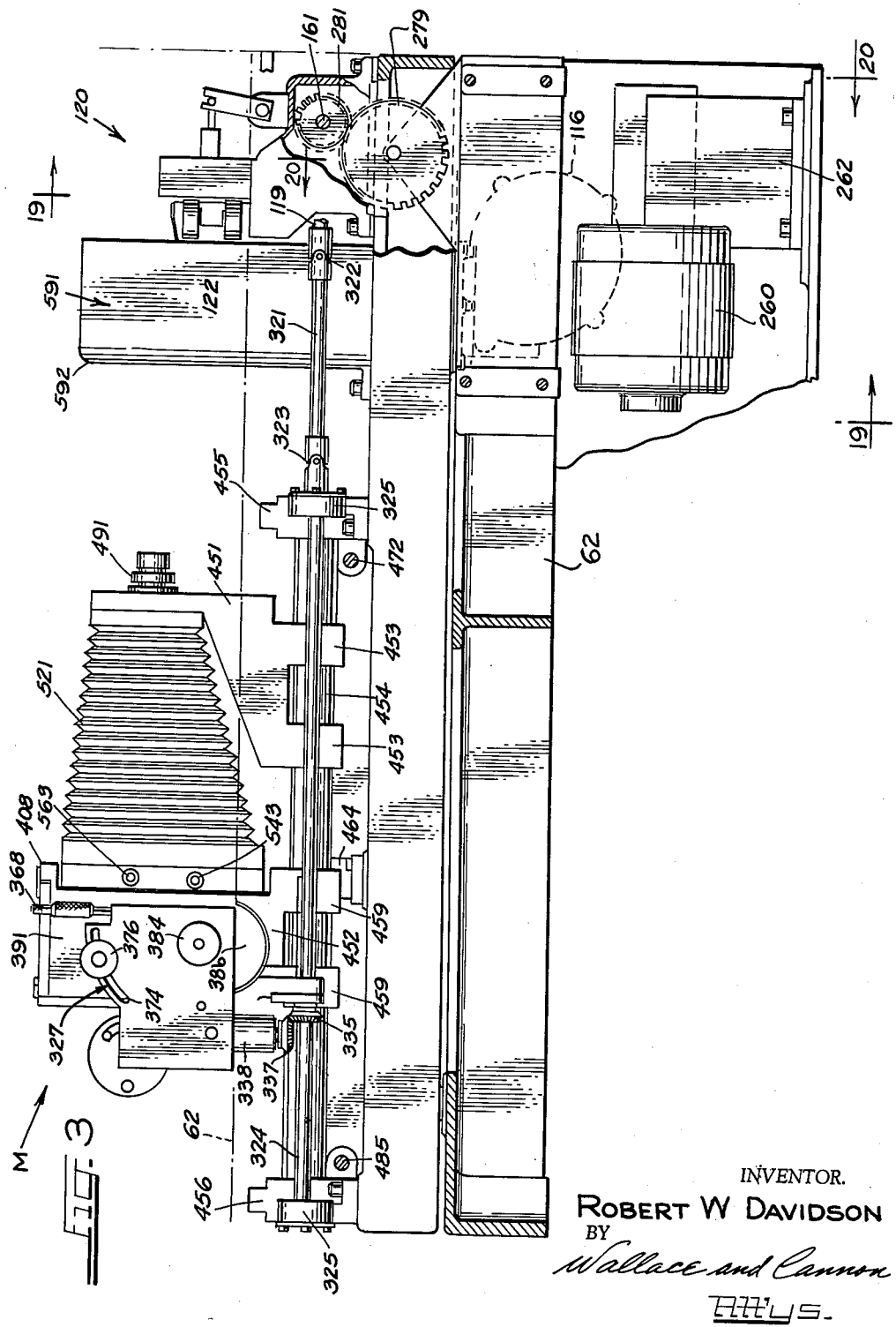

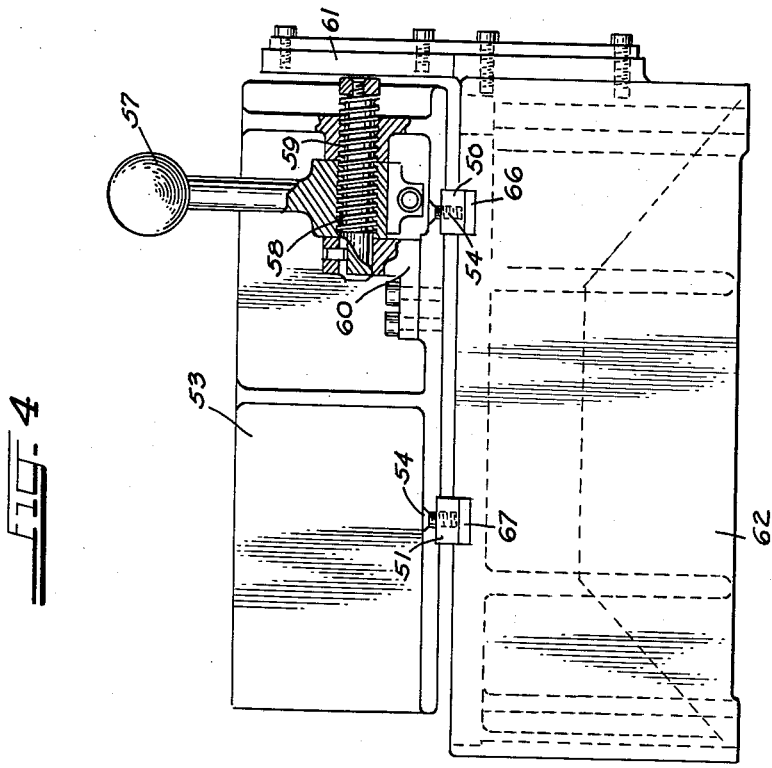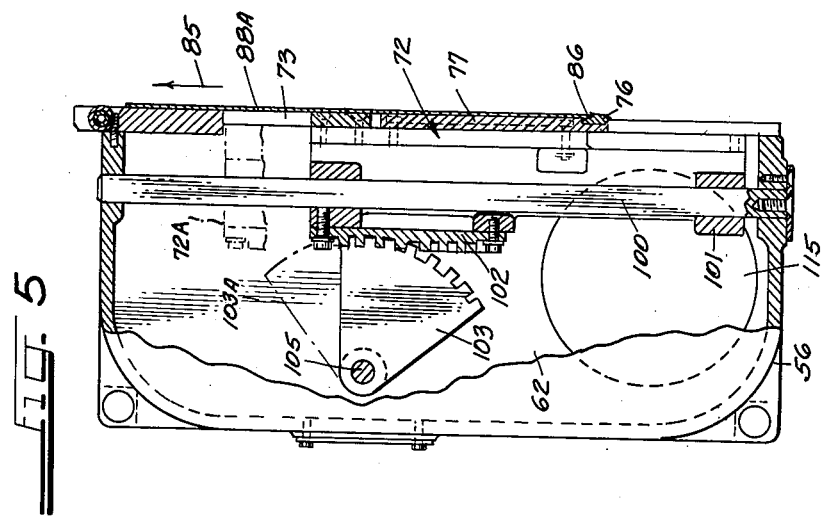

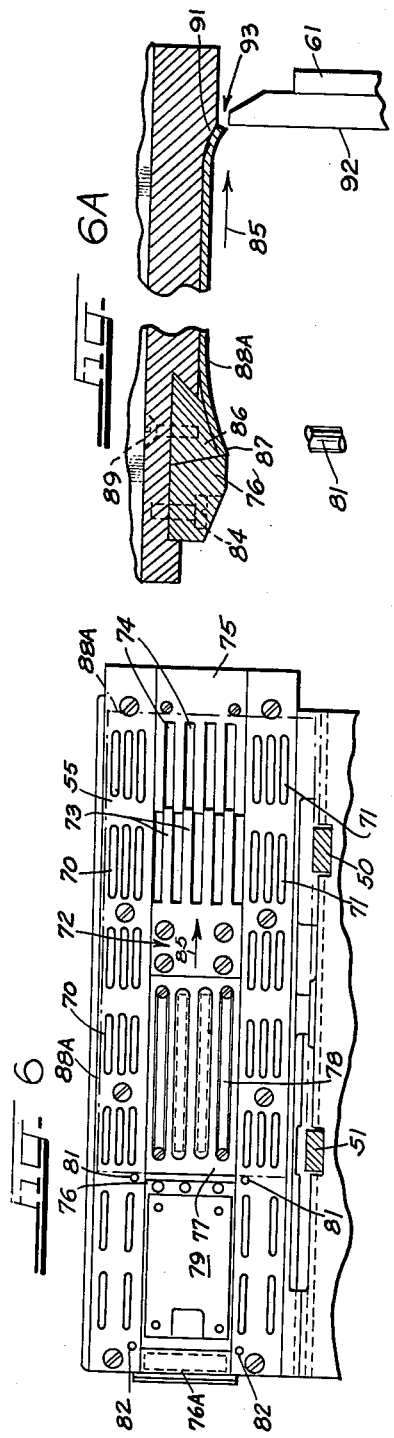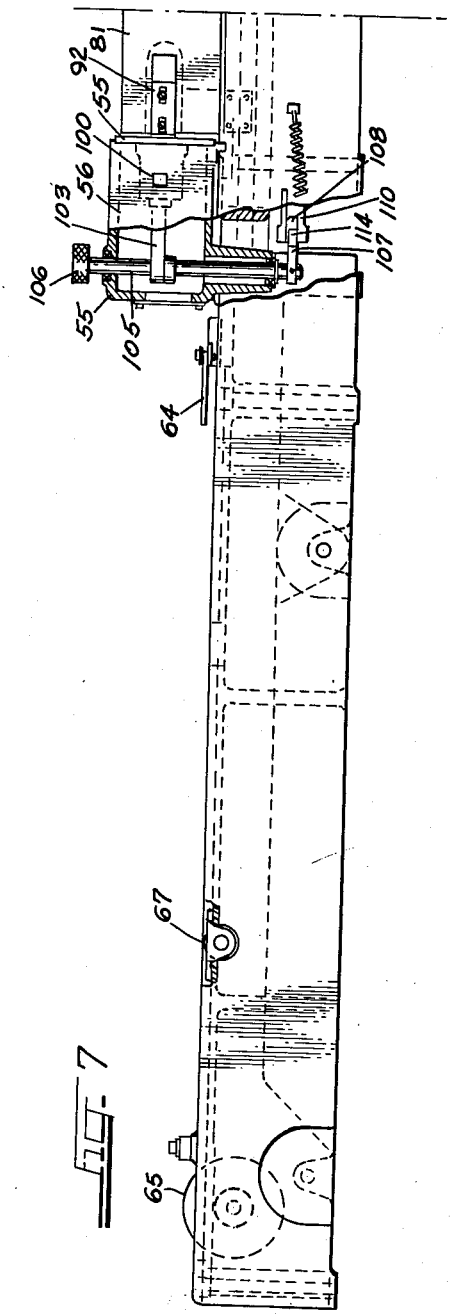

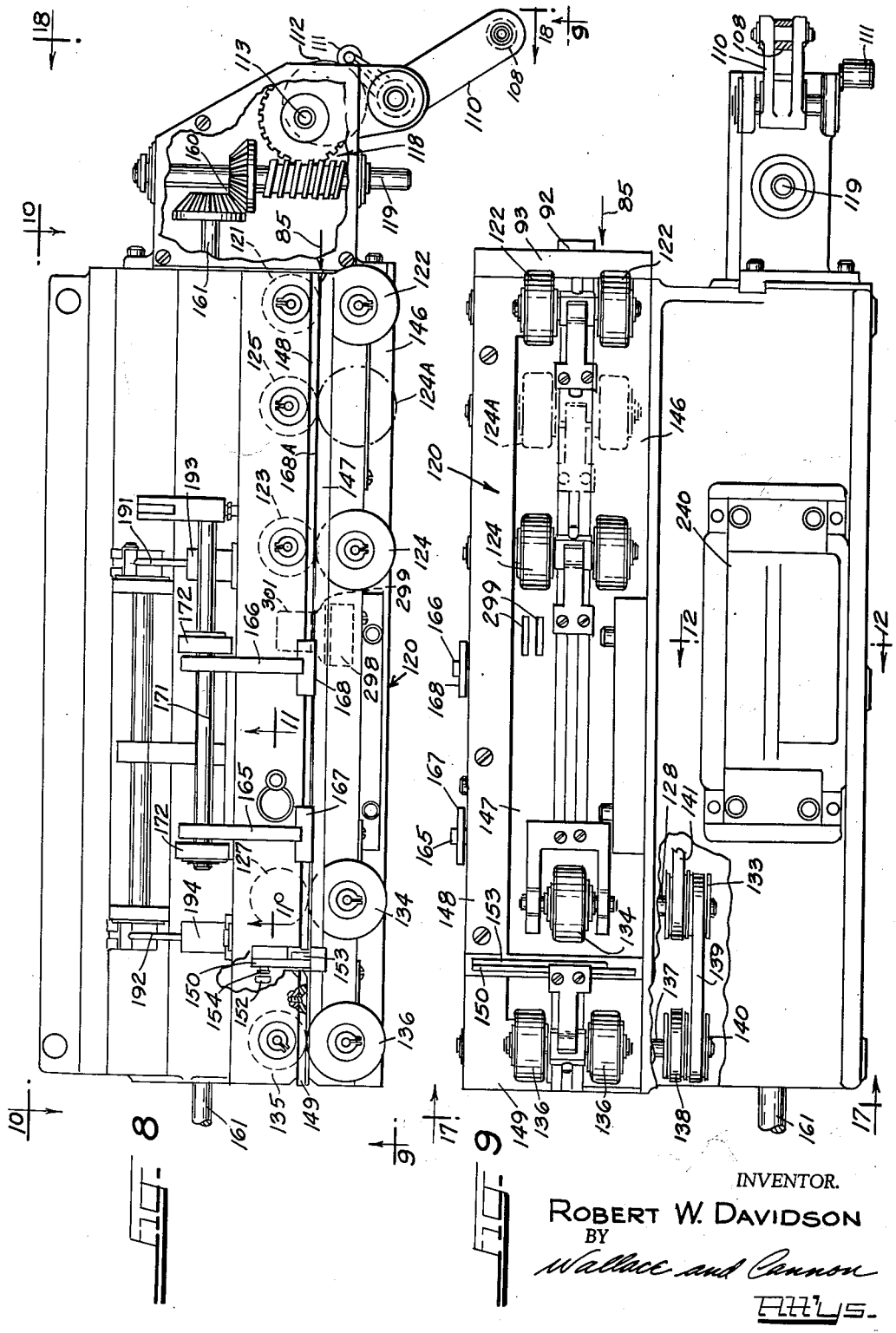

Feb. 26, 1963     R. W. DAVIDSON     3,079,146
PHOTOCOMPOSING MACHINE
Filed April 15, 1959     22 Sheets-Sheet 8
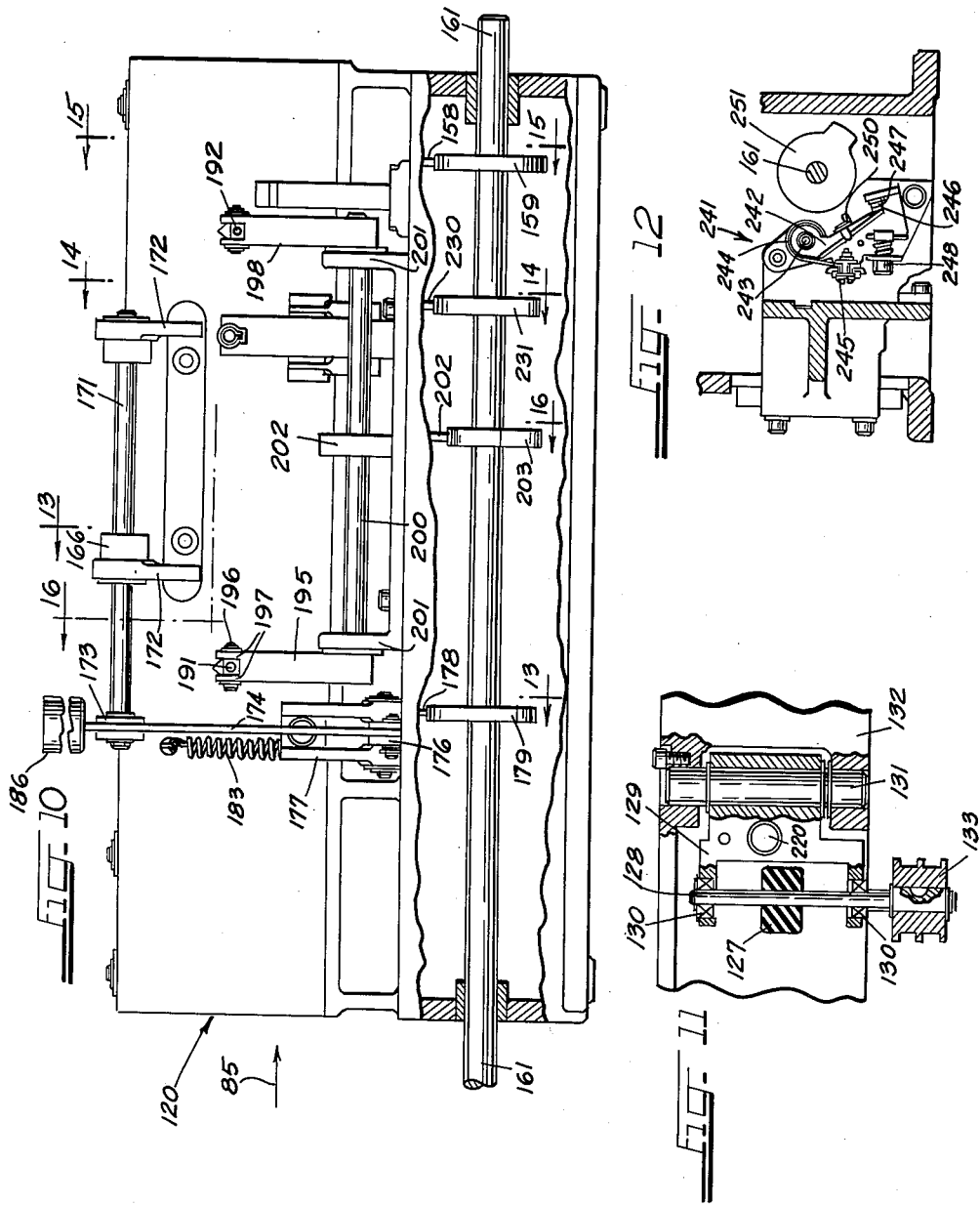
INVENTOR.
ROBERT W. DAVIDSON
BY
Wallace and Cannon
ATTYS.

Feb. 26, 1963    R. W. DAVIDSON    3,079,146
PHOTOCOMPOSING MACHINE
Filed April 15, 1959    22 Sheets-Sheet 9
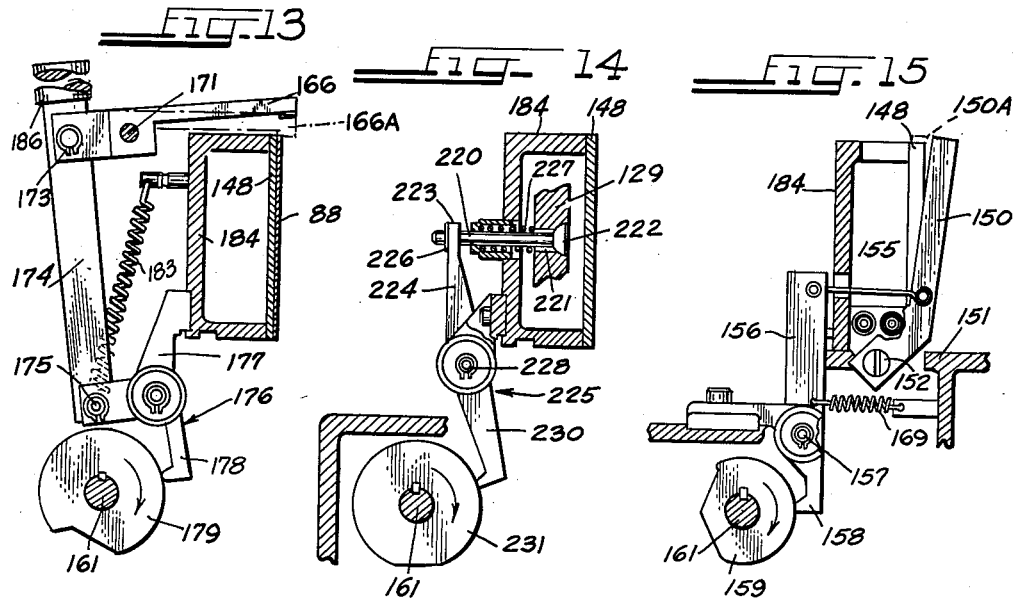
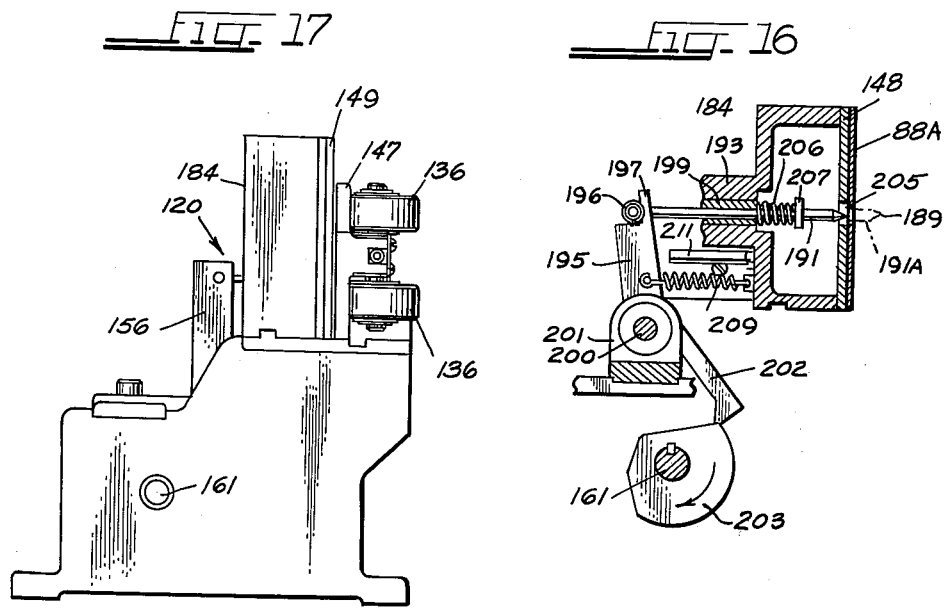
INVENTOR.
ROBERT W. DAVIDSON
BY
*Wallace and Cannon*
Att'ys.

Feb. 26, 1963 R. W. DAVIDSON 3,079,146
PHOTOCOMPOSING MACHINE
Filed April 15, 1959 22 Sheets-Sheet 10
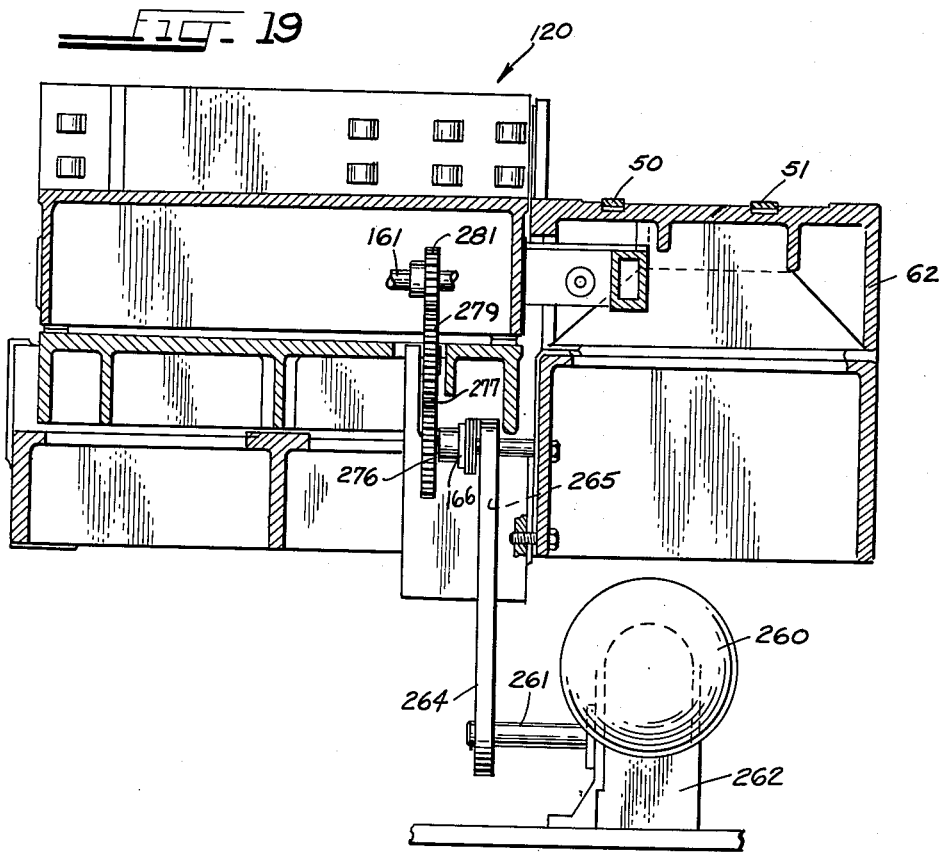
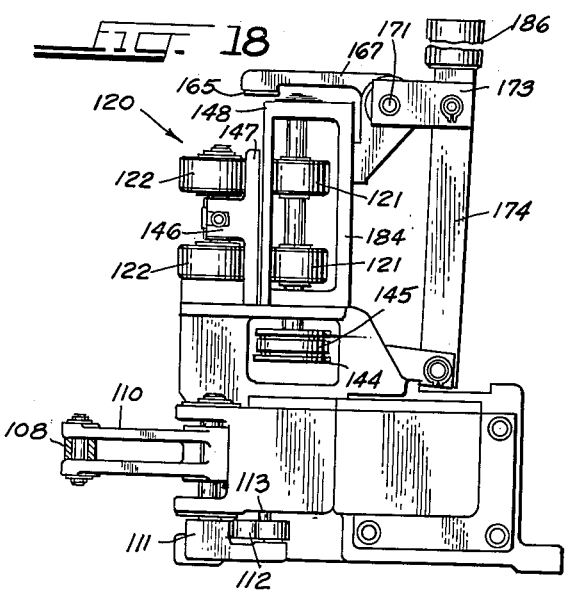
INVENTOR.
ROBERT W. DAVIDSON
BY
Wallace and Cannon
Attys.

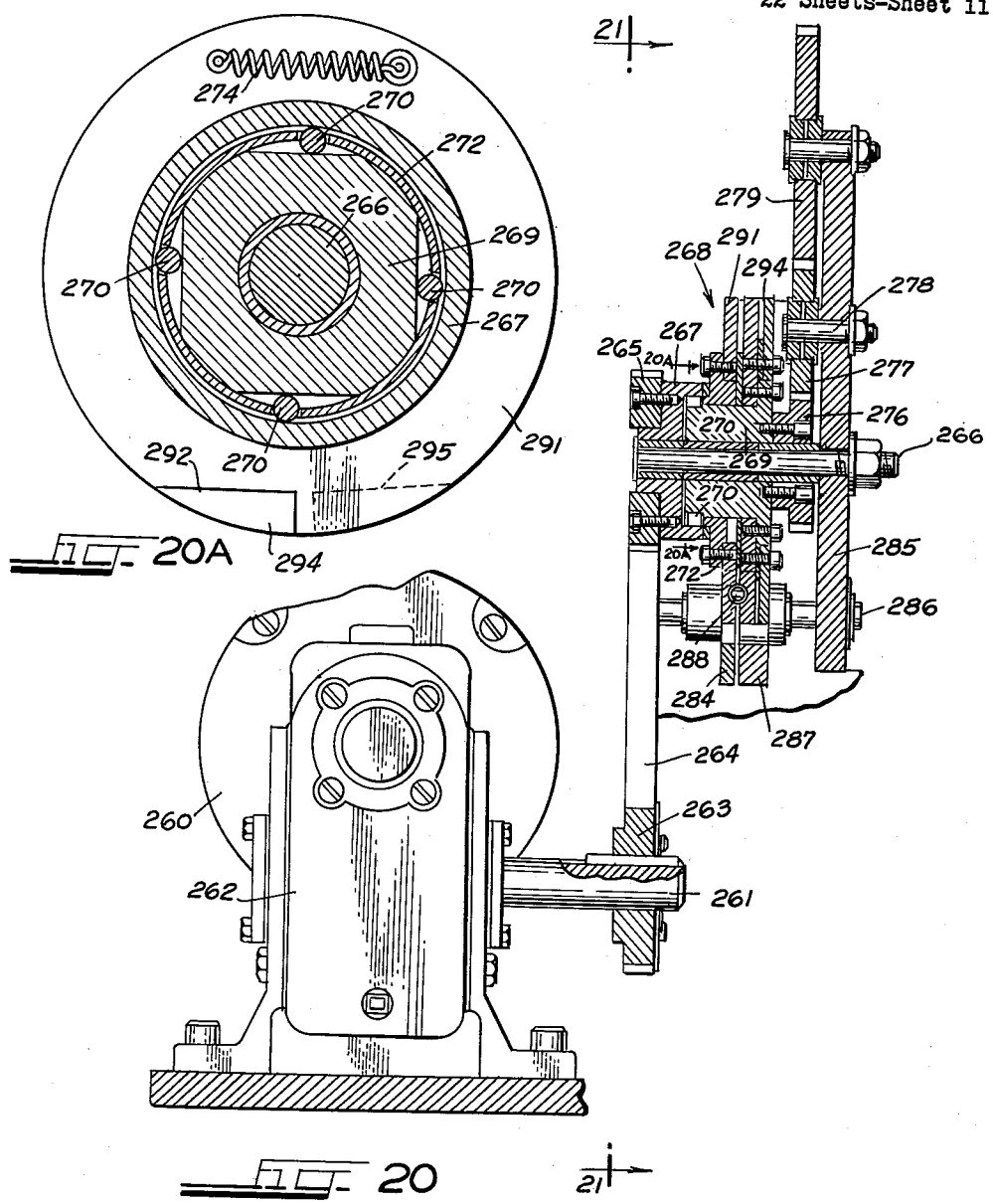

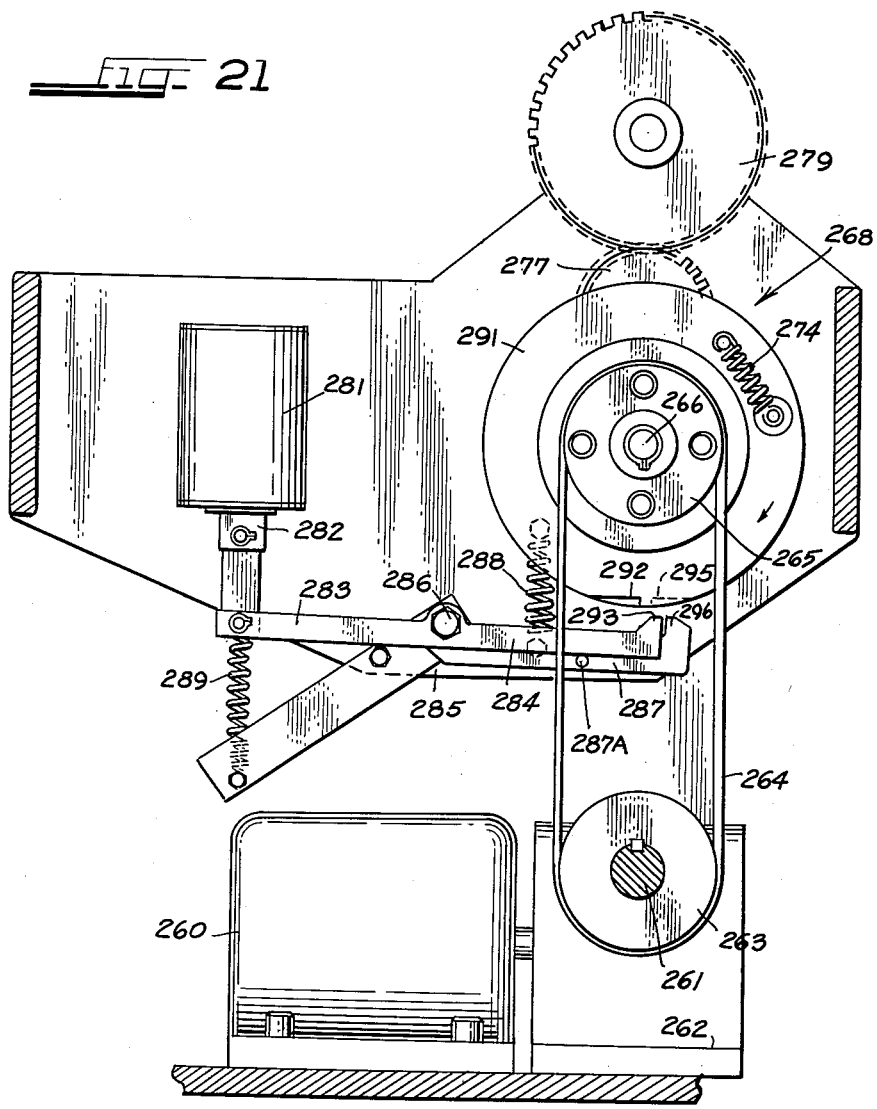

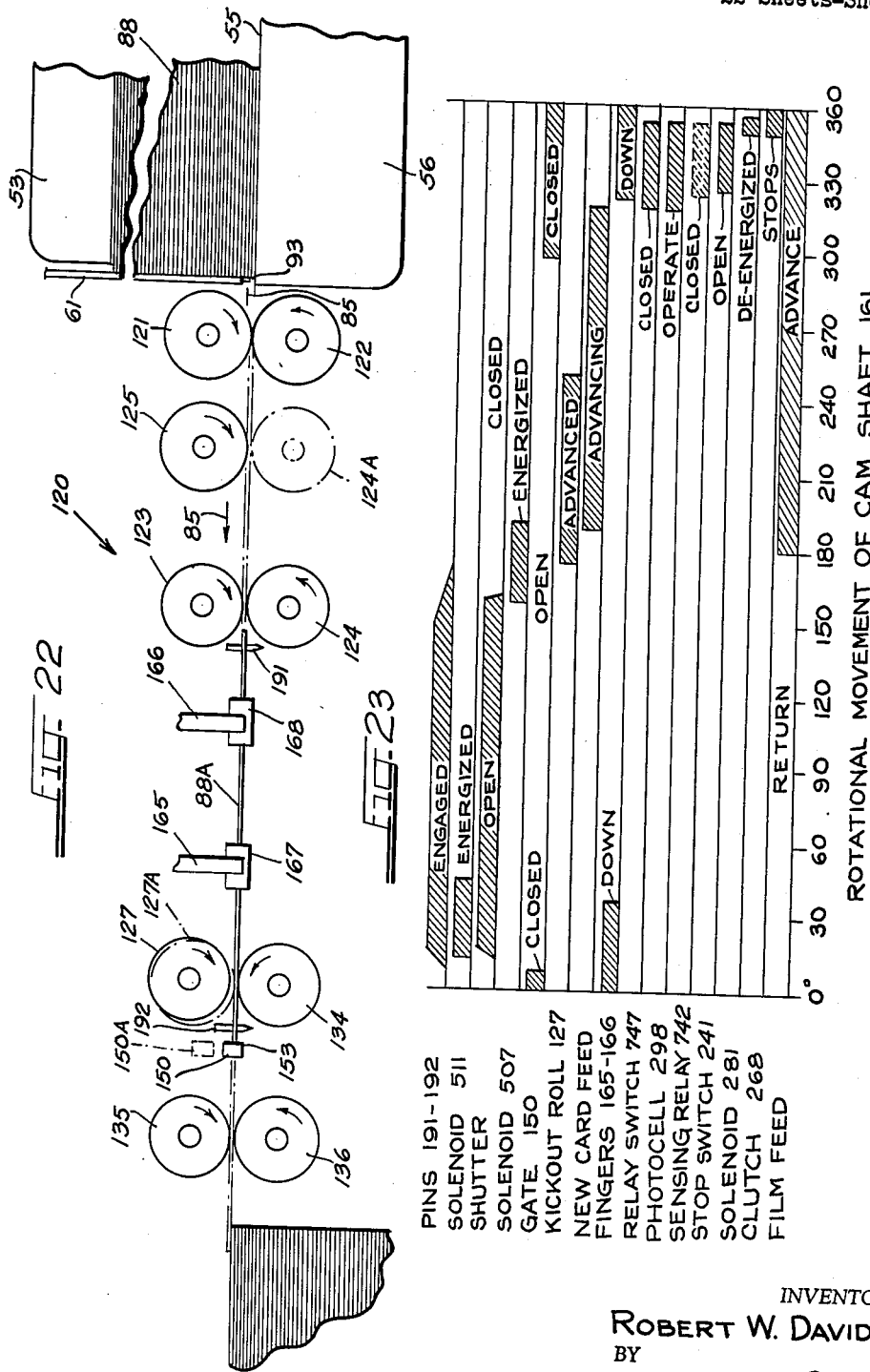

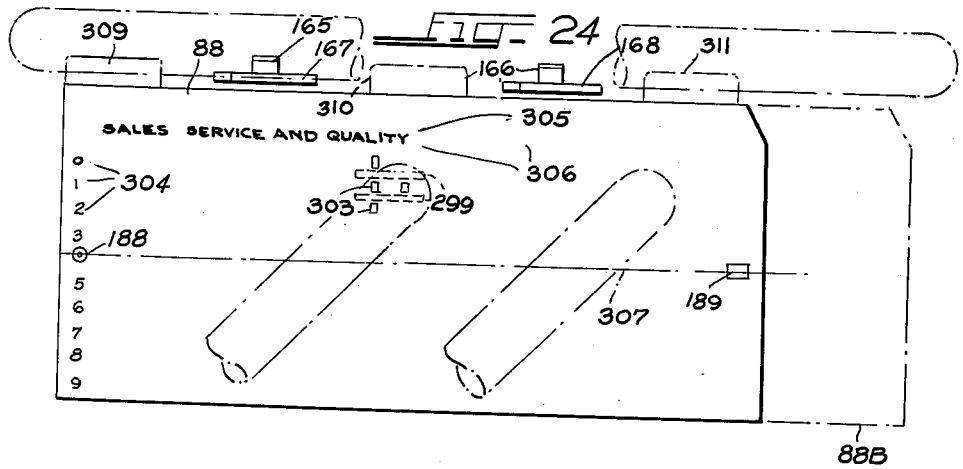
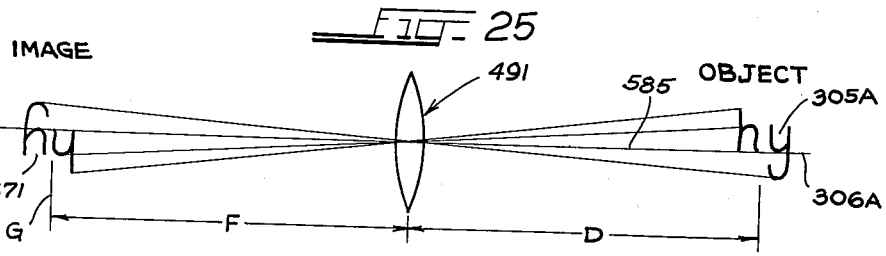
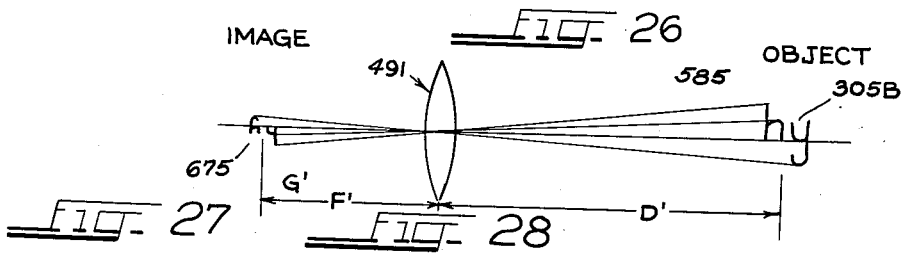
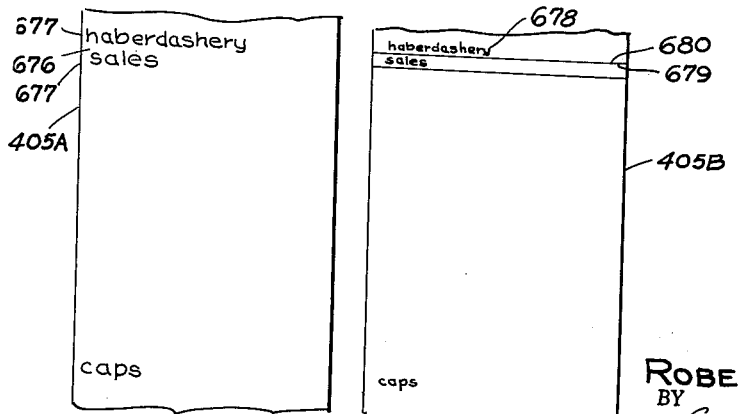
INVENTOR.
ROBERT W. DAVIDSON
BY
Wallace and Cannon
ATTYS.

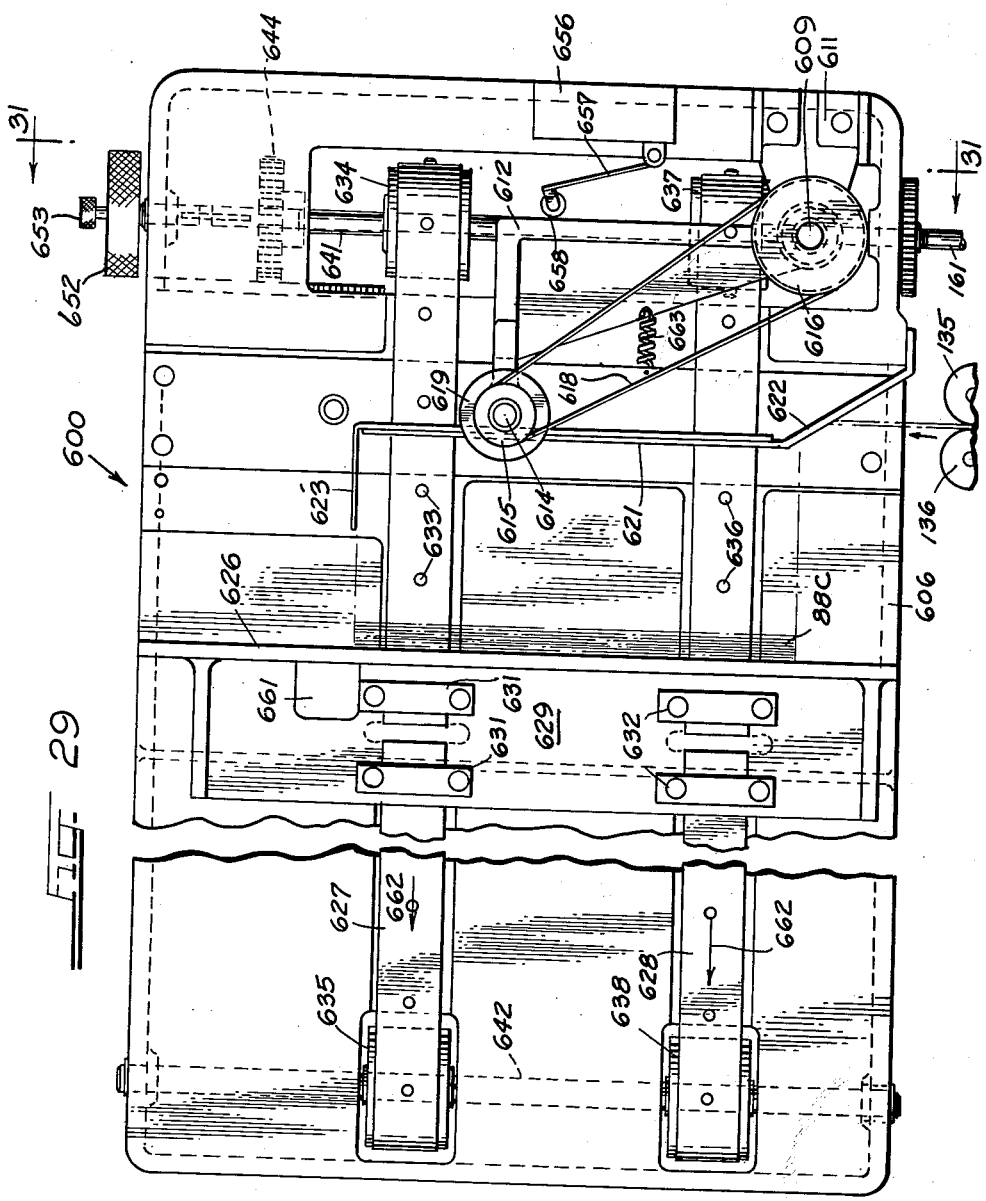

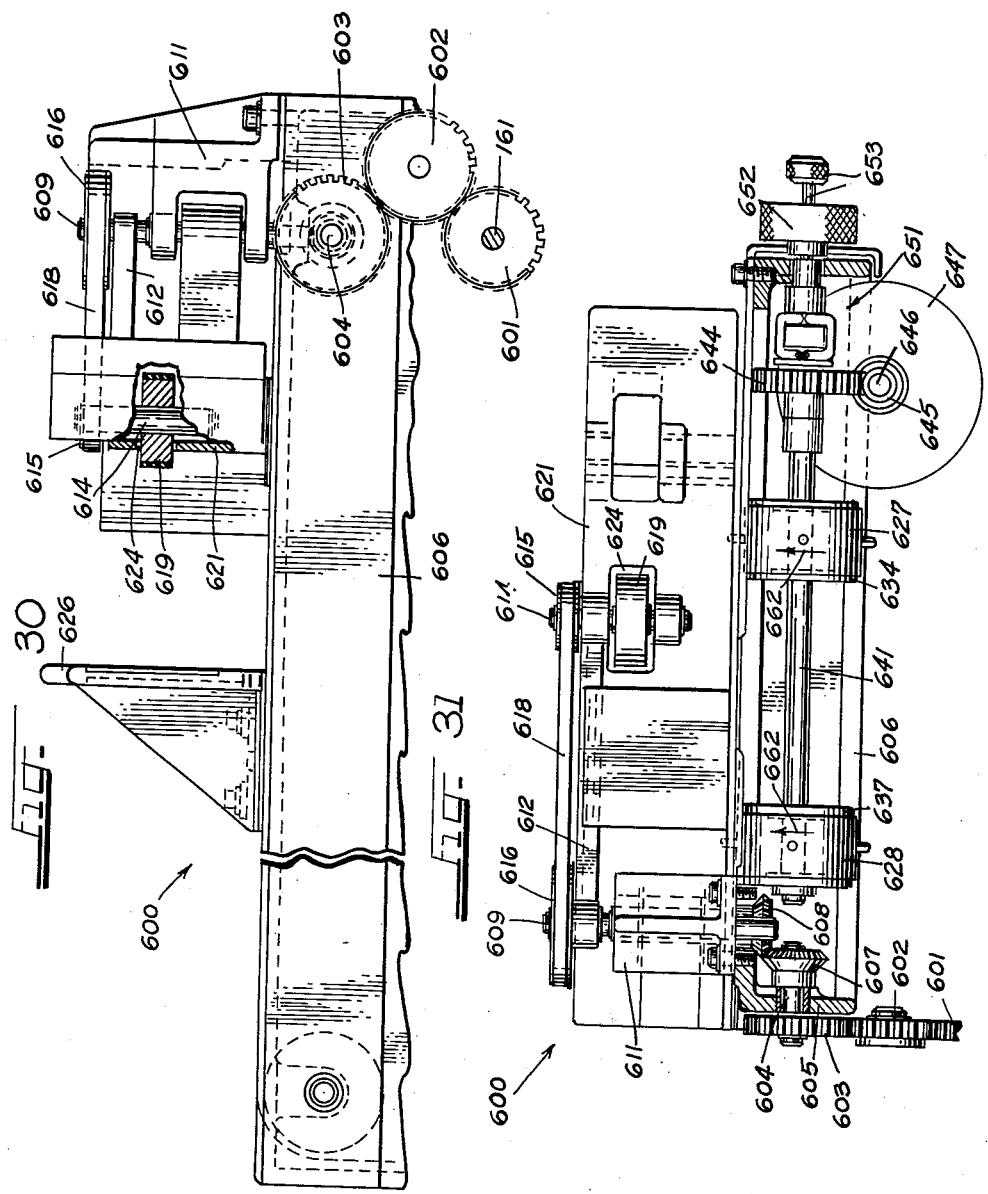

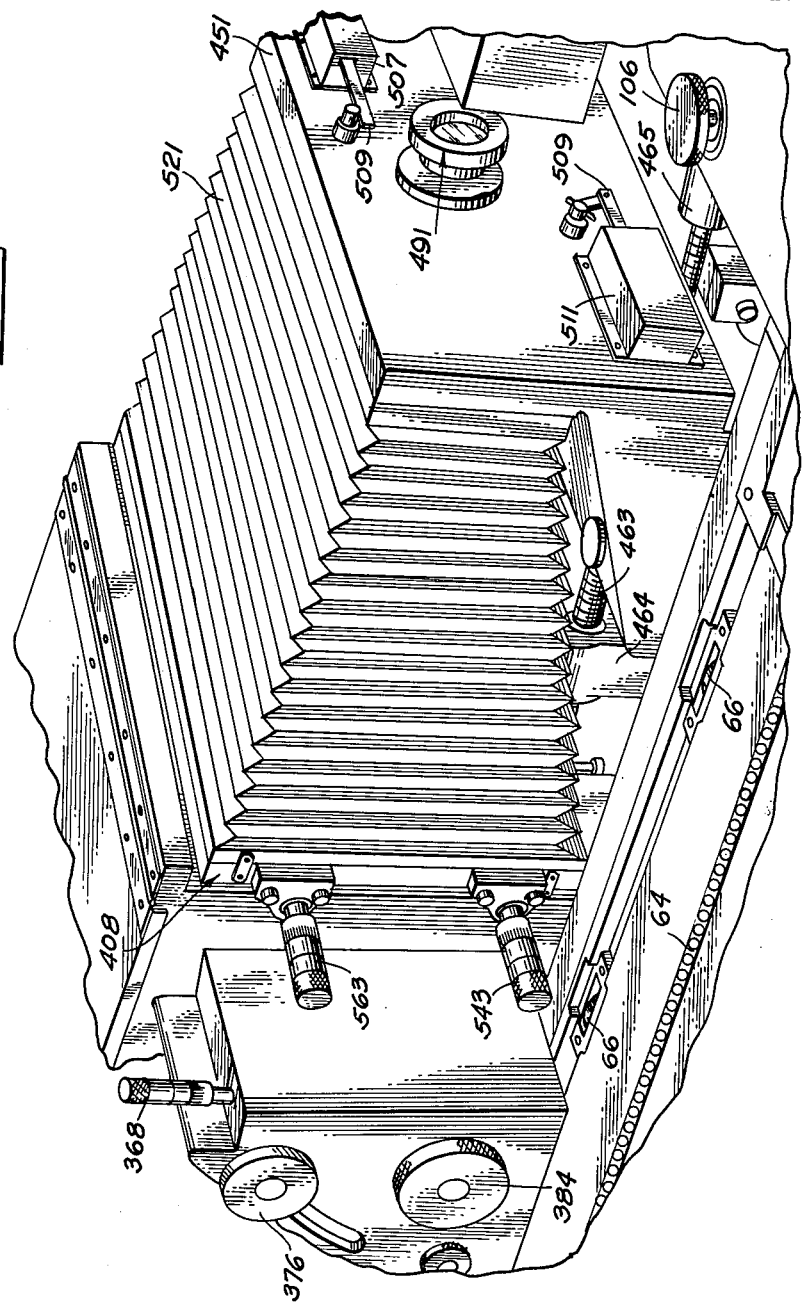

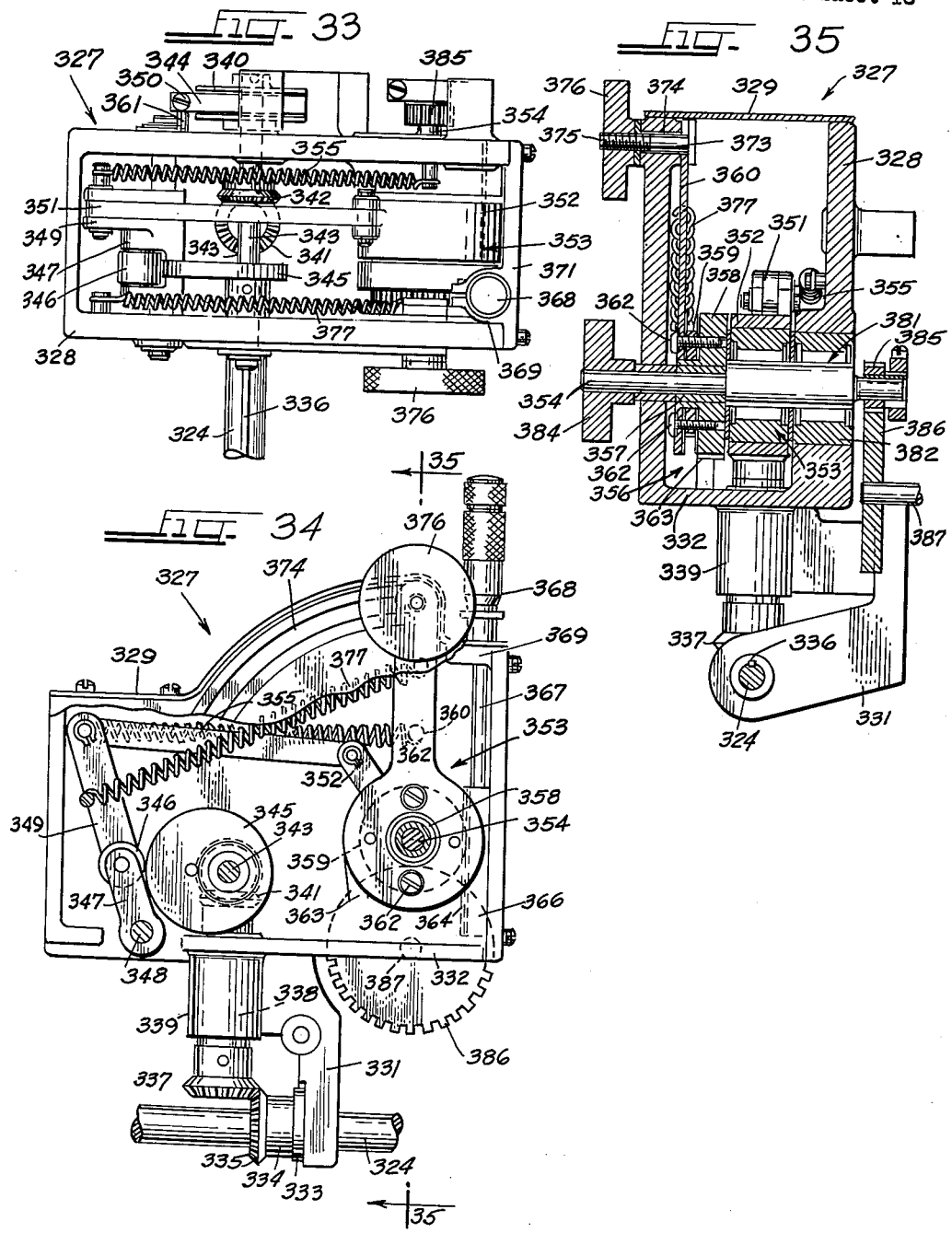

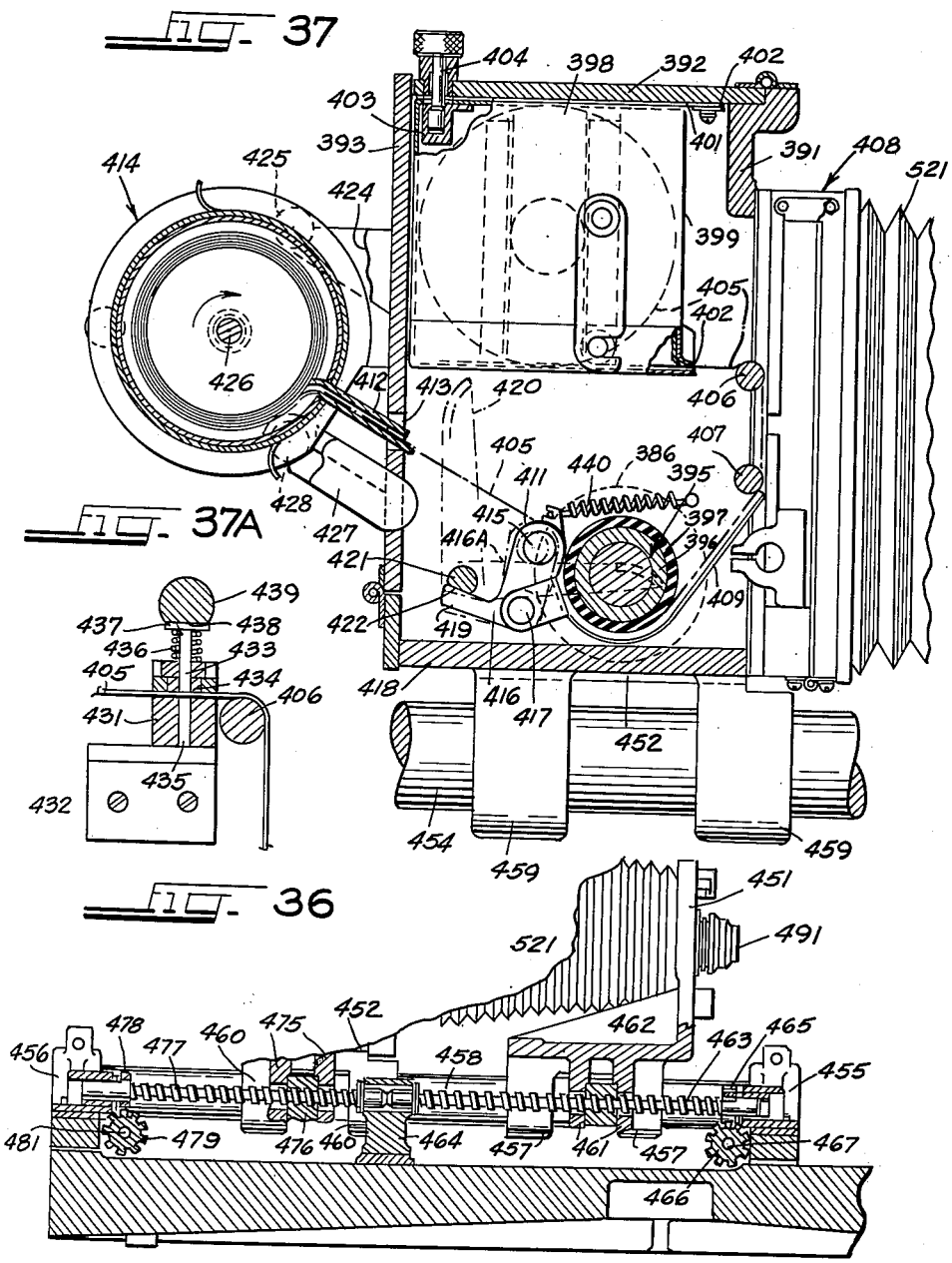

Feb. 26, 1963 R. W. DAVIDSON 3,079,146
PHOTOCOMPOSING MACHINE
Filed April 15, 1959 22 Sheets-Sheet 20
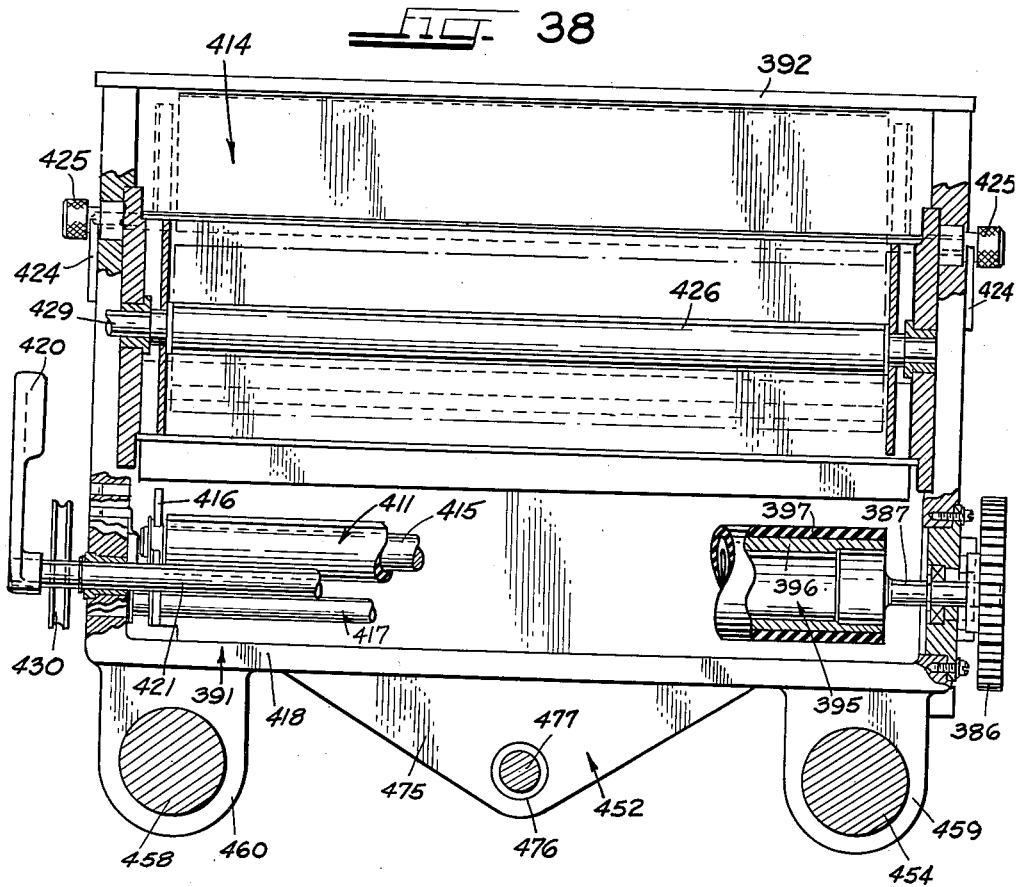
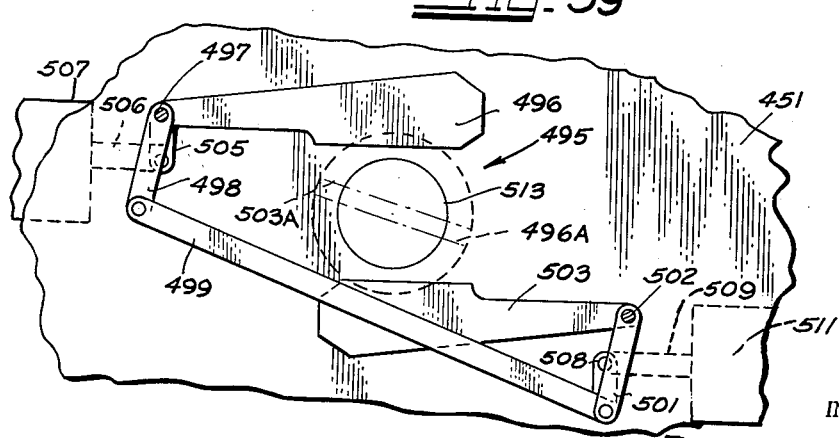
INVENTOR.
ROBERT W. DAVIDSON
BY
Wallace and Cannon
ATT'YS.

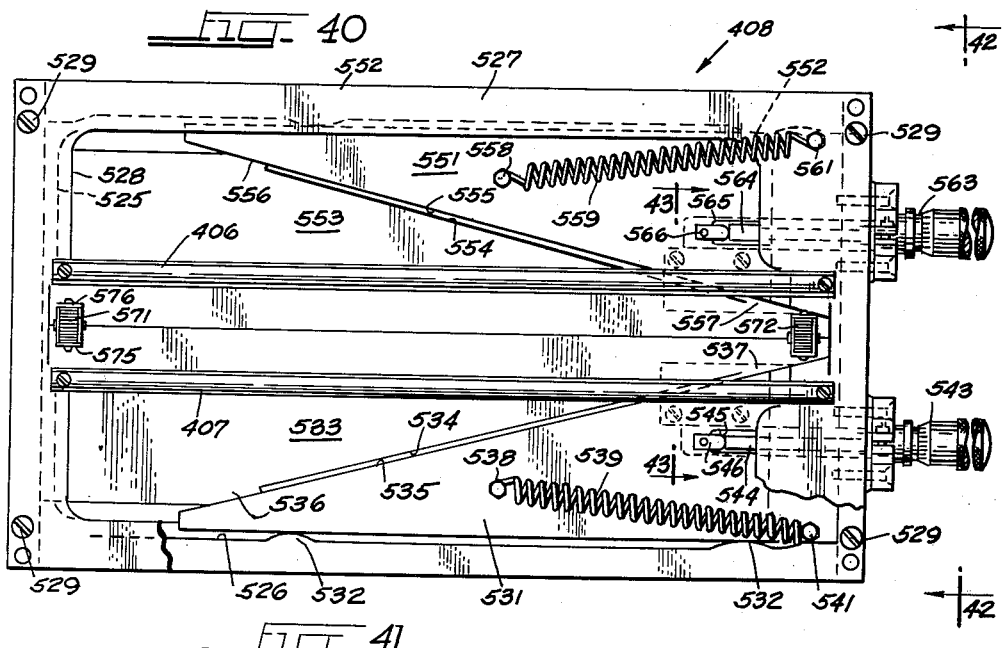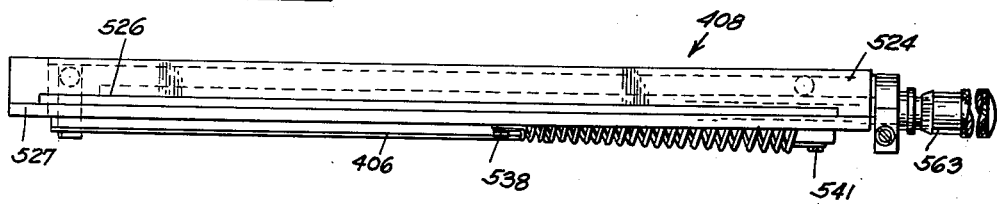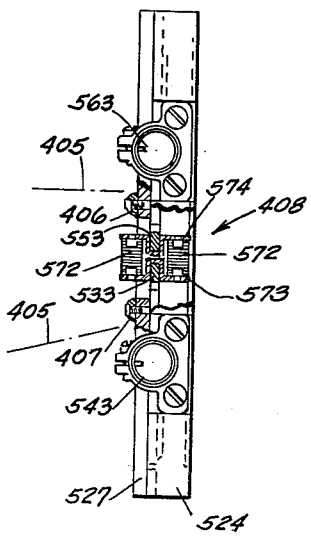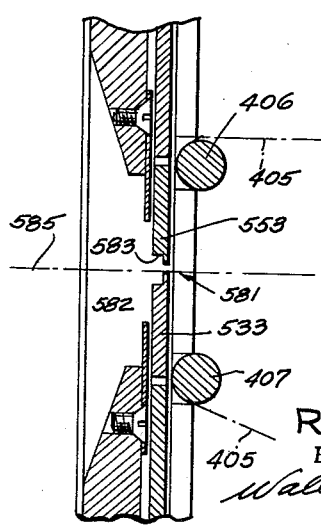

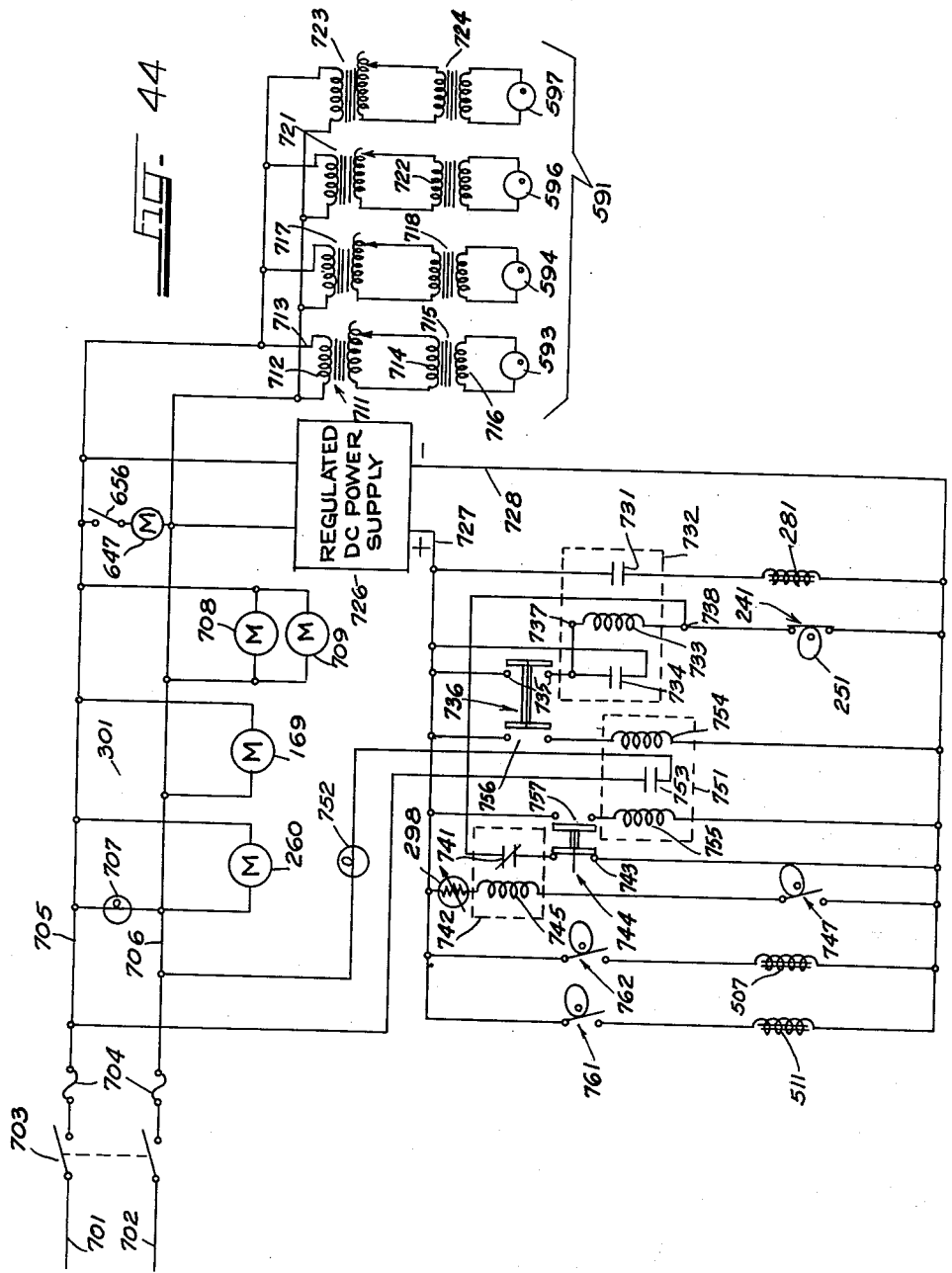

United States Patent Office 3,079,146
Patented Feb. 26, 1963

3,079,146
PHOTOCOMPOSING MACHINE
Robert W. Davidson, Wantagh, N.Y., assignor to Vari-Typer Corporation, Newark, N.J., a corporation of Delaware
Filed Apr. 15, 1959, Ser. No. 806,719
11 Claims. (Cl. 271—5)

This invention relates to a photocomposing system and more particularly to photocomposing machines for use in making up copy from data carried by individual business instruments such as record cards or the like.

The composing of printed matter by photographic processes has been found to afford substantial advantages, as compared with more conventional methods. Photocomposition is particularly advantageous in the make-up of parts lists, directories, and like matter, especially in those instances where it may be desirable to change or revise the content of the printed matter at relatively frequent intervals, although it may be applied to virtually any makeup job. In a photocomposing system, for instance, the individual items for a directory, list, or the like may be printed or otherwise applied to individual business instruments, such as conventional record cards. Usually, one line of data is applied to each record card, although in some instances two or more lines may be carried by each card. In the composing operation, the record cards are individually fed to an exposure station at which they are accurately located with respect to the lens system of a camera. The printed data carried by the cards is photographed, sequentially, upon a strip of film which is fed through the camera synchronously with the feeding of cards to and through the exposure station of the machine. Photocomposing machines of this kind are described and claimed in the co-pending applications of Edward H. Billet, Serial No. 776,662, filed November 21, 1958, now U.S. Patent No. 2,968,992; the co-pending application of Edward H. Billet and Bently Raak, Serial No. 776,663, filed November 21, 1958, now U.S. Patent No. 2,969,235.

In a photocomposing machine of this general kind, the apparatus employed to feed the record cards or other business instruments to the exposure station of the machine may be extremely important with respect to satisfactory operation of the machine. For maximum versatility, the machine should be be capable of handling standard record cards of different sizes, such as conventional 7⅜ inch and 10 inch cards. Furthermore, and particularly in those instances where relatively short items are to be composed in the machine, as in the case of parts lists, it is highly desirable that the machine be capable of handling record cards which are provided with tabs. The card feeding mechanism may be required to handle cards of varying thickness, particularly since the thickness of individual cards in a stack may vary substantially. Thus, the effective thickness of the cards may change after they have been used a number of times, since the edges of the cards may become worn and thus may change in thickness.

It is an object of the invention, therefore, to convert a photocomposing machine quickly and efficiently for operation with record cards or other business instruments of different sizes, such as standard 7⅜ inch and 10 inch record cards.

A further object of the invention is to feed individual record cards into the exposure station of a photocomposing machine, one by one, at relatively high speeds but without dual feeding of cards or jamming of cards in either the feeding apparatus or the exposure station. In the photocomposing machine of the invention, this object is accomplished, in part, by a novel knife or pusher-type feed device which does not depend on the weight of the cards and does not require a synchronized drive to move the cards into feeding position.

A further object of the invention is to provide for adjustment of the card feed mechanism of a photocomposing machine to accommodate variations in thickness of the record cards or other business instruments employed in the machine in convenient and expeditious manner, and more specifically by adjustment of a single element of the machine.

An additional object of the invention is to separate the leading cards, in a stack of record cards, from each other to a limited extent to facilitate individual feeding of the cards from the stack and into the exposure station of a photocomposing machine.

In the exposure station of the photocomposing machine, it is highly important that the individual business instruments be accurately positioned with respect to the camera apparatus of the machine. This is necessary in order to maintain individual lines or other items in the composed matter in precise alignment with each other. A high accurate and effective alignment arrangement for the cards is described and claimed in the aforementioned application of Billet, Serial No. 776,662. In alignment apparatus of this kind, however, it may be somewhat difficult to maintain continuous high speed operation unless some provision is made to compensate for "bouncing" of the record cards or other business instruments at the time that those instruments are interrupted in their movement through the exposure station in order to permit photographing thereof. Moreover, as in the case of the card feed apparatus, the positioning mechanism of the exposure station is preferably arranged to handle record cards or other business instruments of different sizes, with or without tabs attached thereto. To prevent jamming in the exposure station, the card handling mechanism thereof must provide for positive ejection of the record cards.

It is a further object of the invention, therefore, effectively to counteract the tendency of the record cards to "bounce" when they are interrupted in the exposure station of a photocomposing machine for the purpose of photographing the data carried by the cards. In the present invention, this objective is realized by means of a device which is effective to absorb the kinetic energy of the cards as they are advanced to photographing position and to prevent retrogressive movement of the cards.

A further object of the invention is to provide for convenient and effective modification of the exposure station of a photocomposing machine to accommodate record cards or other business instruments of at least two different sizes.

A further object of the invention is to position record cards or other business instruments in accurate alignment with respect to the camera apparatus of a high-speed photo-composing machine regardless of the presence or absence of tabs on those instruments.

An additional object of the invention is to feed record cards into and to eject record cards from the exposure station of a photocomposing machine by means of a drive arrangement which may be continuously operated and which does not require synchronization with the initial card-feed apparatus of the photocomposing machine or with the film-feed apparatus of the machine.

A further and related object of the invention is to eject each card, in positive manner, from the exposure station of a photocomposing machine by means of a continuously driven device which is nonetheless ineffective except during predetermined portions of each operating cycle of the photocomposing machine.

In the photocomposing machine described in the above-identified Billet application, Serial No. 776,662, a focal plane mask is utilized as an important part of the camera apparatus. This mask must be adjusted to provide an exposure gap which varies in accordance with the size of the data reproduced by the machine. In general, the exposure gap of the mask is an elongated slit between two individual mask members, and it is highly important that the spacing between these two members be maintained constant throughout the length of the gap. Furthermore, for maximum versatility in the photocomposing machine, it is highly desirable that adjustment of this gap be effected by simple and convenient means, especially where type size, line spacing, and other important aspects of the composed material may vary relatively frequently.

Another object of the invention, therefore, is to provide for simple and convenient adjustment of a focal plane mask for a photocomposing machine. More specifically, it is an object of the invention to provide for adjustment of the focal plane mask, in a photocomposing machine, by means of only two conveniently operable adjusting members which, in the preferred embodiment of the invention, may comprise relatively simple micrometer devices.

An additional object of the invention is to provide for linear adjustment of the gap in a focal plane mask, throughout the length of the gap, over a relatively wide range of mask positions.

A related object of the invention is to provide for convenient and independent adjustment of the position of the focal plane mask and lens devices of a photocomposing machine relative to the object position of a record card or other business instrument disposed in the exposure station of the photocomposing machine.

A further object of the invention is to afford a simple and easily controlled shutter mechanism suitable for use of a photocomposing machine.

In a photocomposing machine of the kind with which the present invention is concerned, it is essential that the film upon which the data is composed be advanced through the camera of the machine in precise synchronism with movement of the cards or other business instruments to and through the exposure station of the machine. On the other hand, it is equally important to provide a means to change the length of film which is fed through the camera, during a given operating cycle of the machine, in order that the machine may be adjusted to afford varying spacing between lines of composed matter as well as to accommodate different type sizes in the composed matter. Furthermore, adjustment of the film feed must be accurate and, in a given operational run of the machine, the length of film fed during each operating cycle must be held constant.

An important object of the invention, therefore, is to provide for adjustment of the length of film fed through a photocomposing machine camera during each operating cycle of the machine. A more specific object of the invention is to provide for accurate and effective modification of the length of film fed through the photocomposing machine by adjustment of a single and relatively simple device which comprises a part of the film feed apparatus of the photocomposing machine.

A related object of the invention is to change the length of the film fed through a photocomposing machine, during an operating cycle, without requiring any change or adjustment in the apparatus employed to synchronize the film feed mechanism with the card feeding apparatus of the photocomposing machine.

Another object of the invention is to adjust the length of film fed through a photocomposing machine camera, by an automatic film feed device, without affecting the accuracy and consistency of the film feed mechanism and without introducing any backlash into the film feed mechanism.

Another object of the invention is to provide for convenient loading and unloading of film into a photocomposing machine camera which includes an automatic film feed device.

Another object of the invention is to afford a convenient means for marking the film, at any desired point, in the camera of a photocomposing machine without requiring removal of the film from the camera.

Even though relatively high contrast film is preferably employed in a photocomposing machine of the kind with which the present invention is concerned, some difficulty may nonetheless be experienced with respect to overexposure or underexposure of the film. Difficulties in this area may arise from the use of record cards or other business instruments having backgrounds of varying color and shading. Moreover, continued use or aging of the cards, which may entail movement of the cards across each other in the course of card feeding operations, may reduce the blackness or intensity of the data printed or otherwise recorded thereon. In addition, difficulties of this kind may arise from changes in the light output from the lamps employed to illuminate the record cards, during photographing, as a result of aging of the lamps and other related factors.

It is an object of the invention, therefore, to provide for illumination of each record card, in the exposure station of a photocomposing machine, in a manner which effectively minimizes difficulties relating to overexposure or underexposure of the film in the photocomposing machine.

A more specific object of the invention is to arrange the illuminating lamps, in a photocomposing machine, to afford optimum lighting characteristics.

A further object of the invention is to compensate for changes in background color and shading in the record cards or other business instruments employed in a photocomposing machine and at the same time to compensate for changes in lamp characteristics.

It is a further object of the invention to provide a positive indication of the source of stoppage of a photocomposing machine in conjunction with a control circuit which may interrupt operation of the machine for a plurality of different reasons.

Other and further objects of the present invention will be apparent from the following description and claims and are illustrated in the accompanying drawings which, by way of illustration, show a preferred embodiment of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 1 is a perspective view of a portion of a photocomposing machine constructed in accordance with one embodiment of the invention and shows a part of the card feed mechanism and the exposure station of the machine;

FIG. 2A is a plan view of a major portion of the photocomposing machine, showing the camera apparatus and a part of the card feed mechanism;

FIG. 2B is a plan view of an additional part of the machine, showing the card magazine, and is an extension of FIG. 2A;

FIG. 3 is an elevation view of a major portion of the photocomposing machine, corresponding to that shown in FIG. 2A, with part of the machine cut away to show certain details of the machine;

FIG. 4 is a detail view of the card carrier apparatus of the photocomposing machine, with certain parts cut away to show structural details;

FIG. 5 is a detail plan view, partly in cross section, of apparatus employed to feed record cards or the like, individually, from the magazine of the photocomposing machine to the exposure station of the machine;

FIG. 6 is a front elevation view of the device of FIG. 5;

FIG. 6A is an enlarged detail view of the pusher or knife portion of the card feed aparatus of FIG. 5;

FIG. 7 is an elevation view of the base portion of a part of the photocomposing machine, some of the housings having been cut away to show the drive linkage for the card feeding mechanism;

FIG. 8 is a plan view of the exposure station of the photocomposing machine, showing a part of the mechanism utilized to position individual record cards or other business instruments in accurate alignment with respect to the camera apparatus of the machine;

FIG. 9 is an elevation view of the exposure station, taken approximately along line 9—9 in FIG. 8;

FIG. 10 is a further elevation view of the card feeding mechanism at the exposure station of the photocomposing machine and is taken approximately along line 10—10 in FIG. 8;

FIG. 11 is a detail sectional view, taken approximately along line 11—11 in FIG. 8, showing the kick-out roll and associated apparatus at the exposure station of the machine;

FIG. 12 is a detail sectional view, taken approximately as indicated by line 12—12 in FIG. 9, showing a cam controlled switch of a type which may be utilized to control several different functions in the operation of the photocomposing machine;

FIG. 13 is a detail sectional view taken approximately along line 13—13 in FIG. 10 and shows a part of the apparatus employed for positioning of the record cards at the exposure station of the photocomposing machine;

FIG. 14 is a detail sectional view taken approximately along line 14—14 in FIG. 10 and illustrates the control arrangement for the kick-out roll of FIG. 11;

FIG. 15 is a detail sectional view, taken approximately along line 15—15 in FIG. 10, and shows the control apparatus for a gate member utilized in positioning record cards in the exposure station of the machine;

FIG. 16 is a detail sectional view taken approximately along line 16—16 in FIG. 10 and illustrates the operating and control arrangements for a pair of locating members at the exposure station of the photocomposing machine;

FIG. 17 is an end elevation of a part of the feed mechanism for the exposure station taken approximately as indicated by line 17—17 in FIG. 9;

FIG. 18 is an end elevation of the exposure station of the photocomposing machine, taken approximately as indicated by line 18—18 in FIG. 8;

FIG. 19 is a sectional view, showing a part of the drive mechanism for feeding cards through the photocomposing machine, taken approximately along line 19—19 in FIG. 3;

FIG. 20 is a sectional view, drawn to an enlarged scale, of the main clutch and drive for the photocomposing machine;

FIG. 20A is a detail sectional view of a portion of the clutch mechanism of FIG. 20;

FIG. 21 is an elevation view of the main drive clutch of the machine, taken approximately along line 21—21 in FIG. 20;

FIG. 22 is a schematic diagram utilized to explain the feeding of record cards or other business instruments through the exposure station of the photocomposing machine;

FIG. 23 is a timing chart illustrating the sequence of certain principal operations of the photocomposing machine;

FIG. 24 shows a typical business instrument or record card which may be utilized in operation of the photocomposing machine;

FIG. 25 is an explanatory diagram illustrating the optical characteristics of the machine for one location of the lens in relation to the object and image;

FIG. 26 is a further diagram, similar to FIG. 25, which is utilized to explain operation of the machine with the lens in a different location relative to the object and image;

FIG. 27 shows a negative produced by the photocomposing machine, using the lens setting of FIG. 25 and with type of a given size on the record cards fed through the machine;

FIG. 28 shows a negative produced in the same manner as FIG. 27 but with the lens setting illustrated in FIG. 26 and using a different setting of the film feed mechanism;

FIG. 29 is a plan view of the card receiving mechanism or stacker of the photocomposing machine;

FIG. 30 is an elevation view, partly in cross section, of the stacker mechanism illustrated in FIG. 29;

FIG. 31 is a detail sectional view taken approximately along line 31—31 in FIG. 29;

FIG. 32 is a detail perspective view of the camera mechanism of the photocomposing machine;

FIG. 33 is a detail plan view of the film feed drive mechanism for the photocomposing machine, with the cover removed;

FIG. 34 is an elevation view of the film feed drive mechanism, a part of the mechanism having been cut away to show certain operating components;

FIG. 35 is a detail sectional view of the film feed drive taken approximately along line 35—35 in FIG. 34;

FIG. 36 is a detail sectional view of the camera apparatus of the machine, showing the means employed to adjust the lens and image positions of the camera relative to the object;

FIG. 37 is a further detail sectional view of the camera appartus of the photocomposing machine, showing the raw film magazine and the path followed by the film through the camera to the exposed film magazine;

FIG. 37A is a detail view showing a punch device for marking the film in the photocomposing machine;

FIG. 38 is a partial cut away view of the camera showing details of the film feed rollers and associated devices;

FIG. 39 is a detail view showing the shutter mechanism employed in the photocomposing machine;

FIG. 40 is an elevation view of the focal plane mask apparatus of the photocomposing machine as viewed from the image side thereof;

FIG. 41 is a plan view of the focal plane mask;

FIG. 42 is an end elevation of the focal plane mask taken approximately as indicated by line 42—42 in FIG. 40;

FIG. 43 is a detail sectional view taken approximately along line 43—43 in FIG. 40; and FIG. 44 is a schematic diagram of the electrical control circuits of the photocomposing machine.

*General Description*

The present invention relates to a photocomposing system and machine, as noted hereinabove, in which data is printed or otherwise applied to individual business instruments such as record cards or the like, and is subsequently assembled and composed in the form of a negative which may later be utilized in a printing process, particularly in a photolithographic printing process. The photocomposing machine preferably includes a card magazine in which a relatively large quantity of individual record cards may be stored and from which the cards are fed individually to an exposure station. In the exposure station, the cards are accurately located with respect to the lens system of a camera and are photographed in sequential manner upon a strip of film which is fed through the camera in synchronism with the feeding of cards to and through the exposure station of the machine. From the exposure station, the individual cards are fed to a receiving hopper or stacking mechanism, wherein they are re-assembled in the same order as that in which they were first placed in the magazine.

The photocomposing machine of the system is substantially automatic in its operation. That is, once operation of the machine has been initiated, the machine automatically controls and synchronizes the feeding of the cards, movement of the film through the camera, the operation of the camera shutter, and other related functions. On the other hand, the photocomposing machine may be readily and conveniently adjusted to provide for changes in the size and in other attributes of the reproduced material. For example, if the printed material on the record cards or similar instruments is ten point type, the reproduced material on the negative prepared by the machine may also be approximately equivalent to ten point type; on the other hand, the data on the negative may correspond in size to five point type or any intermediate desired type size. In fact, the size of the data on the negative, as compared with the printed material on the record cards, may be adjusted to any value within a substantial range and is not limited to standard type sizes or, indeed, to any particular number of different reproduction sizes.

The photocomposing machine of the invention is not limited to any fixed spacing between lines of type in the negative image produced by the machine, or even to a given spacing between lines for a particular type size or style. Instead, this aspect of the data reproduced on the negative may be varied, by adjustment of the machine, to any desired value within a substantial range. Moreover, the photocomposing machine of the invention provides for convenient and effective variation in the height of the exposure area on the film relative to the length of film fed through the camera in a given operating cycle to achieve a ruled effect or other effects in the reproduced copy, independently of other adjustments of the machine. The same adjustment is effective to provide for double exposure of intervening areas between adjacent exposure portions of the negative to eliminate any necessity for treatment of the negative, usually referred to as "opaquing," to eliminate defects caused by dust in the camera and related problems.

*Card Magazine and Initial Feed Mechanism*

The card magazine and initial feed mechanism of the photocomposing machine are best illustrated in FIGS. 1, 2A, 2B and 3-7. A typical form of record card which may be employed in the machine is illustrated in FIG. 24. By reference to FIGS. 1, 2A and 2B, it may be seen that the card storage and feed mechanism of the photocomposing machine M comprises a pair of elongated rails or support bars 50 and 51 which are connected together at one end by a cross rail 52 (FIG. 2A). At the opposite end of the support rails 50 and 51 from the cross rail 52, there is mounted a back-up plate or member 53, which is also mounted upon and supported by the two rails (FIGS. 2B and 4).

The back-up member or plate 53 is shown in detail in FIG. 4. As illustrated therein, the back-up member may be affixed to the rails 50 and 51 by any suitable means such as the screws 54. Means are also provided for locking the back-up plate 53 at any desired position along the base 62 of the photocomposing machine between an extended position, shown in FIG. 2B, and a position closely adjacent a face plate 55 on a part of the machine housing 56 (FIGS. 1 and 2A), as explained more fully hereinafter. The locking means is preferably relatively simple in construction and may comprise a handle 57 which encompasses and is clamped to the head 58 of a threaded member 59 to afford a means for turning the threaded member 59. The member 59 is threaded into a suitable tapped opening in a boss 60 on the back-up plate. The member 59 projects outwardly of the boss 60 toward a rail 61 which is affixed to and forms a part of the frame of the machine M. The rail 61 extends parallel to the rails 50 and 51 between the initial position of the back-up plate (FIG. 2B) and a point closely adjacent the face plate 55 (FIG. 2A). To lock the back-up plate in any desired position along the rail 61, it is only necessary to move the handle 57 from the elevated position shown in FIGS. 2B and 4 to a lowered position, moving the threaded member 59 outwardly of the boss 60 and into engagement with the rail 61. With the handle 57 in the illustrated position, on the other hand, the member 59 is disengaged from the rail 61 and the carriage 63, comprising the rails 50-52 and the back-up member 53 is free to move along the base 62 in a direction longitudinal of the rails 50 and 51.

The cross rail 52 is of the carriage 63 connected to an elongated chain or tape 64 (see FIG. 2A) which extends from the cross rail 52 over a pulley 65. A weight 68 is attached to the end of the chain 64 opposite the cross rail 52. The weight 68 and chain 64 are utilized to move the carriage 63, and hence the back-up member 53, toward the face plate 55 to feed cards into the machine as described more fully hereinafter. To facilitate movement of the carriage 63 in response to the biasing force exerted by the weight 68 on the chain 64, the rails 50 and 51 are supported upon a series of rollers 66 and 67. As clearly indicated in FIGS. 2A and 2B, the rail 50 rests upon the rollers 66, whereas the rail 51 is supported upon the rollers 67. Preferably, the construction of the rollers 66 and 67 is such that they afford relatively little friction with respect to the rails 50 and 51, so that only a small force is required to move the rail assembly toward the face plate 55. Accordingly, a relatively small weight, which may be less than one pound, may be employed to afford the required biasing force.

The construction of the face plate 55 is best illustrated in the sectional view of FIG. 5 and in FIG. 6, which affords a front elevation view of the face plate. As illustrated therein, the face plate is not of solid imperforate construction, but rather is provided with a multiplicity of openings or perforations 70 and 71 along the top and bottom edges thereof. At the center of the face plate, a shuttle or slide 72 is mounted in a suitable opening in the face plate. At one end, the shuttle 72 is provided with a series of spaced fingers 73 which are aligned with a corresponding series of openings 74 in one section 75 of the face plate. A knife or pusher member 76 is also mounted upon the slide 72, being spaced from the fingers 73. The knife 76 forms a part of a plate 77 which is provided with a further series of openings or perforations 78. A closure plate 79 is mounted on the shuttle 72 to the left of the plate 77, and also to the left of the knife 76, as seen in FIG. 6. The two plates 77 and 79 can be interchanged in their positions relative to each other to adjust the machine for operation with cards of two different standard sizes, such as standard 7.5 inch and 10 inch record cards.

As shown in FIGS. 1, 2A and 6, a guide 81 is mounted on and extends outwardly of the face plate 55 toward the back-up member 53 (FIG. 2B). In FIG. 6, the guide is shown in a location immediately to the right of the knife member 76, this location of the guide corresponding to the illustrated operating location for the knife. However, the guide may also be positioned at an alternate location, as indicated by the openings 82 in FIG. 6. This mounting position for the guide is shown in FIG. 2A. When the guide 81 is located in the holes 82, the knife member 76 is relocated, as described hereinabove, in the alternate operating position shown in FIG. 6 by the dash outline 76A. The guide 81 may be fabricated of any suitable material, but preferably is formed from a relatively resilient wire and may be mounted in the openings, such as the openings 82, simply by frictional engagement with the walls of the openings.

The construction and configuration of the knife member 76 and the slide or shuttle 72 is shown in enlarged detail in the partial cross-sectional view of FIG. 6A. As illustrated therein, the knife member 76 is secured to the plate 77 on the shuttle by suitable means such as plurality of screws 84. Immediately ahead of the knife member 76 in the direction of card movement, indicated by the arrow 85, there is mounted an inclined plane member 86, the members 76 and 86 conjointly defining a pusher notch or surface 87 for engaging a record card or other instrument such as the card 88A. The inclined plane member 86 is secured to the shuttle plate 77 by suitable means such as a series of screws 89.

Adjacent the opposite end of the shuttle 72 from the knife a second inclined plane element 91 is provided. The element 91 may be formed as a separate member, suitably secured to the face plate section 75, or may be fabricated as an integral part of the face plate itself. The inclined plane element 91 defines, with a gate element 92, a narrow gap or gate 93 through which individual record cards are fed from the mechanism of the photocomposing machine to an exposure station which is described in detail hereinafter. The gate member 92 is supported upon the rail 61, as best shown in FIG. 1, being mounted in an elongated slot or depression 94 in the surface of the rail facing the card storage magazine or carriage 63 of the machine. In the illustrated embodiment, the gate member 92 is secured to the rail 61 by means of a pair of screws 95 which extend through elongated slots 96 in the gate member and which are threaded into the rail 61, thus affording a convenient means for adjusting the position of the gate member relative to the inclined plane 91 (see FIG. 6A).

The drive mechanism for the shuttle 72 is best illustrated in FIGS. 5 and 7. As shown in FIG. 5, a support and guide rail 100 is mounted within the housing 56 and extends transversely of the housing in a direction parallel to the shuttle 72 and parallel to the direction of shuttle movement (arrow 85). The shuttle is provided with a series of bosses or mounting lugs 101 which are provided with suitable apertures for receiving the guide rail 100 and which are disposed in an encompassing engagement with the guide rail. The bosses 101 may be formed as integral parts of the shuttle 72 or may be affixed thereto in any desired manner. On the rear of the shuttle, to the left of the rail 100 as seen in FIG. 5, there is mounted a rack 102 which is disposed in meshing engagement with a segmental gear 103. The gear 103 is employed to drive the rack 102, and hence the shuttle 77, in a reciprocating motion as described more fully hereinafter. The gear 103 is pinned or otherwise suitably affixed to a vertical shaft 105. As shown in FIG. 7, the shaft 105 is preferably extended through the top of the housing 55 and is provided with a knob 106 for manual operation of the shuttle.

At the lower end of the shaft 105, a link 107 is mounted on the shaft for rotation therewith. As shown in FIGS. 2A, 7 and 8, the bifurcated end 114 of the link 107 engages a roller 108 which is mounted on one arm 110 of a bell crank device 109. The other arm 111 of the bell crank 109 comprises a cam follower and is engaged by an eccentric or cam 112 which is mounted upon a shaft 113 for rotation therewith. The shaft 113 is driven through a complete revolution during each operating cycle of the machine. The drive arrangement for the shaft 113 comprises a set of spiral gears 118 which connect a shaft 119 in driving relation to the shaft 113. The shaft 119, in turn, is driven from a cam shaft 161 through the bevel gears 160 (see FIG. 8), the gear ratios in each instance being 1:1 so that each of the shafts 113 and 119 rotates through one revolution for each revolution of the cam shaft 161.

The interior of the housing 56 is completely enclosed except for the openings 70 and 71 in the face plate 55 thereof, the openings in the shuttle 72 and shuttle plate 77 (see FIG. 6), and a further opening 115 in the base member 62 (see FIG. 5), which affords a means for connecting a conduit (not shown) to the interior of the housing 56 (see FIG. 5). A suitable air pump or blower 116 (FIG. 3) is connected to the opening 115 in the base of the housing 56 and is used to exhaust air from the housing so that the housing comprises a vacuum chamber, the vacuum being effective to pull a record card or other business instrument into contact with the face plate 55 and the shuttle 72. The blower 116 may be of conventional construction and may comprise an ordinary centrifugal air pump or other suitable device. Moreover, one or more additional apertures are preferably provided in the base member 62 and are located immediately in front of the face plate 55, as illustrated by the apertures 117 in FIGS. 1 and 2A. Means are provided for blowing air upwardly through the openings 117 to assist in separating the record cards from each other and to facilitate feeding of the cards into the exposure station of the photocomposing machine. The same blower 116 as is used in connection with the vacuum chamber housing 56 may be connected by suitable conduits, not shown, to the openings 117 for this purpose.

When the photocomposing machine M is placed in operation, a stack of cards is first located in and supported upon the carriage 63 in the magazine portion of the machine. The cards are stacked on edge and are disposed in facing relation to the face plate 55 of the vacuum housing 56. The end of the stack most remote from the face plate 55 is engaged by the backup member 53. When the cards are first placed on the carriage, the backup plate 53 may be effectively locked in a position, relative to the face plate 55, such that the cards may be conveniently stacked in the desired alignment with respect to the face plate. With the cards thus generally positioned on the carriage 63, the latching arrangement shown in FIG. 4 is released from engagement with the rail 61, permitting the carriage to move toward the face plate 55 in response to the biasing force applied thereto by the weight 68 and the chain or tape 64. Under these conditions, the backup member 53 moves toward the face plate 55 until further movement is prevented by the stack of cards interposed between the backup member and the face plate. The operative relation of the backup member 53, the face plate 55, the rail 61, and the housing 56 is illustrated in the schematic diagram of FIG. 22, in which the record cards are generally indicated by the reference numeral 88.

As the stack of cards moves toward the face plate 55, the cards nearest the face plate are guided into accurate alignment therewith by the guide member 81, the opposite edges of the cards being engaged by the guide member 81 and the side rail 61. Air is blown upwardly through the openings 117 and into the leading portion of the card stack. The air blown into the stack through these openings tends to separate the cards in the leading portion of the stack from each other and is of substantial assistance with respect to individual feeding of cards from the stack and into the exposure station of the machine. The foremost card in the stack, on the other hand, is drawn into intimate contact with the face plate 55 and the shuttle 72 by the partial vacuum developed in the vacuum chamber or housing 56. As each card is fed from the stack, a new card is drawn into contact with the face plate 55 and the shuttle 72, replacing the card which has been fed into the exposure station of the machine. Moreover, the advancing movement of the stack brings succeeding portions thereof over the openings 117 (FIG. 1), so that air is blown between adjacent surfaces of the cards immediately before the cards reach the feeding position against the face plate 55.

Of course, as each card is fed from the stack, the carriage 63 advances in response to the biasing force afforded by the weight 68 and its connection to the carriage. By using the support rollers 66 and 67, which afford relatively low friction with respect to the rail 50 and 51 of the carriage, the drag on the carriage is minimized. Moreover, it should be noted that the weight of the cards is supported entirely by the carriage and that the cards do not engage in frictional contact with the base of the magazine portion of the photocomposing machine. Consequently, there is little or no tendency for the carriage to hang up, and the cards are moved forward smoothly and evenly each time a card is fed from the stack.

In FIGS. 5 and 6A, a single card 88A is shown in feeding position, engaging the shuttle 72 and the face plate 55. As best shown in FIG. 6A, one end edge of the card is engaged in the notch 87 formed by the inclined plane member 86 and the knife or pusher member 76. The opposite end of the card is in contact with the inclined plane element 91. During each operating cycle of the photocomposing machine, the shuttle 72 is driven transversely of the face plate 55, in the direction indicated by the arrows 85. Accordingly, in each operating cycle, a card such as the card 88A is driven along the inclined plane member 91 and through the gap 93 into the exposure station of the photocomposing machine. As the card enters the exposure station, it is engaged by further feed devices and pulled completely into the exposure station, as described more fully hereinafter. As the card leaves the carriage 63, the carriage advances an incremental distance approximately equal to the thickness of one card and positions a new card in engagement with the face plate 55 and the shuttle 72.

The width of the gate aperture or gap 93 is adjusted to permit unimpeded movement of a single card through the gate, but is also made narrow enough to prevent simultaneous feeding of two cards to the exposure station. Using record cards of conventional thickness, the gap 93 may be adjusted to a width of approximately 0.009 inch. Once the gap is properly adjusted, it need not be changed during a given operational run of the machine M. On the other hand, when the cards have been used a substantial number of times and have become somewhat enlarged at the edges, or when thicker cards are used, it may be necessary to widen the gap 93 to some extent to accommodate the effective increase in thickness of the cards. This adjustment is effected by loosening the screws 95 and moving the gate member 92 longitudinally with respect to the screws to effect the desired adjustment in the gate or gap 93, after which the screws 95 are again tightened to hold the gate member 92 in adjusted position.

The use of the two inclined plane elements 86 and 91 is highly advantageous in preventing jamming of the machine at the gate 93. If the surfaces of the shuttle plate 77 and the face plate section 75 are made substantially planar, there may be some tendency for the stack of record cards, and particularly the leading card, to bow away from the face plate 55. This bowing or bending of the cards tends to prevent engagement of the lead card, at least in the central portion thereof, with the face of the shuttle 72 and with the face plate 55, with the result that, during the feeding operation, the leading card may tend to jam in the gate 93. The two inclined planes afforded by the members 86 and 91 effectively counteract any tendency of the cards to bow away from the face plate of the vacuum housing 56 by engaging the edge portions of each card as the card moves into position adjacent the face plate, thereby bowing the card toward the face plate 55 and preventing jamming or other malfunctioning of the machine which might otherwise result.

The cyclic feeding of the record cards from the carriage 63 is effected by the drive linkage connected to the shuttle 72 and comprising the rack 102 and the gear 103. In each operating cycle of the machine the cam or eccentric 112 is rotated through a complete revolution, thereby effecting a reciprocating pivotal movement of the crank 109. This pivotal reciprocation of the crank effects a similar reciprocal pivotal movement of the shaft 105, since the shaft is effectively connected to the crank by means of the bifurcated lever 107 and the roller 108. Thus, in each operating cycle of the machine, the gear 103 is pivoted from an initial or inactive position, as shown in solid lines in FIG. 5, to an actuated position illustrated by the dash outline 103A, and back again. The reciprocating pivotal movement of the gear 103 is effective to move the rack 102, and hence the shuttle 72, first in the direction indicated by the arrow 85, and then in the opposite direction back to its initial position. The sliding movement of the shuttle is effectively guided by engagement of the bosses 101 on the shuttle with the guide rail 100. During this reciprocating movement of the shuttle the interleaved relationship of the fingers 73 on the shuttle and the slots 74 in the face plate portion 75 prevent the cards from becoming jammed by being pinched between the shuttle and the face plate.

*The Exposure Station*

The exposure station 120 of the photocomposing machine and the card positioning apparatus associated therewith are best shown in FIGS. 1, 2A, 3 and 8–22. As described hereinabove, the individual record cards are fed by the pusher or knife member 76 on the shuttle 72 through the gap or gate 93 at the end of the gate member 92 (FIG. 9). The direction of card feed remains the same through the exposure station 120 and is indicated in FIGS. 8–10 and 22 by the arrows 85. As each card passes through the gate, it is engaged between a first pair of drive rollers 121 and a corresponding pair of idler rollers 122. In the illustrated embodiment, the rollers 121 are steel rollers, whereas the rollers 122 are preferably fabricated from rubber or other high friction material, although the particular arrangement of rollers is not essential to operation of the machine. The rollers 121 are continuously rotated and are effective to continue the movement of the card, in the direction indicated by the arrows 85, into the exposure station 120 of the machine.

The exposure station 120 of the photocomposing machine further includes a second set of driven feed rollers 123 which are disposed immediately opposite a corresponding pair of idler rollers 124. The rollers 124 are removably mounted in the exposure station and may be moved from the location shown in solid lines in FIGS. 8, 9 and 22 to the alternate location illustrated by the dash outlines 124A in those figures. A pair of additional driven rollers 125 (FIGS. 8 and 22) are provided at the exposure station and are utilized, in conjunction with the rollers 124, for record cards of relatively large size, whereas the rollers 123 are effective in this regard for a smaller card size as explained more fully hereinafter. With the exposure station rollers arranged as shown in solid lines in FIGS. 8 and 9, the rollers 123 and 124 define the right-hand edge of an exposure position or "pocket" in which the record cards are located immediately prior to being accurately positioned, by means described hereinafter, for photographing.

To the left of the feed rollers 123, as shown in FIGS. 8, 9 and 22, there is provided an additional driven roller 127 which operates as a kickout roller for removing the record cards from the exposure station 120. The mounting of this kickout roll is best illustrated in FIG. 11. As shown therein, the roller 127 is mounted upon a vertical shaft 128, which is supported in a bracket 129 by suitable means such as the bearings 130. The bracket 129, in turn, is pivotally supported upon a shaft 131, which is mounted in one frame member 132 of the exposure station of the machine, to provide for pivotal movement of the kickout roll toward and away from an idler roll 134 (see FIGS. 8 and 22). The lower end of the shaft 128 is provided with a double pulley 133 for driving the roller 127.

One further set of drive rolls is provided in the exposure station 120 of the photocomposing machine. This set of rollers is located beyond the exposure position and comprises a pair of drive rollers 135 and a corresponding pair of idler rollers 136. The drive rollers 135 are mounted upon a vertically extending shaft 137, shown in the cut-away portion of FIG. 9. A first timing belt or other suitable drive belt 138 is utilized to rotate the shaft 137, and hence the rollers 135, the drive arrangement for the belt 138 being described in detail hereinafter. A second timing belt, chain or other suitable drive member 139 connects the pulley 140 on the shaft 137 with the pulley 133 on the kickout roll drive shaft 128. Thus, the kickout roll 127 is continuously driven and, since the pulleys are of approximately the same size, the speeds of the rollers 127 and 135 are approximately equal. A further drive belt 141 provides a drive connection to the feed rollers 123, and similar drive arrangements are utilized for the feed rollers 125 and 121. In this manner, all of the feed rollers for the exposure station are operated at a substantially constant and equal speed. The mounting and drive arrangement for the initial feed rollers 121 is best illustrated in FIG. 18. As shown therein, the feed rollers 121 are mounted on a vertical shaft 143 which, at its lower end, is provided with a pulley 144 which is engaged by the final drive belt 145 in the driving arrangement for the rollers. All of the idler rollers are preferably mounted on a frame member 146 and project through suitable slots or openings in a face plate or guide member 147 on the frame member. The face plate 147 co-operates with two additional guide members 148 and 149 to guide the movements of the cards intermediate the drive and idler rolls.

There is no need to synchronize rotation of any of the drive rollers 121, 123, 125, 127, or 135 with the operation of the other positioning devices of the exposure station 120, (described hereinafter). Instead, the drive rollers are operated continuously, and may be driven entirely independently of the positioning devices, as by a separate motor 169A (FIG. 2B) which may be utilized to drive a timing belt, chain, or like drive member 170. The belt 170 engages and rotates a pulley which is also engaged by, and drives, the drive belt 138. Of course, any other suitable drive arrangement may be utilized, so long as the drive rollers of the exposure station 120 are rotated fast enough to maintain the time relationships for card movements described hereinafter, particularly in connection with the timing chart of FIG. 23.

The exposure station 120 is provided with a gate mechanism which defines the left-hand limit of the general exposure position or pocket in the exposure station, as seen in FIGS. 8 and 9. This gate mechanism is shown in detail in FIG. 15, and some parts of the gate arrangement are also shown in FIG. 10. The gate mechanism comprises a gate member 150 which is pivotally mounted upon a base member 151 in the exposure station of the machine, the pivot point for the gate member being indicated in FIG. 15 by the reference numeral 152. The side of the gate member 150 facing the oncoming record cards is provided with a pad 153 of a relatively resilient material, such as felt or the like, which is removably mounted upon the gate member. For example, the pad 153 may be fabricated from a relatively hard felt of cotton or other fiber and may be coated with a plastic or other material, such as a polytetrafluoroethylene resin, to afford a surface which can withstand a substantial amount of wear. Further resilience in the gate structure may be provided by mounting a spring 154 on the pivot pin 152 between the head portion thereof and the gate member 150 on the side of the gate member opposite the oncoming card (see FIG. 8). The use of the resilient pad 153 and the spring 154 is occasioned primarily by the necessity of absorbing the kinetic energy of the moving card as it enters the exposure station.

As shown in FIG. 15, the gate member 150 is connected by a link 155 to an actuating lever 156 which is pivotally mounted upon the frame of the exposure station as indicated by the reference numeral 157. The end of the actuating lever 156 opposite the link 155 is provided with a cam follower portion 158 which is aligned with a cam 159, the cam being keyed or otherwise affixed to the cam shaft 161. A spring 169 biases the lever 156 toward engagement with the cam 159. The cam shaft 161 extends transversely of the exposure station 120, as indicated in FIGS. 9 and 10, and is driven in a clockwise direction as seen in the several views of FIGS. 13–16. The gate 150 is moved, by engagement of the cam 159 with the cam follower 158, between a blocking or card interrupting position, as shown in solid lines in FIG. 15, and an actuated or card freeing position as illustrated by the dash outline 150A. This movement of the gate 150 occurs during each separate operating cycle of the photocomposing machine, as described in detail hereinafter.

The exposure station 120 is also provided with a mechanism for correcting undesired dislocation of the cards upwardly of the exposure position, this apparatus being best shown in FIGS. 8–10, 13 and 18. The vertical positioning apparatus comprises a pair of levers or fingers 165 and 166 which are preferably provided with a pair of transverse card-engaging elements 167 and 168, respectively, at the ends thereof. As best shown in FIG. 8, the elements 167 and 168 are located directly over the slot 168A, between the exposure station guide members 147 and 148, through which the record cards travel. Moreover, the tamping or positioning elements 167 and 168 are disposed between the feed roll 123 and the kickout roll 127 and are thus located immediately above the exposure position for the cards. The elements 167 and 168 are located at positions in which they avoid engagement with tabs on the cards 88, as described hereinafter.

The two fingers or levers 165 and 166 are affixed to a common shaft 171 which is journalled in suitable brackets, such as the brackets 172 (see FIGS. 8 and 10). At one end of the shaft 171, a lever 173 is affixed to the shaft. The lever 173 is pivotally connected to an operating link 174 which extends substantially vertically and which is pivotally connected, at its other end, to one arm 175 of a bell crank 176. The bell crank 176 is pivotally mounted upon a bracket 177 and the remaining arm 178 of the crank comprises a cam follower which is aligned with and engages an operating cam 179. The cam 179 is affixed to the cam shaft 161 for rotation therewith, being keyed or otherwise suitably secured to the shaft. A spring 183 is connected to the link 174 and to a frame member 184 of the exposure station. The spring 183 normally biases the link 174 in a direction tending to pivot the shaft 171 in a clockwise direction, as seen in FIG. 13, and thus tends to move the fingers 165 and 166 downwardly toward the position illustrated by the dash outline 166A in FIG. 13. With the cam 179 in the position illustrated in FIG. 13, however, the pivotal linkage comprising the crank 176 and the links 174 and 173 is effective to maintain the tamping or positioning fingers 165 and 166 in their elevated or inactive position. A knob 186 is preferably affixed to the upper end of the link 174 to provide for manual movement of the fingers 165 and 166 to their elevated or inactive position when the machine is first placed in operation, as described in detail hereinafter.

Each of the record cards, such as the card 88 illustrated in FIG. 24, is provided with a pair of apertures 188 and 189, the preferred arrangement for the apertures being set forth in detail hereinafter. These apertures 188 and 189 are utilized to effect the final and accurate positioning of the record card in the exposure station 122 of the photo-composing machine. The positioning mechanism which cooperates with the card apertures is best illustrated in FIGS. 8, 10 and 16. This final positioning apparatus comprises a pair of locating pins 191 and 192 which extend through suitable apertures in a pair of brackets 193 and 194 (FIG. 8) on the frame member 184. The brackets 193 and 194 may be fabricated as separate members and mounted on the frame member 184 by suitable means, or they may be formed as integral parts of the frame member.

One end of the locating pin 191 is pivotally connected to a lever 195, the pivotal connection being such that limited vertical movement of the lever with respect to the pin is also permitted. A typical mounting arrangement of this kind is shown in FIG. 16, in which the pin 191 is provided with a cross head 196 at one end thereof. The pin 191 extends through a bifurcated portion 197 on the upper end of the lever 195 (see FIG. 10) and the cross head engages the two arms of the bifurcated portion of the lever. Thus, the pin 191 is able to move pivotally with respect to the lever 195; at the same time the lever can move vertically, to a limited extent, with respect to the pin. A similar connecting arrangement connects the pin 192 to an operating lever 198, which corresponds substantially in construction to the lever 195.

The two levers 195 and 198 are pinned or otherwise suitably affixed to a shaft 200, which is journalled in a pair of brackets 201 on the base of the exposure station for the machine. A cam follower lever 202 is also affixed to the shaft 200 and extends downwardly from the shaft into engagement with a cam 203. The cam 203, like the cams 159 and 179, is keyed or otherwise suitably affixed to the cam shaft 161 for rotation therewith (see FIGS. 10 and 16).

FIG. 16 shows the locating pin 191 in its retracted relation to a card, such as the card 88A, as the card is located in the exposure station 120 of the photocomposing machine. As shown in that figure, the pin is aligned with a suitable opening 205 in the face plate 148 of this portion of the exposure station. A relatively long bearing 199 is preferably provided in the frame member 184 to afford accurate alignment of the pin 191 and to limit the pin to axial movement relative to the frame member in order to assure accurate positioning of the card at exposure station of the machine. A spring 206 is mounted on the pin 191 in engagement with the frame member 184 and a shoulder 207 on the pin to afford a biasing means which urges the pin outwardly of the apertures 205 and thus tends to move the pin 191 through the aperture 189 in the card 88A. Preferably, the biasing force exerted by the spring 206 is made relatively small to prevent puncturing of the card 88A in the event that the card is improperly positioned in the exposure station of the machine prior to actuation of the pin from its retracted position, shown in solid lines in FIG. 16, to its actuated or card-locating position illustrated by the dash outline 191A. An independent biasing arrangement, such as the spring 209, is preferably utilized to bias the lever 195, and hence the shaft 200, toward movement in a clockwise direction, as seen in FIG. 16. Thus, the biasing spring 209 tends to maintain the cam follower 202 in engagement with the cam 203. A stop member 211 is provided to limit the clockwise movement of the lever 195, hence limiting the movement of the pin 191 in the direction of the card 88A. The mounting arrangement for the other locating pin 192 may be substantially similar to that shown in FIG. 16 for the pin 191, and hence is not shown in detail in the drawings. The pin 192, however, is aligned with the other aperture 188 in the card 88A (see FIG. 24).

As noted hereinabove, the kickout roll 127 is not maintained in position to contact the card at all times, but rather is moved toward and away from the card by pivotal movement of the bracket 129 about the shaft 131 (see FIG. 11). The mechanism employed to effect the necessary pivotal movement of the bracket 129 is illustrated in FIG. 14 and comprises a connecting rod 220 which extends through an aperture 221 in the bracket 129. The rod 220 is provided with an enlarged head portion, preferably of substantially hemispherical configuration, which engages in a similarly shaped socket at one end of the aperture 221. The end of the rod 220 opposite the head 222 extends through a bifurcated portion 223 on one arm 224 of a bell crank 225. A suitable retainer, such as the washer 226, maintains the pin 220 in engagement with the bifurcated portion 223 of the arm 224.

A biasing spring 227 is mounted upon the rod 220 and continuously urges the bracket 129 and the rod 222 toward the right, as seen in FIG. 14, thus tending to rotate the crank 225 in a clockwise direction about its pivot point 228. The other arm 230 of the crank 225 comprises a cam follower which is aligned with a cam 231 like the previously described cams 159, 179 and 203; the cam 231 is keyed or otherwise affixed to the cam shaft 161 for rotation therewith.

There are a number of electrical control operations which are effected at the exposure station 120 in coordination with operation of the different devices included in the exposure station. In the illustrated embodiment of the invention, these operations are controlled by a series of cam actuated switches which are mounted within a switch section 240 in the base of the exposure station (see FIG. 9). Inasmuch as the mechanical arrangement of these different switches may be substantially similar for all switches, only one of the switches is shown in detail in the drawings, this being the switch 241 illustrated in FIG. 12.

The switch 241 comprises a movable contact member 242 which is arranged for pivotal movement about a pivot pin 243 and which is electrically connected, through a spring 244, to an insulated terminal 245. The contact member 243 is provided with a contact element 246 at one end thereof, the contact 246 being aligned with a stationary contact 247. During operation of the machine, the contact 247 is stationary, but the location of this contact element may be adjusted by means of an adjusting screw 248. The movable contact arm 242 is provided with a cam engaging member 250, which is aligned with and engages a cam 251, the cam being affixed to the cam shaft 161 for rotational movement therewith. The mounting of the cam on the cam shaft may be effected by a key or keyway arrangement or by other suitable means if desired. As noted hereinabove, the remaining cam controlled switches for the electrical control of the photocomposing machine are essentially similar to the switch 241 and therefore are not described in detail herein, but rather are referred to only in connection with the schematic diagram of FIG. 44. Moreover, it should be understood that other cam controlled switching structures may be utilized for this purpose of desired, and that the arrangement illustrated in FIG. 12 is intended only to provide a typical example of one kind of cam controlled switch which may be employed in the photocomposing machine.

As noted hereinabove, a number of different operations of the photocomposing machine are carried out in a predetermined timed sequence with respect to each other. All of these operations are actuated directly or are controlled by a single motor 260 (see FIGS. 19 and 20). The motor 260 comprises the main drive for the photocomposing machine and controls operation of the cam shaft 161, the shuttle feed drive shaft 113, and the film feed drive shaft 119 which controls the film feed in the camera of the machine, as explained in detail hereinafter. The main drive of the machine is illustrated in FIGS. 19–21 and may best be understood by reference to these figures.

The main drive motor 260 is utilized to drive an output shaft 261, the motor being coupled to the output shaft through a gear box 262. A suitable pulley 263 is mounted on the outboard end of the shaft 261 and is employed to drive a timing belt or similar drive belt or chain 264. The belt 264 is also engaged with a second pulley 265 which is affixed to a driving member or outer race 267 which forms a part of a one revolution roller-type clutch 268. The drive member 267 is journalled upon a fixed stub shaft 266.

The driven member of the clutch 268 comprises an inner race 269, the driving connection between the members 267 and 269 being afforded by a plurality of roller members 270. Each of the rollers 270 is engaged by a cage member 272, as best illustrated in the detail sectional view of FIG. 20A. With the rollers in the position illustrated in FIG. 20A, the rollers are free to rotate and the outer or driving member 267 is therefore permitted to rotate relative to the inner or driven member 269. However, if the cage 272 and the rollers 270 are rotated through a relatively short distance with respect to the drive member 269, the rollers are jammed between the two races 267 and 269, effectively locking the driving and driven races together, thereby preventing relative movement between the two members and causing the driven member 269 to be rotated in response to rotation of the driving member 267. Spring biasing means, such as the spring 274, are utilized normally to maintain the clutch in engagement, thereby causing the driven member 269 to be rotated through the drive linkage comprising the shaft 261, the pulleys 263 and 265, and the timing belt 264.

The driven member 269 of the clutch 268 is affixed by suitable means to a gear 276, so that rotation of the driven member 269 causes corresponding rotation of the gear 276. The gear 276 engages an idler gear 277 that is journalled upon a stub shaft 278, the idler in turn being disposed in meshing engagement with a main drive gear 279. As best indicated in FIG. 19, the main drive gear 279 is in meshing engagement with a spur gear 281 that is mounted upon the cam shaft 161 of the exposure station 120 of the photocomposing machine. Thus, the cam shaft 161 is rotated whenever the clutch 268 is engaged, and stops when the clutch is disengaged.

Actuation of the clutch 268 is controlled by a solenoid 281 (FIG. 21). The armature 282 of the solenoid is connected to a first pawl lever 283 having an extension portion 284 which is aligned with the clutch 268, as described more fully hereinafter. The pawl lever 283 is pivotally mounted upon a stub shaft or pivot pin 286 which is supported upon and projects outwardly of a frame member 285 of the machine. A second pawl member 287 is pivotally mounted on the pin 286 and is normally urged upwardly by resilient means such as the spring 288. A pin 287A is mounted on the pawl member 287 and projects beneath the pawl member 284, so that the two pawl members 284 and 287 are normally constrained to move upwardly in conjunction with each other. However, a limited degree of movement of the two pawls relative to each other is permitted, since they are not directly connected. The actuation arrangement for the clutch also includes a biasing spring 289 which is connected to the armature 282 and which tends to hold the armature down and to rotate the pawl lever 283 in a counterclockwise direction as seen in FIG. 21.

The pawl lever 284 is aligned with a first clutch disc 291 which is affixed to the roller cage 272 for rotation therewith, as illustrated in FIG. 20. The clutch disc 291 is provided with a notch 292 which may be engaged with the end portion or pawl 293 on the pawl member 284. A second clutch disc 294 is included in the clutch 268 and is affixed to the driven member 269 for rotation therewith (see FIGS. 20 and 20A). The clutch disc 294 is provided with a notch 295 for receiving a similarly notched portion or pawl 296 on the pawl member 287. Thus, and as described more fully hereinafter, the pawl 284 may be engaged in the notch 292 to interrupt rotational movement of the roller cage 272 and move the roller cage through a short distance relative to the driving member 267, thereby disengaging the clutch. The pawl 287, on the other hand, may be engaged with the notched portion 295 of the clutch disc 294 to afford a positive stop and interrupt rotational movement of the driven member 269 of the clutch in a disengaged position. The spring 274, interconnecting the clutch discs 291 and 294, normally constrains the two discs to rotate together and also urges the disc 294 toward counterclockwise rotation relative to the disc 291.

The exposure station 120 of the photocomposing machine also includes a sensing means for determining whether or not a record card or other business instrument is present in the exposure station during a given photographing cycle. This sensing means comprises a photocell 298 (FIG. 8) which is mounted upon the frame member or guide plate 147 adjacent a pair of narrow slit-like openings 299. In FIG. 9, the photocell and its housing are omitted from the drawing in order better to show the location of the openings 299. The openings 299 are located directly opposite a lamp or other light source 301 (FIG. 8) which is positioned to project light across the gap or space 169 through which the record cards travel in the exposure station.

The location and arrangement of the openings 299 for admitting light to the photocell 298 may best be understood by reference to FIG. 24, in which the size and location of the openings are shown in dash outline superimposed upon a typical record card 88. As illustrated in this figure, the record card 88 may comprise a conventional record card for business data and may be provided with a plurality of punched holes or other indicia 303 for use in classifying or sorting of a group of cards of which the card 88 forms a part. Record cards of this kind are well known in the art, and the punched holes 303 are located at predetermined positions and in predetermined alignment with respect to the edges of the cards. Thus, in accordance with conventional practice, the openings 303 are aligned in a series of rows corresponding to the fixed row positions identified by the row numbers 304 on the left-hand edge of the card as seen in FIG. 24. The photocell apertures 299 are aligned with spaces between the rows 304. In this manner, the presence or absence of data apertures 303 in the card does not affect operation of the photocell 298, since no substantial amount of light can reach the photocell through the apertures 303 in a record card when the card is properly positioned in the exposure station 120.

The two apertures 188 and 189 in the record card 88 afford the principal, and indeed the only means on the card for accurately aligning the card in the exposure station 120. The aperture 188 is made circular in configuration and is located in a predetermined position with respect to one or more lines of printed data 305 on the record card. The base line 306 of the data 305 is made parallel to a line drawn through the centers of the two apertures 188 and 189, as indicated by the base line 307 in FIG. 24. The aperture 189 is not of circular configuration, but rather is elongated in a horizontal direction, viewing the card in the position shown in FIG. 24. This configuration permits accurate vertical positioning of the card within the exposure station, but at the same time allows for expansion and contraction of the card in the direction of its major dimension.

The position of the card in the exposure station, during photographing, is determined entirely by engagement of the pins 192 and 191 (see FIG. 8) in the apertures 188 and 189, respectively, of the card. That is, the position of the card during photographing is not dependent upon engagement of any edge of the card by any part of the exposure station. Rather, the card is suspended and positioned within the exposure station solely by the pins 191 and 192, thereby substantially improving the accuracy of positioning of the card as compared with any arrangement utilizing the edges of the card as guides, since the card edges may become worn, torn, or otherwise distorted in the course of normal and repetitive use of the cards.

In many applications, it may be desirable to provide tabs on individual record cards such as the card 88. Thus, the card 88 may be provided with an identification tab 309 at the upper left-hand edge thereof, as illustrated in FIG. 24. Other standard tab locations are indicated by the dash outlines 310 and 311. For effective operation of the photocomposing machine, it is necessary to locate the two tamping or positioning members 167 and 168 in positions in which they do not engage tabs at any of the three positions 309-311 in order to provide for uniformity in the positioning effect of the tamping fingers. Thus, the positioning members 167 and 168 should be located between the conventional tab positions, as shown schematically in FIG. 24.

As noted hereinabove, in each operating cycle of the photocomposing machine a card such as the card 88A is fed from the stack of cards 88 (see FIG. 22) through the gate or opening 93 in the direction indicated by the arrows 85. As soon as the card has moved a short distance through the gap 93, it is engaged by the rollers 121 and 122 and is driven by these rollers into the exposure station 120 of the machine. Continued movement of the card passes the card between the additional set of rollers 123 and 124, which drive the card farther into the machine, releasing the card just before it is engaged and stopped by the gate member 150. As indicated in the timing chart of FIG. 23, the gate member 150 is moved to its closed position, as shown in solid lines in FIGS. 15 and 22, during the latter part of the period in which a new card is advanced into the exposure station. Consequently, as the momentum of the card 88A carries it forward away from the rollers 123 and 124, forward movement of the card being interrupted by engagement with the resilient pad 153 on the gate member. Thus, movement of the card is interrupted with the card approximately in the position illustrated in FIG. 22 relative to the principal operating elements of the exposure station 120. The resilient pad 153 effectively absorbs the kinetic energy of the card and prevents the card "bouncing" back through the exposure station. Moreover, the continuously operating rollers 123 afford positive assurance that the card will not move retrogressively with respect to the exposure position in station 120.

Immediately after the forward movement of the card 88A is interrupted by engagement with the gate or stop member 150, the fingers 165 and 166 move downwardly from their normal elevated position (see FIG. 13) toward engagement with the top edge of the card. If the card is positioned too high, relative to the desired location in the exposure station, the positioning elements 167 and 168 engage the card and tamp or push it downwardly into the slot 168A (see FIG. 8). This is not a final positioning operation, but rather it utilized only to insure at least partial alignment of the card apertures 188 and 189 with the locating pins 192 and 191, respectively.

In the next operating cycle of the machine, as illustrated in the timing chart of FIG. 23, in which machine operations are plotted as a function of rotation of the cam shaft 161, and while the fingers 165 and 166 are still in their lowered position, the pins 191 and 192 are advanced through the openings in the guide plate 148 (see FIG. 16) and into the apertures 188 and 189 in the card 88A. As the pins engage in the card apertures, they may move the card upwardly or downwardly, or to the right or left, depending upon the initial location of the card within the exposure station. In order to avoid undue wear upon the card apertures, and to assure accurate orientation of the cards within the exposure station, the forward end of each of the pins 191 and 192 is tapered to a substantial degree, as best shown in FIG. 16. It should be noted that the card is not prevented from accurate positioning movement by positive engagement with any of the drive rollers in the exposure station, since the kickout roll 127 is disposed in its retracted position during the positioning of the card (see FIGS. 22 and 23) and the card has cleared the rollers 123 and 124 just before its forward movement is interrupted. Moreover, the dimensions of the tamping or pushing elements 167 and 168, and the extent of downward movement of these elements, is correlated with the card dimensions so that the positioning elements do not interfere with accurate positioning of the card. Thus, the final photographing position of the card is determined solely by engagement of the pins in the card apertures, in accordance with the invention set forth in the above-identified application of Edward H. Billet, Serial No. 776,662.

During the period that the pins 191 and 192 are engaged in the card apertures and maintain the card in accurate position within the exposure station, the line or lines of data 305 on the card (see FIG. 24) are photographed as described in detail hereinafter. Thereafter, the cam control arrangement for the locating pins (FIG. 16) operates to retract the pins from the card and thus frees the card for ejection from the exposure station. Almost immediately upon retraction of the locating pins, the cam control positioning arrangement for the kickout roller 127, shown in FIG. 14, advances the kickout roll from its normal or retracted position to an advanced operating position indicated by the phantom outline 127A in FIG. 22. At the same time, the gate 150, which is retracted from its normal blocking position at the beginning of the advance movement of the locating pins (see FIG. 23) in open or retracted position. Accordingly, the kickout roll 127 engages the card 88A for a short period of time and again advances the card in the direction of the arrows 85 into the bight of the rollers 135 and 136. The rollers 135 and 136 continue the forward movement of the card and eject the card from the exposure station 120 and into a stacker before the next card is advanced into the exposure station. Thus, ejection of the card is effected during a period corresponding to approximately 75° of rotation of the cam shaft 161. After the card has cleared the exposure station, the gate 150 is again moved to its closed or blocking position to block the forward movement of the next card, which is fed into the exposure station in overlapping time relationship with respect to the ejection of the preceding photographed card.

From the foregoing description of the basic operation of the exposure station 120, it is seen that the operating cycles of the photocomposing machine are determined by the rotational movement of the main cam shaft 161. The basic control over the cyclic operation of the cam shaft is exercised by the main clutch 268. At the beginning of each operating cycle, the solenoid 281 is energized, moving the armature 288 upwardly against the bias afforded by the spring 289 and disengaging the two pawls 284 and 287 from the clutch discs 291 and 294, respectively. With the two pawls thus displaced from the clutch discs, the clutch is engaged by means of the spring 274, which rotates the disc 294 counterclockwise relative to the disc 291 and thus shifts the driven member 269 relative to the cage 272, jamming the rollers 270 into engagement with both members 267 and 269. Accordingly, the clutch 268 is effective to couple the drive gear 265 to the driven gear 276. The gear ratios in the gear chain connecting the clutch 268 to the cam shaft 161 are such that the cam shaft is driven through a complete revolution during each revolution of the clutch. Thus, rotation of the cam shaft 161 corresponds with rotation of the clutch.

Once the pawls have been moved free of their associated clutch discs and the clutch engages and starts rotational movement of the discs, the solenoid 281 may be de-energized, since the two pawls merely ride upon the periphery of the clutch discs and do not disengage the clutch. Near the end of a full revolution of the clutch, the notch 292 in the clutch disc 291 again approaches engagement with the notched portion 293 of the pawl 284. In normal operation of the machine, the solenoid 281 is energized before the notch 292 reaches alignment with the notched portion 293 of the pawl and remains energized until cyclic operation of the machine is interrupted by the control circuit arrangements described hereinafter. Thus, the solenoid permits continuous operation of the machine, but may be de-energized to interrupt machine operation under control of one of the cam switches, such as the switch 241 in FIG. 12, as described more fully hereinafter in connection with the circuit diagram of FIG. 44.

On the other hand, under certain operating conditions, as when no record card is present in the exposure station of the machine, it is necessary to interrupt machine operation. To disengage the main drive clutch 268, it is only necessary to de-energize the solenoid 281. When this is done, the pawl 284 engages in the notch 292 in the clutch disc 291 as the rotation of the clutch disc approaches the end of a given operating cycle. When this happens, rotation of the cage 291 is interrupted without interruption of the rotation of the driven member 269 of the clutch. Accordingly, the cage 272 is shifted rotationally with respect to the driven member 269, freeing the rollers 270 for rotation relative to the driving and driven members of the clutch and thus effectively disengaging the clutch. The driven member 269 continues to rotate, due to its inertia, bringing the notch 295 into alignment with the pawl 287 very shortly after the rotation of the cage has been interrupted. Consequently, the pawl 287 serves to locate the driven member in its "home" position, corresponding to the beginning or end of an operating cycle as illustrated in the timing chart of FIG. 23. As soon as the solenoid is again energized, of course, the clutch is again engaged and operation proceeds as described hereinabove.

As noted hereinabove, the idler roll 124 is positioned opposite the drive roll 123 when relatively small cards such as the card 88A are fed through the exposure station 120 of the photocomposing machine M. On other occasions, it may be desirable to use the machine with larger cards such as the card 88B illustrated in phantom outline in FIG. 24. Under these circumstances, the idler roll is moved to position 124A (FIG. 22) to lengthen the "pocket" or preliminary position for the record cards. With the idler roll 124 so displaced, the drive roll 123 does not exert an appreciable driving force on the cards, and the exposure station is thus completely and effectively adjusted to accommodate cards of different sizes merely by changing the location of one member. Of course, the larger cards, such as the card 88B, must be provided with apertures 188 and 189 corresponding to those in the smaller cards.

*Film Feed Drive*

The film feed drive for the photocomposing machine M is best shown in the detail views of FIGS. 32–35, 37 and 38, although some portions of the film feed mechanism are also shown in other figures. As noted hereinabove, the main drive shaft for the film feed mechanism comprises the shaft 119, which is connected to the cam shaft 161 through the bevel gears 160 (see FIG. 8). As best illustrated in FIG. 2A, the shaft 119 is connected to a second shaft section 321 by means of a universal coupling 322. The shaft section 321, in turn, is connected by a second universal coupling 323 to the final section 324 of the film feed drive shaft. The shaft section 324 is journalled in suitable bearings in a pair of support members 325 which comprise a part of the frame of the photocomposing machine.

The film feed mechanism of the photocomposing machine M comprises an adjustable drive apparatus 327 which is best illustrated in FIGS. 33–35. The drive apparatus 327 comprises a housing 328 which is provided with a cover 329, the cover being removed in FIG. 33 to show the interior of the housing. The housing 328 is supported upon the camera unit of the photocomposing machine for movement with the camera in adjustment of the relative positions of the lens and focal plane mask of the camera with respect to the exposure station of the photocomposing machine, as described hereinafter.

A bracket 331 is mounted upon the base 332 of the housing 328, the lower portion of the bracket 331 being provided with a suitable aperture to receive a first bearing member 333. A second bearing member 334 is journalled within the bearing member 333 and a bevel gear 335 is mounted upon the bearing member 334. The gear 335 is provided with a key which engages in an elongated keyway 336 that extends longitudinally of the shaft section 324. This construction permits rotation of the gear 335 in response to rotation of the shaft 324 and at the same time makes it possible to move the gear 335 longitudinally of the drive shaft to virtually any desired position along the shaft.

A second bevel gear 337 is mounted upon a vertical shaft 338 (see FIG. 34) which is journalled in a suitable bearing member 339 supported upon the base 332 of the housing 328. The bevel gear 337 is located in meshing engagement with the bevel gear 335 and therefore is effective to rotate the shaft 338 in response to rotation of the main drive shaft section 324. At the end of the shaft 338 opposite the gear 337, another bevel gear 341 is affixed to the shaft 338. The gear 341 is disposed in meshing engagement with a further gear 342 which is mounted upon and affixed to a shaft 343. The shaft 343 extends transversely of the housing 328 and is journalled in suitable bearings mounted in the housing. The gear ratios for the two sets of drive gears are made such that a 1:1 drive ratio is maintained between shafts 324 and 343 in order that the shaft 343 may be driven in exact synchronism with the shaft 324. Since, as described hereinabove, the shaft 324 is driven by the cam shaft 161 through a drive arrangement which also has a 1:1 ratio, it is seen that the shaft 343 rotates in synchronism with the cam shaft 161 in the exposure station of the photocomposing machine and thus rotates through one full revolution during each operating cycle of the machine. To compensate for backlash in the mechanism 327, a brake drum 340 may be mounted on the shaft 343 and is engaged by a brake band 344 having an adjusting screw 350. The brake band 344 also engages a stop pin 361.

An eccentric 345 is affixed to the shaft 343 for rotation therewith and is aligned with a cam follower roller 346 which is mounted upon a lever 347. The lever 347 is pivotally mounted upon a shaft 348 which extends transversely of the housing 328 in substantially parallel relation to the shaft 343. The lever 347 is provided with an extension portion 349 which is pivotally connected to a link 351 as illustrated in FIGS. 33 and 34. The link 351, in turn, is connected to a crank member 352 which comprises the driven member of a first unidirectional clutch mechanism 353 that is utilized to control rotational movement of a control shaft 354. A biasing spring 355 is connected to the lever 347 (FIGS. 33, 35) and biases the lever toward clockwise rotation, as seen in FIG. 34, tending to maintain the cam follower roller 346 in engagement with the eccentric 345.

The clutch mechanism 353 may be of substantially conventional construction and is utilized to rotate the shaft 354 in a counterclockwise direction, as seen in FIG. 34, in response to a corresponding movement of the driving member 352 of the clutch. On the other hand, the clutch 353 automatically disengages when the movement of the driving member 352 is reversed. That is, the driving member 352 may be rotated in a clockwise direction without applying any appreciable rotational force to the shaft 354. Any suitable clutch mechanism exhibiting this kind of operating characteristic may be employed. A convenient and effective clutch device for this purpose is the kind conventionally known as a sprag-type clutch. Inasmuch as clutches of this kind are well known in the art, no detailed description or illustration of the clutch mechanism itself is provided herein.

For reasons described hereinafter, it is necessary to provide for accurate and convenient adjustment of the angular distance through which the shaft 354 is rotated during each operating cycle of the machine. In the illustrated embodiment of the invention, this adjustment is provided by a control device 356 which is supported upon the shaft 354 but which does not rotate with the shaft.

The control device 356 comprises a bearing member 357 upon which a stop member 358 is mounted. A gear 359 and a locking member 360 are also mounted upon the bearing member 357, the three control device members 358–360 being connected and affixed to each other by suitable means such as a plurality of screws 362 (see FIGS. 34 and 35). Thus, rotational movement of any one of these members results in a corresponding movement of the others.

The stop member 358 is provided with a stop lug or projection 363 which projects outwardly thereof as best shown in FIGS. 34 and 35. The stop lug 363 is disposed in a path of movement of a corresponding lug 364 which is affixed to and projects from the driving member 352 of the clutch 353. Thus, when the driving member 352 of the clutch rotates in a clockwise direction, as seen in FIG. 34, its rotational movement is limited by engagement of the two lugs 363 and 364. This stop arrangement is utilized to limit the rotational movement of the shaft 354 as explained more fully hereinafter.

The gear 359 is disposed in meshing engagement with a rack 366. The rack 366 is mounted upon a support member 367 which comprises the shaft of a micrometer 368. The micrometer 368, in turn, is mounted in a suitable boss 369 in a member 371 which constitutes a part of the housing 328. Thus, the vertical position of the rack 366 may be adjusted by adjustment of the setting of the micrometer 368. Moreover, this adjustment also determines the angular positions of the control device members 358—360, since the rack 366 is in meshing engagement with the gear 359. The locking lever 360, on the other hand, is utilized to support a guide member 373 which engages in an arcuate track 374 in one wall of the housing 328. The guide member 373 is provided with a tapped opening for receiving a threaded shaft 375 to which a knob 376 is affixed. Thus, by loosening or tightening the shaft 375 in the guide member 373, using the knob 376, the locking lever 360 may be effectively locked at any desired angular position along the track 374. A biasing spring 377 (FIGS. 33, 35) continuously urges the locking lever 360 toward movement in a counterclockwise direction, as seen in FIG. 34, taking up any slack in the rack-and-gear portion of the device 356.

As noted hereinabove, the clutch 353 provides a driving connection between the drive member 352 of the clutch and the shaft 354 whenever the drive member is rotated in a counterclockwise direction, but is effectively disengaged when the drive member is rotated in a clockwise direction. A second clutch 381 is preferably mounted upon the shaft 354 and is utilized to afford a more positive control and to prevent undesired clockwise movement of the shaft which might result from drag in the clutch 353. The clutch 381 includes an external member 382, which corresponds generally to the drive member 352 of the clutch 353. In this instance, however, the "drive member" of the clutch is affixed to the housing 328. Preferably, a sprag-type clutch or similar device is used as the clutch 382, the clutch being arranged to permit counterclockwise rotation of the shaft 354 but to prevent clockwise rotation of the shaft.

In addition to the mechanically controlled drive arrangement for the shaft 354, it is also desirable to provide for manual operation of this shaft, which is the output shaft of the film feed control device 327. In the illustrated arrangement, the shaft 354 is extended outwardly of the housing 328 and a manual control knob 384 is affixed to the shaft to afford a means for manual rotation of the shaft. At the opposite end, the shaft 354 is also extended outwardly of the housing 328 and a pinion 385 is keyed, pinned, or otherwise affixed to the shaft. The pinion 385 is disposed in meshing engagement with a spur gear 386. The spur gear 386 is suitably mounted upon a shaft 387 which directly controls the film feed of the camera.

The film feeding mechanism of the camera for the photocomposing machine is best illustrated in FIGS. 37 and 38. As shown therein, the camera comprises a substantially light-tight enclosure 391 having a hinged top cover 392 and a hinged back cover 393. The film feed shaft 387 extends transversely of the enclosure 391 (see FIG. 38) and is journalled in suitable bearings mounted in the side wall of the enclosure. In FIG. 38, a part of the shaft has been cut away to permit illustration of additional parts of the film feed mechanism. The central portion of the shaft 387 is of enlarged diameter and comprises part of a roller 395 which is covered by a metal sleeve 396 having a layer 397 of rubber or other high friction material on the surface thereof. The film is driven through the enclosure 391 by frictional contact with the high friction layer 397 as described in detail hereinafter.

A raw film magazine 398 is mounted in the upper portion of the camera enclosure 391, as shown in FIG. 37. Essentially, the film magazine 398 comprises a box or container 399 having a mounting flange 401 and having an outlet opening 402. The magazine is removably mounted upon the hinged lid 392 by suitable means, which may comprise a retainer 402 secured to the lid by a screw or other suitable means and engaged in a slot or aperture in the mounting flange 401 of the magazine. In addition, a mounting block 403 may be mounted in the magazine 398 in position to receive a bayonet type or threaded type releasable fastening device 404 which is mounted in the lid 392 of the camera. A reel of unexposed film 405 is disposed within the enclosure 399 of the magazine 398 and may be fed outwardly of the magazine through the opening 402 in the film box.

From the magazine 398, the film 405 is fed over a pair of guide rods 406 and 407 immediately adjacent a focal plane mask structure 408 which is described in detail hereinafter in connection with FIGS. 40–43. From the rod 407, the film 405 passes along a guideway 409 and into contact with the surface 397 of the film feed roller 395. The film is normally maintained in contact with the roller surface 397 by a pressure roller 411. From the pressure roller 411, the film strip passes through a guideway 412 that extends through an opening 413 in the rear wall 393 of the camera, and thence into an exposed film magazine 414 that is removably mounted on the rear wall of the camera.

The pressure roll 411 preferably is a conductive metal roller, mounted on shaft 415, which is effective to prevent a build-up of static charge on the film, which might damage the film emulsion. The shaft 415 is journalled in and supported by a pair of bell cranks 416 located at opposite sides of the camera, only one of the bell cranks being shown in the drawings. The bell cranks 416, in turn, are pivotally mounted upon a stationary shaft 417 which extends transversely of the camera enclosure 391 adjacent the base 418 thereof. Each bell crank 416 includes an arm 419 which extends into alignment with an additional shaft 421, the shaft 421 being journalled in suitable bearings in the sides of the camera unit and being extend through the side walls of the camera to the outside thereof. The shaft 421 is provided at each end with a flattened area or cam surface 422 which is normally engaged by the adjacent bell crank arm 419. The mounting arrangement for the bell crank 416 and the shaft 421 is the same at both sides of the camera. Each of the bell cranks 416 is biased into engagement with the shaft 421 by suitable means such as a biasing spring 440 which is connected to one arm of the bell crank and tends to rotate the bell crank in a clockwise direction as seen in FIG. 37. It should be noted that the shaft 417 which affords a pivotal mounting for the bell cranks supporting the pressure roller 411 is also utilized as a support for the guide 409 in the illustrated embodiment of the invention.

The exposed film magazine 414 is supported upon a pair of brackets 424 which are located at opposite sides of the camera, the magazine being clamped in place by a pair of retainer members 425 (see FIG. 38). The magazine may be relatively simple in construction and may include a central spindle 426 around which the exposed film is wound during operation of the camera. A pair of latching levers 427 are located at opposite sides of the camera and engage additional retainers 428 on the magazine to hold it in the desired operating position (see FIG. 37). One end 429 of the film spindle 426 may be extended outwardly of the magazine 414 to afford a means to connect a take-up drive to the exposed film magazine. Any suitable drive arrangement may be utilized for this purpose; for example, the exposed film magazine spindle may be connected to a pulley 430 on the film feed shaft 387 by a constantly-overdriving connection of the kind conventionally employed in moving picture projectors. Since this particular drive device is not crictical to the invention, it has not been shown in detail in the drawings.

The camera of the photocomposing machine also includes a film punch which is shown in the detail view of FIG. 37A. The film punch comprises a bar 431 which extends transversely of the camera and which is mounted upon a pair of brackets affixed to opposite sides of the camera housing 391, only one bracket 432 being shown in the drawing. The bar 431 comprises the die member of the film punch. The punch apparatus also includes a punch member 433 which is supported upon and extends through a transverse support member 434, the punch member 433 being aligned with a suitable opening 435 in the die member 431. A spring 436 is utilized to bias the punch member upwardly away from the die member 431 and normally maintains the head portion 437 of the punch member in engagement with a flattened cam surface 438 on a shaft 439. The shaft 439 extends across the camera and is journalled in suitable bearings in the side walls of the camera. One end of the shaft 439 is extended outwardly of the camera housing and a handle (not shown) is affixed to the shaft to provide for actuation of the punch. As indicated in FIG. 37A, the film strip 405 passes between the support member 434 and the die member 431 and thus is positioned to be punched by the punch member 433. In the illustrated arrangement, the film punch is located immediately ahead of the guide rod 406 for the film.

Operation of the film feed mechanism, and the highly imporatnt adjustment features of that mechanism, afford substantially advantages with regard to versatility of the photocomposing machine M as compared with previously known arrangements. As indicated in the timing chart of FIG. 34, the film feeding operation is carried out during the latter part of each operational cycle of the machine, at a time when the shutter of the photocomposing machine is closed. The entire film feeding operation is actuated from the drive shaft 324 which, as noted hereinabove, is operated synchronously with the exposure station cam shaft 161.

The operating position of the film feed control mechanism 327 in FIG. 34 corresponds to the end of a film feeding cycle. Thus, it may be considered that the parts are shown approximately in the position each occupies at the beginning of an operating cycle of the photocomposing machine M. With the shaft 343 set in rotation, in response to the rotational movement of the shaft 324, the eccentric cam 345 is rotated, allowing the cam follower 346 to move to the right and permitting the lever 347 to pivot in a clockwise direction about the shaft 348. The lever 347 is held in engagement with the cam by the spring 355, and thus pivots to the right, as seen in FIG. 34, driving the link 355 to the right and pivoting the clutch drive member 352 in a clockwise direction about the shaft 354. As noted hereinabove, the sprag-type clutch 353 is automatically disengaged for such clockwise movement of the drive member 352; consequently, no more than a very small driving force is applied to the shaft 354 in this portion of the operating cycle of the control-device 327. Moreover, the second clutch 381 is effective to prevent clockwise rotation of the shaft 354, so that the shaft does not move during this initial portion of the operating cycle. Since it is the shaft 354 which drives the film feed mechanism, the film remains stationary, affording ample time for photographing one of the record cards 88 (see FIGS. 22 and 23). The clutch member 352 continues its clockwise movement until the stop member 364 engages the lug 363 to prevent further movement of the clutch drive member. Thus, the members 363 and 364 limit the movement of the clutch drive member 352 and are effective to determine the length of film fed through the camera in a given operating cycle of the photocomposing machine, as further explained hereinafter.

As the shaft 343 continues to rotate, during a given operating cycle, it eventually begins to move the cam follower 346, and hence the lever 347, to the left as seen in FIG. 24, pivoting the lever 347 in a counterclockwise direction back toward the initial position shown in the drawing. When this occurs, the link 351 is pulled to the left (FIGS. 33 and 34) and causes the clutch drive member 352 to move in a counterclockwise direction with respect to the shaft 354. The counterclockwise movement of the clutch member 352 causes the clutch 353 to engage and, therefore, drives the shaft 354 in a counterclockwise direction. The angular distance through which the shaft is rotated is, of course, determined by its starting position, established by engagement of the lugs 363 and 364, and is also determined by the configuration of the cam 345. Accordingly, during each operating cycle of the machine, the shaft 354 and the pinion 385 mounted thereon are driven through a predetermined angular distance, in a counterclockwise direction, but clockwise movement of the shaft and pinion are prevented by the second clutch 381.

When the pinion 385 is rotated, as described hereinabove, it drives the film feed shaft 387 and rotates that shaft in a clockwise direction as seen in FIG. 37. Consequently, a predetermined length of the film strip 405 is pulled from the raw film magazine 398, through the opening 402 and over the guide rods 406 and 407 and the guide member 409, and is fed to the exposed film magazine 414 through the guideway 412. Because the roller 395 is provided with the high friction surface 397, and since the film is held in contact with approximately 180° of surface of the roller by means of pressure roller 411, there is virtually no chance of slippage between the film feed roller 395 and the film. Consequently, a uniform length of film is fed through the camera in each operating cycle of the machine, providing uniform and accurate spacing of the exposed areas of the film. This precision and uniformity in operation of the film feed mechanism is extremely important with regard to operation of the photocomposing machine as a whole, since uniformity of appearance in the reproduced copy is entirely dependent thereon.

It may be desirable to adjust the length of the film fed through the camera for a number of different purposes. For example, a greater length of film must be fed through the camera for the reproduction of relatively large type, in the photographed image, to photograph items each including a plurality of lines, or for other purposes. On the other hand, it may be desirable to change the length of the film feed to provide greater or smaller spacing between the lines of reproduced material, or for other purposes. Thus adjustment of the film feed may be effectively, accurately, and conveniently accomplished by the control device 327 of FIGS. 33–35.

In the drawings the adjustment device 356 is shown adjusted for maximum film feed. To reduce the length of the film feed, the machine operator first releases the locking lever 360 for pivotal movement by unscrewing the knob 376 and releasing it from clamping engagement with the guideway 374. Once this is done, the locking lever, the gear 359 and the stop member 358, are released for pivotal movement relative to the shaft 354, since each is journalled on the shaft and therefore is free to rotate with respect thereto. Thereafter, the operator may adjust the micrometer 368 to move the rod 367, and hence the rack 366, upwardly as seen in FIG. 34. The upward movement of the rack 366 causes the gear 359 to rotate in a counterclockwise direction about the shaft 354 and, accordingly, is effective to rotate both the locking lever 360 and the stop member 358 by a corresponding amount. The spring 377, which maintains a constant counterclockwise bias upon the lever 360, is effective to prevent any ambiguity in adjustment of the position of the rack 366 relative to the gear 359, and assures accuracy of the setting of the control device 356 regardless of the direction in which the rack 366 is moved in reaching an ultimate location. The counterclockwise movement of the elements 358–360 of the control device 356 moves the stop member 363 closer to the lug 364, and therefore reduces the distance through which the clutch drive member 352 is permitted to move in the return movement of the clutch. Thus, the adjustment of the device 356 is effective to limit the angular movement of the drive member of the clutch 353, embodying a corresponding limitation upon rotational movement of the shafts 354 and 387 and thereby limiting the length of film fed through the camera in each operating cycle of the machine. Of course, when the operator has adjusted the micrometer 368 to the desired position the knob 376 is again tightened, locking the film feed adjustment in the desired position.

In some instances, it may be desirable to feed film manually through the camera, as when a space is to be left in the film between succeeding runs of cards relating to different subject matter. To accomplish this purpose, it is only necessary for the operator to interrupt operation of the machine momentarily and turn the shaft 354 in a counterclockwise direction (FIG. 34) by means of the knob 384 (FIG. 35). The spray-type clutches 353 and 381 do not interfere with manual operation of the shaft.

To install a roll of film in the camera, the operator opens the back 393 of the camera and lifts the lid 392 thereof. With the lid thus accessible, a magazine 398 of unexposed film can be simply and conveniently mounted on the lid 392, using the retainers 402 and 404 as described hereinabove. A leader on the film is pulled from the opening 402 of the magazine and is threaded around the guide rods 406 and 407 and through the guideway 409. A handle 420 (FIGS. 37 and 38) on the shaft 421 is employed to pivot the shaft and disengage the cam portion of the shaft from the cam follower portion 419 of the bell crank 416. Consequently, the bell crank is moved to the position indicated by the dash outline 416A, moving the pressure roller 411 clear of the feed roller 395. When this is done, the operator is able to thread the film 405 between the two rollers 395 and 411. Thereafter, the film can be threaded into the exposed film magazine 414, through the guideway 412, and engaged with the spindle 426. When the threading operation is complete, the handle 420 may be returned to its initial position, permitting the bell crank and the pressure roller to return to their original positions in response to the biasing force exerted by the spring 449. This return movement of the mechanism brings the pressure roller 411 into contact with the film strip and assures good contact of the film strip with both of the rollers 395 and 411. The handle 420 may also be used to release the film and permit manual withdrawal of the film from the camera in the event that this proves to be desirable.

In many instances, it may be desirable to mark predeterminde lengths of the film as a guide for development thereof. Thus, if the available development apparatus is limited with respect to the length of the film which may be processed, it may be necessary to mark the film to prevent exposure of an unmanageably long film strip. In other instances, as where the machine is used on relatively short runs or where one group of cards relating to given subject matter is followed by another group relating to different subject matter, it may be desirable to mark the transition between such groups. This is readily and conveniently accomplished by the film punch shown in FIG. 37A. To mark the film, it is only necessary for the operator to rotate the shaft 439, using the lever 441, to force the punch member 433 down through the film strip 405 and into the die member aperture 435. As soon as the handle is returned to its normal position, of course, the punch member is free of the film and the film is again ready to be advanced through the camera. The manual control knob 384 (FIG. 35) may be utilized to advance the film through the camera to bring the punched area past the exposure area intermediate the guide rods 406, 407, after which normal operation of the machine may again be initiated.

*Optical Apparatus*

The major components of the optical apparatus for the camera of the photocomposing machine are best illustrated in FIGS. 2A, 3, 32, 36 and 39–44. As illustrated in FIGS. 2A, 3, 36 and 37, the camera comprises a lens mounting member 451 and a film enclosure support member 452. The lens support member 451 is provided with two sets of depending bosses 453, each of the bosses being provided with a suitable aperture for receiving a guide rail 454. The guide rail 454 is mounted in a pair of frame members 455 and 456 which comprises a part of the frame of the photocomposing machine. The frame member 455 is disposed at the right hand side of the machine, as seen in FIGS. 2A and 3, and extends across the machine in a direction substantially parallel to the path of movement of the record cards through the exposure station 120. The frame member 456 is substantially similar in construction but is located at the left hand side of the machine as seen in these two figures. A second guide rail 458 is mounted in and extends between the two frame members 455 and 456, being disposed in parallel spaced relation to the guide member 454. The lens mount 451 is also provided with bosses 457 (FIG. 36) having suitable apertures for receiving the second guide member or rail 458. Thus, the lens mount 451 is supported upon the two guide rails 454 and 458 and is longitudinally movable of the guide rails.

The support member 452 for the camera enclosure 391 (see FIGS. 3 and 37), which may be integral with the base 418 of the camera enclosure, is also provided with a pair of depending bosses 459 which are disposed in encompassing relation to the guide rail 454. The support member 452 is similarly engaged with the second guide rail 458, as by one or more bosses 460 (see FIG. 38) so that this portion of the camera is also mounted upon the two guide rails for sliding movement therealong. As noted hereinabove, the film feed drive apparatus 327 is mounted upon the enclosure camera and this is also supported for movement toward and away from the exposure station of the photocomposing machine.

The camera apparatus includes means for moving the lens mount 451 and the camera mount 452 toward and away from the exposure station 120 of the photocomposing machine independently of each other. As shown in FIG. 36, the lens mounting member 451 is provided with a bifurcated depending boss or lug 461. A nut 462 is mounted between the two arms of the boss 461 and is threaded onto and supported by a lead screw 463. The lead screw 463 is journalled in suitable bearings in the frame member 455 and in another frame member 464.

At one end of the lead screw 463 there is mounted a spur gear 465, which is affixed to the lead screw and is utilized to rotate the lead screw. The gear 465 is disposed in meshing engagement with a pinion 466 which is pinned, keyed, or otherwise affixed to a transverse shaft 467. As best shown in FIG. 2A, the shaft 467 is connected by a universal joint 468 to a second shaft section 469 which, in turn, is connected by a further universal joint 471 to a shaft extension 472. The shaft extension 472 extends outwardly of the frame of the photocomposing machine at one side thereof and is provided with a knob 473. Thus, the lens mounting member 451 may be moved along the guide rails 454 and 458 by turning the knob 473 to rotate the shaft sections 472, 469 and 467, thereby driving the lead screw 463 through the gears 465 and 466.

A similar drive arrangement is provided for adjusting the position of the camera support member 452. Thus, the camera support member is provided with a bifurcated depending boss 475 having a nut 476 positioned between the two arms of the boss (see FIG. 36). The nut 476 is threaded onto a lead screw 477, the opposite ends of the lead screw being mounted in suitable bearings in the frame members 456 and 464. A spur gear 478 is affixed to one end of the lead screw 477 in meshing engagement with a pinion gear 479. The gear 479 is mounted upon a shaft 481 which is extended out to the side of the photocomposing machine by means comprising a universal joint 482, a shaft section 483, a second universal joint 484, and a shaft extension 485. A manual control knob 486 is mounted on the shaft extension 485 and may be utilized to drive the lead screw 477 and thus change the position of the camera mount 452 and the portions of the camera apparatus supported thereon relative to the exposure station of the machine.

The lens system 491 of the photocomposing machine is mounted upon the lens support member 451. The particular lens system employed in the camera is not especially critical in nature and may vary to a considerable extent in its construction. Moreover, the lens system itself may be substantially conventional in construction and operation. Accordingly, a detailed description of the lens construction and operation need not be set forth herein. Preferably, the lens system is provided with means for adjusting the focal conjugates thereof, since the lens position may be changed as described hereinafter.

The shutter for the lens system 491 is also mounted upon the lens support member 451. The shutter mechanism 495 is best illustrated in FIG. 39. As shown therein, the shutter comprises a first shutter member 496 which is pivotally mounted upon a shaft 497, the shaft 497 being supported upon the lens mounting member 451. The shutter member 496 is secured to a lever 498, the other end of the lever 498 being pivotally connected to a link 491. The connecting link 491, in turn, is pivotally connected to a lever 501 which is journalled upon a shaft 502, the lever 501 also being secured to a second shutter member 503. A lever 505 is employed to connect the first shutter member 496 to the armature 506 of a first shutter solenoid 507, sometimes referred to hereinafter as the shutter closing solenoid. A similar arrangement, comprising a lever 508, connects the second shutter member 503 to the armature 509 of a shutter closing solenoid 511.

The shutter 495 illustrated in FIG. 39 is extremely simple in construction yet affords a positive and rapid operation. To close the shutter, the solenoid 507 is energized, moving the armature 506 to the left, as seen in this figure, and pivoting the lever 505 in a clockwise direction about the shaft 497. This pivotal movement of the lever 505 causes a corresponding clockwise rotation of the shutter member 496 and the lever 498, moving the shutter member 496 to its alternate position illustrated by the dash outline 496A, in which the shutter member covers somewhat more than half of the lens opening 513 in the lens mounting member 451. At the same time, the pivotal movement of the lever 498 moves the connecting link 499 longitudinally and causes the lever 501 to pivot in a clockwise direction with respect to the shaft 502. This movement of the lever 501 is effective to move the second shutter member 503 in a clockwise direction about the shaft 502, bringing the shutter member to its closed position, illustrated by the dash outline 503A. Thus, energization of the solenoid 507 is effective to close the two shutter members 496 and 503, bringing the shutter members into overlapping relationship across the lens opening 513.

As noted hereinafter in connection with the circuit diagram for electrical control of the machine (FIG. 44), the solenoid 507 is energized only for a short period and closes the shutter, but is de-energized before the shutter is opened. To open the shutter, the second solenoid 511 is energized, moving the armature 509 to the right as seen in FIG. 39. This movement of the armature is effective to pivot the lever 508, and hence the shutter member 503, in a counterclockwise direction about the shaft 502, returning these members to their original positions. Moreover, the lever 501 is also pivoted in a counterclockwise direction, moving the link 491 back to its original position and, therefore, pivoting the lever 498 and the shutter member 496 in a counterclockwise direction about the shaft 497. Thus, it is seen that the shutter member 496 is also moved to its original or opened position by energization of the solenoid 511.

A bellows or other adjustable enclosure 521 is included in the camera and extends between the lens mounting member 541 and the camera mounting member 452 (see FIGS. 2A, 3 and 32). The end of the bellows opposite the lens mounting member is affixed to a focal plane mask device 408 which, as noted hereinbefore, is mounted at the front or exposure end of the camera enclosure 391. The construction and operation of the focal plane mask device 408 can best be understood by reference to FIGS. 40–43, which illustrate the structural details of a preferred form of mask.

The focal plane mask device 408 comprises a frame member 524 which is affixed to the camera mounting member 452 by suitable means such as a plurality of bolts or the like. As shown in FIG. 40, the frame member 524 is substantially rectangular in configuration and is provided with a relatively large central opening 525. In addition, one face of the frame member is provided with a recess 526, and this same face of the frame member is covered by a face plate 527 having a relatively large central opening 528. The face plate 527 may be secured to the frame member 524 by any suitable means such as plurality of screws 529.

A portion of the face plate 527 is cut away, in FIG. 40, to show the mounting of a first wedge member 531 within the frame 524. As shown therein, the wedge member 531 is disposed in the recess 526 between the face plate 527 and the frame member 524 and engages a pair of bosses 532 in the base of the recessed portion of the frame member. The wedge 531 is employed to control the position of a first mask member 533, which is also of a wedge-like configuration. Thus, the mask member 533 has an inclined edge 534 which is aligned with the inclined edge 535 of the wedge 531, being maintained in a space relation with respect thereto by a pair of a pair of guide projections or bosses 536 and 537 on the mask member which ride along the edge 535 of the wedge.

A pin 538 is affixed to the wedge 531 and extends outwardly thereof through the central opening in the mask assembly. A biasing spring 539 is affixed to the pin 538, the other end of the spring being secured to a pin 541 mounted on the face plate 527. Thus, the spring 539 is effective to apply a continuous biasing force to the wedge 531 tending to move the wedge to the right as seen in FIG. 40.

A micrometer 543 is mounted upon a frame member 534 with the shaft 544 of the micrometer extending through a suitable aperture in the frame member and into a slot 545 in the right hand face of the wedge 531 as seen in FIG. 40. The end of the shaft 544 engages a stop member 546 which is affixed to the wedge and which is located at the base of the slot 545. In FIG. 40, the micrometer 543 is illustrated at one extreme position of its adjustment range with the shaft 544 advanced as far to the left as possible. From this position, the micrometer shaft 544 may be withdrawn by adjustment of the micrometer, permitting the wedge 531 to move to the right, thereby adjusting one side of the mask, as described more fully hereinafter.

The focal plane mask device 408 further includes a second wedge member 551 which is substantially similar to the wedge 531 but is located at the opposite side of the device. The wedge 551 is also disposed in the recess 526 between the frame member 524 and the face plate 527 and engages a pair of bosses 552 in the base of the recess. The wedge 551 is employed as a guide for a second mask member 553, which is provided with a pair of bosses 556 and 557 on the inclined face 554 thereof; the bosses 556 and 557 engage the inclined face 555 of the wedge 551. The wedge 551 is provided with a biasing spring 559 which extends between a pin 558 on the wedge and a second pin 561 affixed to the face plate of the mask device.

A micrometer 563, substantially similar to the micrometer 543, is mounted at the right hand side of the mask assembly as seen in FIG. 40 with the micrometer shaft 564 extending through a suitable aperture in the frame member 524 and into a slot 565 in the wedge 551. At the base of the slot 565 there is mounted a stop member 566 which engages the end of the shaft 564. Thus, the micrometer 563 and the spring 559 may be utilized to adjust the position of the wedge 551 within the mask assembly in substantially the same manner as described hereinabove with respect to the wedge 531.

For effective operation of the mask assembly 408, it is necessary to provide some means for maintaining the two mask members 533 and 553 in engagement with the wedges 531 and 551, respectively. In the illustrated arrangement, this means comprises two pair of compression springs 571 and 572 which are effectively interposed between the two mask members 533 and 553 and which tend to force the mask members away from each other and toward their associated wedge members. The mounting arrangement for the compression springs 572 is shown in detail in FIG. 42. As illustrated therein, a first double-ended bracket 573 is affixed to the mask member 533, and a second similar double-ended bracket 574 is affixed to the other mask 553. The springs 572 are interposed between the two brackets, on opposite sides of the mask members, and are held in position by suitable means such as relatively small pins affixed to the brackets and extending into the springs. A corresponding mounting arrangement, comprising a pair of brackets 575 and 576 (see FIG. 40) is employed in the opposite side of the mask to afford a mounting arrangement for the springs 571. It is thus seen that the springs 571 and 572 are effective to retain the two mask members in positive engagement with their associated wedges, so that the position of each mask member is positively determined by its associated wedge.

As described more fully hereinafter, the masks 533 and 553 are utilized to adjust the effective width of the exposed area on the film as it is fed through the camera of the photocomposing machine. Consequently, and as set forth in the above noted application of Billet, Serial No. 776,662, it is essential that the mask be located in the focal plane of the camera and that the film, in its exposure position, be located immediately adjacent the mask. This relationship is illustrated in FIGS. 40, 42 and 43. As shown therein, the two guide rods 406 and 407 for the film strip 405 are mounted upon the frame 524 of the focal plane mask. Moreover, the guide rods are so located that the film strip is guided along a path immediately adjacent the two mask members 533 and 553, so that the film is essentially co-planar with the mask at the exposure point 581. Furthermore, the two mask members are each preferably provided with a longitudinal recess immediately adjacent their mating edges, as shown by the recesses 582 and 583 in the mask members 533 and 553 respectively (FIG. 43). This recessed-edge construction is highly advantageous in avoiding collection of dust particles along the edges of the mask, thereby preventing the formation of extraneous unexposed areas in the film which might otherwise be caused by the collection of dust particles in this area.

To adjust the focal plane mask device 408 for a given run of the photocomposing machine, it may be necessary for the operator to adjust either one or both of the two micrometers 543 and 563. As set forth more fully hereinafter, the axis of the lens system 491 of the camera is preferably aligned with the base line of the type on the record cards 88. In a given operation, it may be desirable to provide for exposure of a certain portion of the data on the card below the base line; in fact, this is almost always the case, since it is necessary to provide sufficient exposure area below the base line to take in "descenders" on the type characters which form the object data. For this purpose, the micrometer 543 is adjusted, moving the shaft 544 to the right and permitting the wedge 531 to move to the right in response to the force exerted by the spring 539 (see FIG. 40). When the wedge 531 moves to the right, the mask 533 moves downwardly in response to the biasing force exerted by the springs 571 and 572. This adjustment does not, however, make any change in the position of the mask 553, which is held in contact with its controlling wedge 551. Accordingly, the extent or height of the mask aperture 581 below the base line or axis 585 of the lens system is adjusted by the micrometer 543 independently of any adjustment of the aperture above the base line.

To open up the mask above the lens axis 585, the machine operator adjusts the micrometer 563 to move the micrometer shaft 564 to the right, as seen in FIG. 40, away from the stop 566. When this is done, the spring 559 pulls the wedge 551 to the right, permitting the mask 553 to move upwardly away from the mask 533 and away from the lens axis 585. Of course, this operation has no effect upon position of the lower mask 533. Accordingly, it is seen that the focal plane mask assembly 408 provides for completely independent adjustment of the two masks 533 and 553 with respect to the base line or lens axis 585, permitting the achievement of a wide variety of effects in the material composed by the photocomposing machine, as explained in detail hereinafter.

Another important element in the optical apparatus of the photocomposing machine comprises the lighting system 591. As illustrated in FIGS. 2A and 3, the lighting system 591 is disposed in a housing 592 located intermediate the exposure station 120 and the lens mounting member 451 of the machine. The lighting system includes means for illuminating the data 305 on a record card 88 from all sides when the card is positioned in the exposure station 120 of the machine (see FIG. 24). In the preferred arrangement shown in FIGS. 2A, 3 and 24, the lighting system comprises a pair of lamps 596 and 597 disposed above the area defined by the card data and the lens axis, and are located approximately opposite the ends of the longest card. A further pair of lamps 593 and 594 are disposed below the axis plane and are centrally located to oppose and reinforce the first lamps to provide an even distribution of light across the entire maximum data area of the card. Thus the data 305 is evenly illuminated during photographing, and the described disposition of the lamps minimizes the difficulties of overexposure and underexposure by ensuring that no light is reflected directly from the surface of the printed data images on the card in a manner that could impair the photographic result.

It is also highly desirable to afford independent means for controlling the intensity of the light output from each of the lamps 593, 594, 596 and 597. In the first place, it may be desirable or even essential to change the type of film employed in the camera for different photocomposing applications, which may necessitate a general increase or decrease in the output from the illumination system 591. Moreover, a similar general increase or decrease in light intensity may be necessitated where a particular group of record cards or other instruments affords greater or lesser contrast in the data printed thereon, relative to the background of the cards. On the other hand, the individual lamps may age at varying rates or may generate light of different intensities at a given operating voltage. For high quality work it is important that the illumination from all directions be substantially uniform, so that individual as well as group adjustment of the lamps is most desirable. A preferred operating circuit for the lamps of the system 591 is described in detail hereinafter in connection with FIG. 44.

In considering operation of the optical system of the photocomposing machine, attention should be directed to FIGS. 25–28 in addition to the various views of the machine discussed hereinabove. FIG. 25 is a schematic view illustrating operation of the optical system in an application in which the object data 305A is to be photographed with no substantial change in size. As noted hereinabove, the record card or other business instrument upon which the object data is carried is located in the exposure station of the machine with the base line 306A for the data preferably located in substantial coincidence with the axis 585 of the lens system 491, the lens system being illustrated schematically, in this view, as a single lens. To achieve 1:1 reproduction, the positioning knob 473 (FIG. 2A) is adjusted to provide a lens distance, or conjugate D, from the object data 305A. The lens system 491 is adjusted to provide an image conjugate distance F which is approximately equal to the distance D. Furthermore, the adjusting knob 486 (FIG. 2A) is adjusted to bring the mask device 408 into a position in which the mask elements 533 and 553 are located approximately in the focal plane G of the lens system, thereby positioning the film strip 405 in the focal plane of the lens (see FIGS. 25 and 43). Under these conditions, and as illustrated in FIG. 25, the data 671 is reproduced on the film strip without change in size from the original data 305A.

FIG. 26 is a schematic illustration of the lens system arranged for reproduction of an image of half the normal size of the object data 305B. In this instance, the lens system 491 is adjusted to a given object conjugate distance D′ from the object data and the image conjugate distance F′ of the lens system is made equal to half the distance D′. The position of the film box and the mask assembly is also adjusted to bring the mask, and thus the film exposure point, into substantial coincidence with the focal plane G′ of the lens at the distance F′ from the optical center of the lens. Under these circumstances, the reproduced image 675 is half the size of the original data 305B. Of course, further reductions in size may be effected by further increasing the spacing between the lens and the object relative to the focal length of the lens. Moreover, virtually any size intermediate those illustrated in FIGS. 25 and 26 may be obtained by adjustment of the lens and film units of the camera relative to the object plane in the exposure station 120 (FIG. 2A).

By making the lens system adjustable in this manner it is possible to effect a number of different variations in the size of the reproduced image, relative to the object data, which would not be possible if the lens and film units were in a fixed position. The uniform illumination of the object data is highly advantageous in that it provides for substantial uniformity in the reproduced image.

FIG. 27 shows a typical example of a film strip produced by the photocomposing machine, using a given line spacing and a given reproduction size ratio. Thus, it may be assumed that FIG. 27 represents a negative produced using the lens and focal plane adjustment of FIG. 25 and with a given adjustment of the film feed and the mask of the photocomposing machine. The film strip 405A shown in this figure is illustrated as a positive, for convenience in the drawings, but would, of course, be a negative image. To assure complete exposure and to avoid discontinuities in the intervening areas 676 between individual lines 677 of the reproduced data, the mask 408 is preferably adjusted to provide for a relatively small double exposure area between adjacent lines data. This is accomplished by adjusting the mask to afford an exposure gap 581 (see FIG. 43) having a height which is slightly larger than the incremental length of film fed through the camera during each operating cycle of the machine. This arrangement is of substantial advantage in providing clean, uncluttered copy and avoids any tendency toward undesired lines or spotting between the individual lines of data 677.

FIG. 28, on the other hand, shows another section of film strip 405B, reproduced from the same object cards as the strip 405A of FIG. 27 but with a different adjustment of the lens and camera positions, such as described in connection with FIG. 26. Thus, the reproduced data lines 678 on the film strip 405B comprise letters which are approximately half the size of those of the lines 677 of FIG. 27. However, it is not essential that the spacing between the lines 678 be equal to or bear any particular relation to the spacing 676 between lines in the first described film strip. Instead, the individual spaces 679 between the lines of data 678 may be adjusted entirely independently of the size of the reproduced image, so long as overlapping between adjacent image lines is avoided. Moreover, it is also possible to adjust the mask 408 to provide for a thin unexposed strip or line 680 running through each of the spaces 679 between adjacent lines of data. This is accomplished by adjusting the mask to make the exposure gap 581 slightly smaller in height than the length of film which is fed through the camera in each operating cycle of the machine. Thus, the film strip 405B may be utilized in producing ruled forms automatically without requiring any ruling on the original data applied to the record cards of similar carriers 88 (FIG. 24). It is thus seen that the multiple adjustments afforded by the photocomposing machine, comprising the adjustment for the length of film fed, the mask adjustment, and the adjustments for the lens and mask positions relative to the object data make it possible to achieve almost any desired reproduction effect in regard to the size, spacing, and other factors in the reproduced image.

*The Card Stacker*

After the individual record cards 88 have been photographed they are discharged from the exposure station 120 of the photocomposing machine, as described in detail hereinabove. Usually, it is desirable to retain the cards in a relatively neat and organized stack for future use. Moreover, it is desirable that the card sequence be kept the same, after the cards have been photographed, as in the original card stack inserted in the machine. Accordingly, the photocomposing machine of the invention is preferably provided with a card stacker for receiving the cards after they are discharged from the exposure station 120 and for re-stacking the cards in their original order. A preferred form of card stacking apparatus is shown in detail in FIGS. 29–31.

The card stacker 600 shown in FIGS. 29–31 is driven from the cam shaft 161 in the exposure station of the machine, through a gear train comprising the gears 601, 602 and 603 (see FIG. 30). The initial drive gear in the train, the gear 601, is affixed to the cam shaft 161 for rotation therewith. In the illustrated embodiment, the gears 601–603 are approximately equal in size, so that the overall drive ratio for the gear train is approximately 1:1.

The spur gear 603 is affixed to a relatively short shaft 604 which is journalled in a suitable bearing in the side wall 605 of the base 606 of the card stacker. A bevel gear 607 is mounted upon the end of the shaft 604 opposite the spur gear 603 and is disposed in meshing engagement with a second bevel gear 608 which is mounted upon a vertical shaft 609. The shaft 609 is supported by and is journalled in suitable bearings in a support bracket 611 which is mounted upon the upper portion of the base 606 of the card stacker.

A substantially L-shaped support arm 612 is pivotally mounted upon the shaft 609, the configuration of the support arm 612 being best illustrated in FIG. 29. At the end of the support arm opposite the shaft 609, a second vertical shaft 614 is mounted in suitable bearings in the support arm. A pulley 615 is mounted upon the upper end of the shaft 614 in alignment with a drive pulley 616 that is mounted upon the upper end of the shaft 609, being affixed to the shaft 609 for rotation therewith. A timing belt 618 or other suitable drive belt extends between and engages the two pulleys 615 and 616. A card feed roll 619 is also mounted on the shaft 614 for rotation therewith, and it is this roll which provides for the final movement of the individual record cards to a stacking position as described more fully hereinafter.

The card stacker 600 also includes a stationary guide 621 which extends across the base 606 of the card stacker, the configuration of the guide 621 being best illustrated in FIG. 29. As shown therein, the guide includes an initial angled guide portion 622 which is disposed closely adjacent the feed rolls 135 and 136 which eject the individual record cards from the exposure station of the photocomposing machine. The center portion of the guide 621 extends substantially parallel to the original direction of movement of the cards as they are ejected from the exposure station, but the opposite end of the guide 621 comprises a stop portion 623 which interrupts movement of the cards as they are fed into the stacker. As indicated in FIGS. 30 and 31, the central portion of the guide member 621 is provided with an aperture 624 through which the feed roll 619 projects.

The stacker 600 further includes a backup member 626 against which the cards are positioned in the final stacking operation. That is, the stacker 600 stacks the cards between the backup member 626 and the guide 621 as generally illustrated by the phantom outline of a stack of cards 88C (FIG. 29). The backup member 626 is mounted upon a pair of tapes 627 and 628. Each of the tapes 627 and 628 is threaded through suitable openings in the base portion 629 of the backup member 626, and is secured thereto by suitable clamping means such as the clamps 631 and 632. Accordingly, the backup member 626 may be moved to the left or right, as seen in either of FIGS. 29 or 30, by movement of the tapes 627 and 628. The tapes 627 and 628 may be fabricated from any relatively strong fabric which does not deteriorate if used over a relatively long period of time; woven nylon tape has been found quite suitable for this purpose. On the other hand, metal bands or other tape arrangements may be employed if desired.

The tape 627 is provided with a plurality of spaced apertures 633 and is engaged by a drive sprocket 634 and and an idler sprocket 635. Similarly, the tape 628 has a plurality of openings or apertures 636 therein, and the tape is engaged by a drive sprocket 637 and an idler sprocket 638. The two drive sprockets 634 and 637 are mounted upon a backup drive shaft 641 for rotation therewith (see FIGS. 29 and 31), whereas the two idler sprockets 635 and 638 are mounted upon a suitable shaft 642 (FIG. 29). The drive for the shaft 641 comprises a worm gear 644 which is mounted upon the shaft 641 in driving relation therewith. The gear 644, in turn, is engaged by a gear 645 which is secured to the drive shaft 646 of a stacker drive motor 647.

Means are also provided for driving the shaft 641 manually. Thus, a simple clutch device 651 is mounted on the backup shaft adjacent the worm gear 644. The clutch 651 is connected to a manual drive knob 652 and is actuated by a plunger 653 which extends axially of the knob 652. With the plunger 653 in the extended position shown in FIG. 31, the clutch 651 is disengaged, and this is the normal operating condition of the clutch. On the other hand, the plunger 653 may be moved to the left, as seen in FIG. 31, to engage the clutch 651 and connect the knob 652 in driving relation to the backup shaft 641. Inasmuch as the manually operated clutch 651 is substantially conventional in construction and does not comprise a critical part of the present invention, the clutch construction is not described in detail herein.

The stacker 600 further includes a control arrangement for actuating the backup drive motor 647. This control arrangement includes a control switch 656 (FIG. 29) having a sensing arm 657 pivotally connected to the switch mechanism. The arm 657 supports a roller 658 which engages the support arm 612 and is utilized to control operation of the switch 656 in accordance with the position of the support arm 612 as described more fully hereinafter.

In describing the operation of the stacker 600, it may be assumed that there are no cards present in the stacker, at the beginning of the operation. This being the case, the backup member 626 is originally moved to a position closely adjacent the guide member 621. In this regard, it should be noted that the stop portion 623 of the guide member 621 may fit into a slot or open portion 661 in the backup member, so that the backup member may be spaced from the stationary guide by a distance equal to the thickness of only a few cards. Under these conditions, when the photocomposing machine is placed in operation, the first card ejected from between the rollers 135 and 136 is deflected by the angle portion 622 of the guide 621 into the space between the members 621 and 626. As the card moves into this space, it is eventually engaged by the roller 619, which impels the card further into the stacker until its forward movement is interrupted by the stop member 623.

The next card is treated in essentially the same manner, being guided into the stacker between the first card and the stationary guide member 621. This action continues uninterruptedly, building up a stack of cards between the guide member 621 and the backup member 626, the cards being stacked in the same order as that in which they are fed through the photocomposing machine.

As the card stack grows, the space between the backup member 626 and the fixed guide member 621 is filled. Consequently, the cards begin to exert pressure upon the stacker feed roll 619, urging the feed roll to the right as seen in FIG. 29 and tending to pivot the support member 612 in a clockwise direction about the shaft 609. It will be understood, of course, that the shaft 609 is driven through a full revolution during each operating cycle of the machine, by virtue of its drive connection to the cam shaft 161. However, the drive system for the stacker roll 619 is constructed to rotate the stacker roll at a speed somewhat slower than the feed rolls in the exposure station in order to slow the cards down before they lute the stop member 623, reducing the possibility of damage to the cards.

When the support member 612 is pivoted in a clockwise direction, as noted hereinabove, due to the buildup of cards in the stacker, the roller 658 and the switch sensing arm 657 are also moved to the right as seen in FIG. 29. When the sensing arm has moved through a predetermined distance, preferably equal to the thickness of a relatively small number of cards, the normally open control switch 656 is closed. The closing of this switch energizes the motor 647. Accordingly, the backup drive shaft 641 is started in rotation through the drive connection, comprising the gears 644 and 645, between the shaft and the motor 647. Rotation of the shaft 641 moves the two tapes 627 and 628 in the direction indicated in the drawings by the arrows 662. This movement of the two tapes causes the backup member 626 to move in the direction of the arrows 662 and away from the fixed guide member 621.

Of course, as the backup member moves away from the fixed guide member, the pressure applied to the drive roll 619 is constructed to rotate the stacker roll at a speed tends to pivot the support arm 612 in a counterclockwise direction, urging the support arm and the drive roll 619 back toward their original positions. Accordingly, the support arm 612 pivots back to its original operating position, this movement is followed by the sensing arm 657, and the switch 656 is opened. Operation of the stacker proceeds as described hereinabove until the thickness of the stack again forces the drive roll 619 and the support arm 612 to a position in which the sensing arm 657 closes the switch 656. When this occurs, the backup drive arrangement again operates as described hereinabove to move the backup member 626 further away from the fixed guide 621 and thus provide room for more cards in the stacker.

At the end of a given run of the photocomposing machine, it may be desirable to remove the cards from the stack 88C and start a new run of the machine with no cards in the stacker. To this end, it is only necessary to lift the cards from the stacker, after which the plunger 653 may be employed to disengage the clutch 651 and the knob 652 may be utilized manually to return the backup member 626 to its original position as described hereinabove.

In FIG. 29, the guide member 621 is arranged for use with relatively small cards such as the cards 88A of FIG. 24. However, the guide member is of telescoping construction, such that the stop member 623 may be moved to the edge of the stacker, away from the drive roll 619, to accommodate larger cards. This is the only change in the stacker which is necessary to accommodate a change in card size.

*Electrical Control System*

The electrical system for the photocomposing machine described hereinabove is illustrated in the schematic diagram of FIG. 44. As shown therein the machine may be operated from a conventional 60 cycle alternating current source here represented by the two input conductors 701 and 702. The input circuit to the machine is provided with a master control switch 703 which may comprise a conventional double-pole single-throw control switch. Suitable overload protection, such as the fuses 704, may be provided for the machine; it will be understood that additional overload protection may be provided for individual motors, relays, and other components of the control circuit. Individual protective devices of this kind have been omitted from FIG. 44 in order to avoid confusion with respect to the operating components of the control circuit. The main power line for the machine is illustrated by the two conductors 705 and 706 across which an indicator lamp 707 may be connected to afford a means for determining when the master control switch 703 is closed.

As noted hereinabove, the main control motor 260 and the roller drive motor 169 are both driven continuously during operation of the machine. Accordingly, each of these two motors is connected across the lines 705 and 706, there being no necessity for individual switches for the motors. The stacker drive motor 647 is connected across the power lines 705 and 706 in series with the sensing switch 656 which controls the motor operation as described hereinabove. The motor 708 for the blower 116 may also be connected directly across the power lines 705 and 706, since the blower may be operated continuously and need not be shut off when the machine is interrupted in its operation for short periods. A second blower motor 709 may be similarly connected in the main circuit and may be used to drive a blower to blow air through the lighting system 591 to cool the lamps. This second blower has not been illustrated in the drawings, but may be of conventional construction.

The operating circuit for the lamp 593 of the illumination system 591 (FIG. 2A) comprises a variable ratio transformer 711. The primary winding 712 of the transformer is connected at one end to the power line 706. The other power line 705 is connected to the other end of the primary winding. The secondary winding of the transformer 711 is connected at one end to one end of the primary winding 714 of a second transformer 715 and the other end of the primary winding 714 is connected to the other end of the primary winding. The secondary winding 716 of the latter is connected to the lamp 593. This circuit arrangement makes it possible to adjust the operating voltage applied to the lamp 593 independently of any adjustment in the operating voltages of the remaining lamps of the illumination system 591.

The operating circuits for the lamps 594, 596 and 597 may be substantially similar to that described hereinabove for the lamp 593. Thus, the lamp 594 may be connected to the power lines 705 and 706 by means of a circuit comprising a variable autotransformer 717 and a coupling transformer 718. The operating circuit for the lamp 596 may comprise a variable autotransformer 721 and a coupling transformer 722, whereas the corresponding circuit for the lamp includes a variable transformer 723 and a coupling transformer 724. It is not essential that the particular circuit arrangement illustrated in connection with the illumination system 591 be followed exactly. Rather, any other circuit arrangement which affords independent adjustment of the operating voltages of the four lamps may be utilized if desired. For example, the variable transformers 711, 721 and 723 may be replaced by autotransformers, rheostats, potentiometers, or other well known arrangements for varying the operating voltages of the lamps. Moreover, the coupling transformers shown in the circuit of FIG. 44 may be omitted in some instances, depending upon the kind of variable impedances utilized to control the lamps.

The control circuit of the photocomposing machine may also include a suitable D.C. power supply 726 which may be employed to energize a plurality of relays and other devices, described in detail hereinafter, which control various functions of the photocomposing machine. The particular power supply circuit selected for this purpose is not critical with respect to operation of the machine; accordingly, the power supply is not shown in detail in the drawing. In the illustrated arrangement, a first conductor 727 comprises the positive polarity output lead or terminal for the power supply 726, whereas a second conductor 728 represents the negative-polarity lead or terminal for the power supply.

As noted hereinabove, the cyclic operation of the machine is controlled by the clutch 268 which, in turn, is controlled by the solenoid 281 (FIG. 21). In the control arrangement of FIG. 44, the solenoid 281 is connected across the D.C. power supply by means of a circuit comprising a set of relay contacts 731 which are interposed in series with the coil 281 between the power supply conductors 727 and 728. The contact 731 comprises one set of contacts in a solenoid operated relay 732 which also includes an operating coil 733 and a second set of contacts 734. Both sets of contacts 732 and 734 are normally open and are closed only when the coil 733 is energized.

The energizing circuit for the relay coil 733 comprises one set of terminals 735 of a double-pole single-throw manual starting switch 736, this portion of the switch 736 being connected between one terminal 737 of the relay coil 733 and the positive side of the regulated power supply 726. The coil terminal 737 is also connected to the positive side of the power supply, the conductor 727, through a holding circuit comprising the relay contacts 734. The other terminal 738 of the relay coil 733 is returned to the negative terminal 728 of the power supply through the cam controlled switch 241, which has been described hereinabove in connection with FIG. 12.

An alternate return circuit for the main operating relay coil 733 is also incorporated in the control arrangement of FIG. 44, being connected in parallel with the main return circuit comprising the switch 241. This alternate return circuit includes, in series, a set of normally closed contacts 741 in a relay 742 and a set of normally closed contacts 743 in a double-pole single-throw manual stop switch 744. The relay contacts 741 are controlled by the relay operating coil 745 which, in turn, is controlled in its operation by the photocell 298 in the exposure station of the photocomposing machine (see FIG. 8). Thus, the operating circuit for the relay 742 comprises, in series, the photocell 298, the operating coil 745, and a cam-controlled normally-open switch 747, these components being connected across the terminals 727 and 728 of the D.C. power supply 726. The cam-controlled switch 747 is one of four switches at the exposure station of the machine and, as noted hereinabove, may be substantially similar in construction to the switch 251 illustrated in FIG. 12. The photocell is illuminated by the same lights which illuminate the card.

A latching relay 751 is included in the control circuit for the photocomposing machine and is utilized to control the operation of an indicator light 752. The relay 751 includes a single set of contacts 753 and a pair of operating coils 754 and 755. The construction of this relay is such that, when the coil 754 is energized, the contacts 753 are opened. Moreover, the contacts are latched in this open position and remain open even when the coil 754 is de-energized. Accordingly, to close the relay contacts, it is necessary to energize the other operating coil 755 of the relay. Once this coil has been energized, the contacts 753 are closed and remain closed when the coil 755 is de-energized. Inasmuch as latching relays of this kind are generally well known in the art, the detail construction of the relay has not been shown in the drawings.

The operating coil 754 of the relay 751 is connected across the power supply conductors 727 and 728 by means of a circuit which includes a second set 756 of normally open contacts in the start switch 736. A similar circuit is utilized in connection with the other operating coil 755 of the latching relay, except that in this instance the operating coil is connected in series with a set 757 of normally open contacts in the stop switch 744. The indicator light 752 is connected across the power line conductors 705 and 706 in series with the contacts 753 of the latching relay 751. Accordingly, it is seen that operation of the manual stop switch 744 is effective to energize the coil 755 and close the contacts 753, thereby energizing the indicator light 752. The indicator light remains in operation until such time as the start switch 756 is actuated to close the operating circuit of the second relay coil 754 and thereby open the indicator light contacts 753.

The operating circuits for the two shutter solenoids 507 and 511 are also shown in FIG. 44. As illustrated therein, the shutter opening solenoid 511 may be connected across the power supply conductors 727 and 728 by means of an operating circuit which includes a cam-controlled switch 761 connected in series with the solenoid. A similar arrangement, comprising a cam-controlled switch 762, is employed in connection with the shutter closing solenoid 507 (see FIG. 39). Of course, the two solenoids 507 and 511 are not energized simultaneously; rather, the operating circuits of these solenoids are closed during spaced intervals in each operating cycle of the machine as indicated by the timing chart of FIG. 23.

When the photocomposing machine is to be placed in operation, the operator first closes the main control switch 703. As soon as this switch is closed, the main drive motor 260 is energized. However, the clutch 268 (FIGS. 20 and 21) remains disengaged and operation of the machine is not yet commenced. The motor 169, however, is energized and starts the rollers in the exposure station 120 rotating. Moreover, the indicator light 707 is energized, as are the blower motors 708 and 709. In addition, all of the lamps in the illumination system 591 are energized as soon as the switch 703 is closed.

To start the feeding of cards into the machine, and to initiate the several sequential operations which take place at the exposure station 120, and also to initiate feeding of film through the camera, it is necessary for the operator to actuate the switch 736 from its normally open position to its closed position, closing the two sets of contacts 735 and 756. As soon as the switch 736 is closed, the operating coil 733 for the main control relay 732 is energized through the circuit comprising the switch contact 735 and the normally closed cam-controlled switch 241. In fact, the coil 733 is energized whether or not the switch 241 is closed or open, since the coil is also returned to the negative side of the power supply through the alternate circuit comprising the contacts 741 of the relay 742 and the normally closed contacts 743 of the stop switch 744. As soon as the relay coil 733 is energized, the relay contacts 731 and 734 are closed. Accordingly, the main control solenoid 281 is energized, effectively engaging the clutch 268 and starting operation of the photocomposing machine. The closing of the relay contact 734 establishes a holding circuit for the relay and maintains the machine in operation when the start switch 736 is released from its actuated position. As noted hereinafter, the closing of the start switch 736 is effective to energize the operating coil 754 and open the relay contacts 753, thereby extinguishing the indicator light 752.

Consideration of further operation of the control circuit of FIG. 44 may be facilitated by reference to FIG. 23 and the timing relationships shown therein. As indicated in FIG. 23, at an early point in each operating cycle of the machine the solenoid 511 is energized by closing of the cam-controlled switch 761. Accordingly, the shutter of the camera is opened and remains open for a substantial portion of the operating cycle, even though the solenoid 511 is de-energized shortly after the shutter opens, the de-energization of the solenoid being effected by opening of the cam-controlled switch 761. Near the middle of the operating cycle, the cam-controlled switch 762 is closed, energizing the solenoid 507 and closing the shutter. Like the solenoid 511, the solenoid 507 is energized for only a minor fractional portion of each operating cycle.

During the latter portion of the operating cycle, the cam-controlled switch 747 is closed. Accordingly, a circuit is completed through the photocell 298 to provide for energization of the relay coil 745. If a normal record card is present in the exposure station, however, the photocell 298 is not illuminated to any appreciable extent. The normal relatively high resistance of the photoconductive device 298 is effective to limit the current through the relay coil 745 and thus prevent actuation of the relay 742. Consequently, when the cam-controlled stop switch 241 is opened shortly after closing of the switch 747 (see FIG. 23) the operating circuit for the main relay coil 733 remains undisturbed, since the coil still has a return circuit, including the relay contacts 741 and the switch contacts 742, which is connected in shunt with the switch 241. Subsequently, the switch 241 closes and the switch 747 opens, returning the control apparatus to its original operating condition. Since the solenoid 281 remains energized, the main clutch 268 of the machine remains engaged and operation is continued into the next cycle of the machine.

Under some conditions, it may happen that no record card is fed into the exposure station 120 of the machine in a given operating cycle. When this occurs, the closing of the cam-controlled switch 747 is effective to actuate the relay 742, since the normal high resistance of the photocell 298 is substantially reduced by illumination from the illuminating lamps in the absence of a record card. Actuation of the relay 742 opens the contacts 741 of the relay. Accordingly, when the cam-controlled stop switch 241 is opened, both of the alternate return circuits for the main relay coil 733 are open and the relay 732 drops out. When this occurs, the relay contacts 731 open, the coil 281 is de-energized, and the clutch 268 is de-energized. Accordingly, the card feeding, film feeding, and photographing operations of the machine are stopped completely. The indicator light 742 remains off, however, since the manual stop switch 744 has not been actuated. Accordingly, the operator knows that it is the photocell which has halted operation of the machine and is able to take necessary steps to provide for continued operation.

In some instances, it may be desirable to deliberately stop operation of the machine at a given point in the photo-composing operation. Thus, it may be desirable to stop the machine at a transition point between pages of material to be composed in order to permit marking of the film, using the film punch described hereinabove, or to permit the changing of film, or for other purposes. To accomplish this purpose automatically, it is only necessary to insert in the card stack, at the desired point, a record card which is provided with one or more windows corresponding to the photocell apertures 299 (see FIGS. 9 and 24). A card having openings of this kind does not mask the photocell 298 with respect to the illuminating lamps 593, 594, 596 and 597 and therefore permits the sensing circuit comprising the photocell to halt operation of the machine automatically and at the desired point. To start the machine again, it is only necessary to again press the start switch 736 and operation continues as described hereinabove.

Operation of the machine may also be interrupted by means of the stop switch 744 without interrupting operation of the motors of the machine and without cutting off the lighting system 591. Thus, if the stop switch 744 is actuated to open the contacts 743 and close the contacts 751, machine operation is interrupted, when the cam-controlled switch 241 opens, in essentially the same manner as when the photocell circuit halts machine operation. The only difference is that the latching relay 751 is actuated to close its contact 753, lighting the indicator lamp 752. Thus, the lamp 752 affords a positive indication that machine operation has been halted manually and that stopping of the machine is not due to the presence of an apertured card in the exposure station or to the lack of a card in the exposure station. Of course, the machine may again be set in operation simply by closing the start switch 736.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. In a photocomposing machine of the kind in which records or like business instruments, each bearing data to be included in a composition, are individually fed from a storage magazine to an exposure station at which said data is photographed upon a film strip moved step-by-step through a camera in synchronism with movement of said record cards into said exposure station, a card feed apparatus comprising: a stationary face plate; means, comprising a movable carriage, for supporting a stack of record cards on edge adjacent said face plate and in flat facing relation thereto; vacuum means for drawing a central portion of the lead card from said stack toward said face plate; a card feed shuttle, mounted adjacent said face plate and movable along a reciprocable path in a direction parallel to said face plate; a pusher blade having a shoulder projecting outwardly of said face plate for engaging a side edge of the lead card of said stack to feed said lead card from said stack into an exposure station; means for blowing air through and between the cards in a part of said stack adjacent said face plate to partially separate said cards from each other; and means for advancing said carriage toward said face plate to bring said cards in said stack successively into feeding position adjacent said face plate.

2. In a photocomposing machine of the kind in which record cards or like business instruments, each bearing data to be included in a composition, are individually fed from a storage magazine to an exposure station at which said data is photographed upon a film strip moved step-by-step through a camera in synchronism with movement of said record cards into said exposure station, a card feed apparatus comprising: a face plate; means, comprising a movable carriage disposed between a pair of stationary guides, for supporting a stack of record cards on edge adjacent said face plate and in flat facing relation thereto; vacuum means for drawing the central portion of the lead card in said stack into contact with said face plate; a card feed shuttle, mounted adjacent said face plate and movable along a reciprocable path in a direction parallel to said face plate; a pusher blade mounted on said shuttle and having a shoulder projecting outwardly of said face plate adjacent a first one of said stationary guides for engaging a side edge of the lead card of said stack to feed said lead card from said stack and along said path into an exposure station; a first inclined plane member mounted on said shuttle adjacent said pusher blade, and a second inclined plane member mounted on said face plate adjacent said second stationary guide, for bending opposite side edges of the lead card in said stack away from said face plate to insure separation of said lead card from said stack, said second inclined plane member and said second stationary guide conjointly defining a gate effective to prevent feeding of more than one card into said exposure station; means for mounting said pusher blade and said first inclined plane member on said shuttle, and in alignment with said face plate, at any one of a plurality of positions on said shuttle to accommodate cards of different sizes; means for mounting said first stationary guide member on said face plate at a corresponding plurality of positions; means for blowing air through and between the cards in a part of said stack adjacent said face plate to partially separate said cards from each other; and means for advancing said carriage toward said face plate to bring said cards in said stack successively into feeding position adjacent said face plate.

3. In a photocomposing machine of the kind in which record cards or like business instruments, each bearing data to be included in a composition, are individually fed from a storage magazine to an exposure station at which said data is photographed upon a film strip moved step-by-step through a camera in synchronism with movement of said record cards into said exposure station, an exposure station comprising: a drive roll for engaging a record card and impelling said record card along a predetermined path toward an exposure position; a blocking member; actuating means for moving said blocking member between a retracted position displaced from said path and a blocking position in which said blocking member engages a record card to interrupt movement of said record card in a predetermined exposure position; aligning means for engaging a record card disposed in said exposure position and precisely aligning said card, with respect to a camera, for photographing the data thereon; a kickout roll located between said drive roll and said blocking member; kickout means for moving said kickout roll between a retracted position displaced from said path and an operating position in which said kickout roll engages a record card to eject said card from said exposure position; cyclic control means for operating said actuating means, said aligning means, and said kickout means in timed relation to each other to actuate said blocking member to said blocking position and stop a record card in said exposure position, retract said blocking member, engage said aligning means with a record card in said exposure station, release said aligning means from engagement with said card, advance said kickout roll to said operating position to eject said card, and retract said kickout roll before said blocking member is again moved to blocking position; and means for continuously rotating both said drive roll and said kickout roll.

4. In a photocomposing machine of the kind in which record cards or like business instruments, each bearing data to be included in a composition, are individually fed from a storage magazine to an exposure station at which said data is photographed upon a film strip moved step-by-step through a camera in synchronism with movement of said record cards into said exposure station, an exposure station comprising: a drive roll for engaging a record card and impelling said record card along a predetermined path toward an exposure position; a blocking member; a pad of resilient deformable material removably mounted on said blocking member; actuating means for moving said blocking member between a retracted position displaced from said path and a blocking position in which said blocking member is interposed in said path and said pad engages the leading edge of a record card to interrupt movement of said record card in a predetermined exposure position with the trailing edge of said card just clear of said drive roll, said pad being effective to absorb a substantial portion of the kinetic energy of said card; aligning means for engaging a record card disposed in said exposure position and precisely aligning said card with respect to a camera for photographing the data thereon; kickout means for engaging a record card to eject said card from said exposure position; cyclic control means for operating said actuating means, said aligning means, and said kickout means in timed relation to each other; and means for rotating said drive roll.

5. In a photocomposing machine of the kind in which record cards or like business instruments, each bearing data to be included in a composition, are individually fed from a storage magazine to an exposure station at which said data is photographed upon a film strip moved step-by-step through a camera in synchronism with movement of said record cards into said exposure station, an exposure station comprising: a drive roll for engaging a record card and impelling said record card along a predetermined path toward an exposure position in which said card is located beyond said drive roll along said path; a blocking member; resilient mounting means for said blocking member permitting limited movement of said blocking member along said path; actuating means for moving said blocking member between a retracted position displaced from said path and a blocking position in which said blocking member is interposed in said path and engages the leading edge of a record card to interrupt movement of said record card in said exposure position, said blocking member being displaced along said path, from said drive roll, by a distance greater than the length of said card so that the trailing edge of said card is clear of said drive roll, said resilient mounting means being effective to absorb a substantial portion of the kinetic energy of said card; aligning means for engaging a record card disposed in said exposure position and precisely aligning said card with respect to a camera for photographing the data thereon; kickout means for engaging a record card to eject said card from said exposure position; cyclic control means for operating said actuating means, said aligning means, and said kickout means in timed relation to each other; and means for rotating said drive roll.

6. In a photocomposing machine of the kind in which record cards or like business instruments, each bearing data to be included in a composition, are individually fed from a storage magazine to an exposure station at which said data is photographed upon a film strip moved step-by-step through a camera in synchronism with movement of said record cards into said exposure station, an exposure station comprising: a pair of drive rolls disposed in spaced relation to each other along a predetermined path, for engaging a record card and impelling said record card along said path toward an exposure position; an idler roll; means for mounting said idler roll at either one of two alternate positions along said path to cooperate with a selected one of said drive rolls and thereby condition said photocomposing machine exposure station for operation with record cards of different lengths; a blocking member; actuating means for moving said blocking member between a retracted position displaced from said path and a blocking position in which said blocking member engages a record card to interrupt movement of said record card in a predetermined exposure position with the trailing edge of said card just clear of the selected one of said drive rolls; aligning means for engaging a record card disposed in said exposure position and precisely aligning said card with respect to a camera for photographing the data thereon; kickout means for engaging a record card to eject said card from said exposure position; cyclic control means for operating said actuating means, said aligning means, and said kickout means in timed relation to each other; and means for continuously rotating both of said drive rolls.

7. In a photocomposing machine of the kind in which record cards or like business instruments, each bearing data to be included in a composition, are individually fed from a storage magazine to an exposure station at which said data is photographed upon a film strip moved step-by-step through a camera in synchronism with movement of said record cards into said exposure station, an exposure station comprising: a drive roll for engaging a record card and impelling said record card along a predetermined path toward an exposure position; a blocking member; actuating means for moving said blocking member between a retracted position displaced from said path and a blocking position in which said blocking member is interposed in said path and engages the leading edge of a record card to interrupt movement of said record card in a predetermined exposure position with the trailing edge of said card just clear of said drive roll; transverse positioning means comprising a positioning element movable between a retracted position displaced from said exposure position and an operating position engaging a record card to impel said card into said exposure position in a direction transverse to said path; aligning means for engaging a record card disposed in said exposure position and precisely aligning said card with respect to a camera for photographing the data thereon; kickout means for engaging a record card to eject said card from said exposure position; cyclic control means for operating said actuating means, said positioning means, said aligning means and said kickout means in timed relation to each other to actuate said blocking member to said blocking position to stop a record card in said exposure position, move said positioning element to said operating position, retract said blocking member, engage said aligning means with a record card in said exposure station, retract said positioning element, release said aligning means from engagement with said card, engage said kickout means to eject said card, and retract said kickout means before said blocking member is again moved to blocking position; and means for continuously rotating both said drive roll and said kickout roll.

8. In a photocomposing machine of the kind in which record cards or like business instruments, each bearing data to be included in a composition, are individually fed from a storage magazine to an exposure station, a card feed and positioning apparatus comprising: means, including a movable carriage, for supporting a stack of record cards on edge adjacent a face plate; a card feed shuttle, mounted adjacent said face plate and movable in a direction parallel thereto; a pusher blade having a shoulder projecting outwardly of said face plate for engaging a side edge of the lead card of said stack to feed said lead card from said stack along a predetermined path toward an exposure station; means for mounting said pusher blade on said shuttle at any one of a plurality of positions to accommodate cards of different size; a blocking member having a pad of resilient deformable material mounted thereon; actuating means for moving said blocking member between a retracted position displaced from said path and a blocking position in which said blocking member is interposed in said path and said pad engages the leading edge of a record card to interrupt movement of said record card in a predetermined exposure position, said pad being effective to absorb a substantial portion of the kinetic energy of said card; aligning means for engaging a record card disposed in said exposure position and precisely aligning said card at said exposure position; and cyclic control means for operating said card feed shuttle, said actuating means, and said aligning means, in timed relation to each other.

9. In a photocomposing machine of the kind in which record cards or like business instruments, each bearing data to be included in a composition, are individually fed from a storage magazine to an exposure station, a card feed and positioning apparatus comprising: means, including a movable carriage, for supporting a stack of record cards on edge adjacent a face plate; a card feed shuttle, mounted adjacent said face plate and movable in a direction parallel thereto, said shuttle including a pusher blade having a shoulder projecting outwardly of said face plate for engaging a side edge of the lead card of said stack to feed said lead card from said stack along a predetermined path toward an exposure station; a blocking member; a pad of resilient deformable material removably mounted on said blocking member; actuating means for moving said blocking member between a retracted position displaced from said path and a blocking position in which said blocking member is interposed in said path and said pad engages the leading edge of a record card to interrupt movement of said record card in a predetermined exposure position, said pad being effective to absorb a substantial portion of the kinetic energy of said card; aligning means for engaging a record card disposed in said exposure position and precisely aligning said card at said exposure position; kick-out means for engaging a record card to eject said card from said exposure position; cyclic control means for operating said card feed shuttle, said actuating means, said aligning means, and said kick-out means in timed relation to each other; and means for advancing said carriage toward said face plate to bring said cards in said stack successively into feeding position adjacent said face plate, said means applying a continuous bias to said carriage independent of the weight of said cards.

10. In a photocomposing machine of the kind in which record cards or like business instruments, each bearing data to be included in a composition, are individually fed from a storage magazine to an exposure station, a card feed and positioning apparatus comprising: means, including a movable carriage, for supporting a stack of record cards on edge adjacent a face plate; a card feed shuttle, mounted adjacent said face plate and movable in a direction parallel thereto; a pusher blade having a shoulder projecting outwardly of said face plate for engaging a side edge of the lead card of said stack to feed said lead card from said stack along a predetermined path toward an exposure station; means for mounting said pusher blade on said shuttle at any one of a plurality of positions to accommodate cards of different size; a blocking member; a pair of drive rolls diposed in spaced relation to each other along said path; an idler roll; means for mounting said idler roll at either one of two alternate positions along said path to cooperate with a selected one of said drive rolls and thereby condition said machine for operation with record cards of different lengths; actuating means for moving said blocking member between a retracted position displaced from said path and a blocking position in which said blocking member is interposed in said path to interrupt movement of said record card in a predetermined exposure position; aligning means, independent of said blocking member, for engaging a record card disposed in said exposure position and precisely aligning said card at said position; kick-out means for engaging a record card to eject said card from said exposure position; cyclic control means for operating said card feed shuttle, said actuating means, said aligning means, and said kick-out means in timed relation to each other; and means for continuously rotating both of said drive rolls.

11. In a photocomposing machine of the kind in which record cards or like business instruments, each bearing data to be included in a composition, are individually fed from a storage magazine to an exposure station, a card feed and positioning apparatus comprising: means, including a movable carriage, for supporting a stack of record cards on edge adjacent a face plate; vacuum means for drawing the lead card from said stack toward said face place; a card feed shuttle, mounted adjacent said face plate and movable in a direction parallel thereto; a pusher blade having a shoulder projecting outwardly of said face plate for engaging a side edge of the lead card of said stack to feed said lead card from said stack along a predetermined path toward an exposure station; means for mounting said pusher blade on said shuttle, in alignment with said face plate, at any one of a plurality of positions on said shuttle to accommodate cards of different sizes; a blocking member; a pad of resilient deformable material removably mounted on said blocking member; actuating means for moving said blocking member between a retracted position displaced from said path and a blocking position in which said blocking member is interposed in said path and said pad engages the leading edge of a record card to interrupt movement of said record card in a predetermined exposure position, said pad being effective to absorb a substantial portion of the kinetic energy of said card; aligning means for engaging a record card disposed in said exposure position and precisely aligning said card at said exposure position; kick-out means for engaging a record card to eject said card from said exposure position; cyclic control means for operating said card feed shuttle, said actuating means, said aligning means, and said kick-out means in timed relation to each other; and means for advancing said carriage toward said face plate to bring said cards in said stack successively into feeding position adjacent said face plate, said means applying a continuous bias to said carriage independent of the weight of said cards.

References Cited in the file of this patent

UNITED STATES PATENTS

| | | |
|---|---|---|
| 498,963 | Torrey | June 6, 1893 |
| 1,032,378 | Chandler | July 16, 1912 |
| 1,346,589 | Cameron | July 13, 1920 |
| 1,772,180 | Ford | Aug. 5, 1930 |
| 1,935,210 | Hopkins | Nov. 14, 1933 |
| 1,939,446 | Hessert | Dec. 12, 1933 |
| 2,099,681 | Draeger | Nov. 23, 1937 |
| 2,181,211 | Sieg | Nov. 28, 1939 |

(Other references on following page)

UNITED STATES PATENTS

| | | |
|---|---|---|
| 2,181,998 | Mills | Dec. 5, 1939 |
| 2,186,986 | Nelson | Jan. 16, 1940 |
| 2,194,808 | Pooley | Mar. 26, 1940 |
| 2,235,844 | Nelson | Mar. 25, 1941 |
| 2,304,273 | Nelson | Dec. 8, 1942 |
| 2,396,384 | Paris | Mar. 12, 1946 |
| 2,451,079 | Finch | Oct. 12, 1948 |
| 2,454,762 | Belluche | Nov. 30, 1948 |
| 2,510,559 | Daly | June 6, 1950 |
| 2,547,126 | Kaish | Apr. 3, 1951 |
| 2,706,435 | Gerken | Apr. 19, 1955 |
| 2,710,406 | Gollwitzer | June 7, 1955 |
| 2,745,664 | Davies et al. | May 15, 1956 |
| 2,908,496 | Long | Oct. 13, 1959 |
| 2,954,227 | Galloway | Sept. 27, 1960 |